US012488201B2

(12) United States Patent
Petrauskas

(10) Patent No.: US 12,488,201 B2
(45) Date of Patent: *Dec. 2, 2025

(54) INTEGRATION OF MACHINE LEARNING MODELS WITH DIALECTICAL LOGIC FRAMEWORKS

(71) Applicant: Alanas Petrauskas, Vilnius (LT)

(72) Inventor: Alanas Petrauskas, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,555

(22) Filed: Oct. 28, 2024

(65) Prior Publication Data

US 2025/0156654 A1    May 15, 2025

Related U.S. Application Data

(63) Continuation-in-part of application No. 18/677,875, filed on May 30, 2024, now Pat. No. 12,175,372, which is a continuation-in-part of application No. 18/631,009, filed on Apr. 9, 2024, now Pat. No. 12,099,802.

(60) Provisional application No. 63/598,074, filed on Nov. 11, 2023.

(51) Int. Cl.
G06F 40/40         (2020.01)
(52) U.S. Cl.
CPC .................... *G06F 40/40* (2020.01)
(58) Field of Classification Search
None
See application file for complete search history.

(56) References Cited

U.S. PATENT DOCUMENTS

| | | | | |
|---|---|---|---|---|
| 10,679,011 | B2 * | 6/2020 | Galitsky | G06F 40/30 |
| 11,348,591 | B1 * | 5/2022 | Moinuddin | G10L 25/24 |
| 11,372,381 | B1 * | 6/2022 | Trowbridge | G06N 7/01 |
| 11,657,307 | B1 * | 5/2023 | Bodapati | G06N 20/00 |
| | | | | 706/15 |

(Continued)

OTHER PUBLICATIONS

Anne Lauscher et al: "Rhetoric, Logic, and Dialectic: Advancing Theory-based Argument Quality Assessment in Natural Language Processing", arxiv.org, Cornell University Library, 201 Olin Library Cornell University Ithaca, NY 14853, Jun. 2020 (Jun. 2020), Retreived from Internet: https://arxiv.org/abs/2006.00843 (accessed on Mar. 31, 2025).

(Continued)

*Primary Examiner* — Seong-Ah A Shin
(74) *Attorney, Agent, or Firm* — Kevin Paganini, Esq.

(57) ABSTRACT

This disclosure relates to techniques for executing dialectical analyses using large language models and/or other types of deep learning models. In certain embodiments, the dialectic logic engine executes programmatic processes to derive archetypical and supplemental parameters through communication exchanges with generative language models. These parameters can be organized in mapping schemas with defined relationships and circular structures, generating outputs such as dialectic wheels, tables, and natural language explanations. The dialectic logic engine also can enforce constraint conditions and/or eliminate bias while handling both ambiguous and unambiguous causal relationships. A dialectic training system also is disclosed that can fine-tune language models to extend their capabilities in dialectic domains.

20 Claims, 32 Drawing Sheets

(56) References Cited

U.S. PATENT DOCUMENTS

| | | | |
|---|---|---|---|
| 2014/0324747 A1* | 10/2014 | Crowder | G06N 3/043 706/18 |
| 2016/0239476 A1* | 8/2016 | Huang | G06F 40/35 |
| 2020/0252510 A1* | 8/2020 | Ghuge | G10L 15/26 |
| 2020/0327895 A1* | 10/2020 | Gruber | G06F 16/2457 |
| 2021/0183375 A1* | 6/2021 | Lee | G10L 15/005 |
| 2021/0342548 A1* | 11/2021 | Galitsky | G06F 40/35 |
| 2022/0383206 A1* | 12/2022 | Luong | G06N 20/20 |
| 2023/0223016 A1* | 7/2023 | Konam | G06F 40/284 704/231 |
| 2023/0274093 A1* | 8/2023 | Kumar | G06N 5/04 704/9 |
| 2024/0221532 A1* | 7/2024 | Kim | G09B 11/00 |
| 2024/0256779 A1* | 8/2024 | Gretz | G06F 40/284 |

OTHER PUBLICATIONS

Laske Otto: "Chapter 1: The Concept of Dialectics: A Framework for Its Practical Use" In: "Advanced Systems—Level Problem Solving, vol. 3 Manual of Dialectical Thought Forms", Oct. 14, 2023 (Oct. 14, 2023), ISBN: 978-3-031-40339-2: pp. 1-23. Retrieved from the Internet: https://link.springer.com/book/10.1007/978-3-031-40332-3 (accessed on Mar. 31, 2025).

Chang Edward Y: "Prompting Large Language Models With the Socratic Method", 2023 IEEE 13th Annual Computing and Communication Workshop and Conference, (CCWC), IEEE, Mar. 8, 2023 (Mar. 8, 2023), pp. 351-360, DOI: 10.1109/CCWC57344.2023.10099179. Also available at: https://arxiv.org/abs/2303.08769v1.

* cited by examiner

FIG. 4B

170 – Dialectic Outputs

- 171 – Parameter Synopsis Outputs
- 172 – Dialectic Wheels
- 173 – Derivation String Outputs
  - 173A – Control Statements
  - 173B – Interrogation Outputs
  - 173C – Quotation Outputs
  - 173D – Duality Evaluation Outputs
- 174 – Poly-Circular Graphs
- 175 – Dialectic Causality Outputs

FIG. 4A

160 – Dialectic Parameters

- 160A – Thesis Parameters
- 160B – Antithesis Parameters
- 160C – Positive Thesis Parameters
- 160D – Negative Thesis Parameters
- 160E – Positive Antithesis Parameters
- 160F – Negative Antithesis Parameters
- 160G – Action Parameters
- 160H – Positive Action Parameters
- 160I – Negative Action Parameters
- 160J – Reverse Action Parameters
- 160K – Positive Reverse Action Parameters
- 160L – Negative Reverse Action Parameters

| Conditions/Statements | T | T+ | T- | A | A+ | A- | Ac | Ac+ | Ac- | Re | Re+ | Re- |
|---|---|---|---|---|---|---|---|---|---|---|---|---|
| Complimentary to |  | A+ | A- | T | T+ | T- |  | Re+ | Re- |  | Ac+ | Ac- |
| Contradictory to | A | A- | A+ | T | T- | T+ | Re | Re- | Re+ | Ac | Ac- | Ac+ |
| A(X) - Opposite to | A | A- | A+ | T | T- | T+ | Re | Re- | Re+ | Ac | Ac- | Ac+ |
| Positive side of | T | - | - |  | A | - |  | Ac | - |  | Re | - |
| Negative side of | - | - | T |  | - | A |  | - | Ac |  | - | Re |
| Overdevelopment of | - | - | T |  | - | A | Ac | - | Ac |  | - | Ac |
| Underdevelopment of | - | A+ |  |  | T+ |  | Re+ |  | Re+ |  | - | Re+ |
| Clockwise direction: |  |  |  |  |  |  |  |  |  |  |  |  |
| Cause of | Ac | Ac+ | Ac- | A | A+ | A- | Re | Re+ | Re- | T | T+ | T- |
| Effect of | Re | Re+ | Re- | Ac | Ac+ | Ac- | T | T+ | T- | A | A+ | A- |

FIG. 5

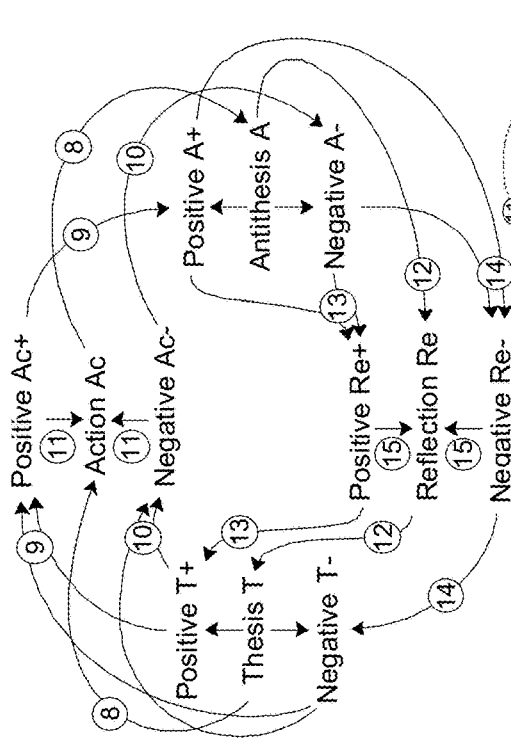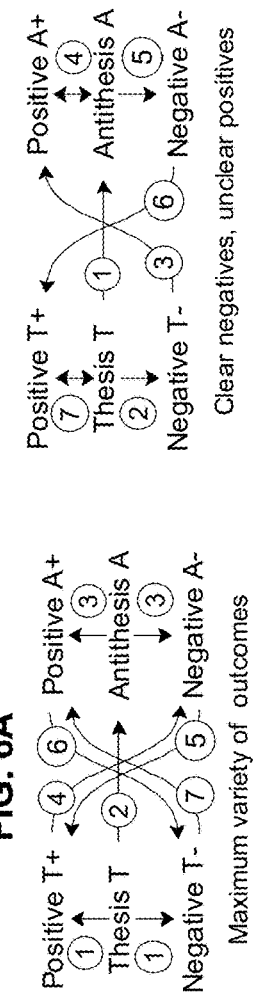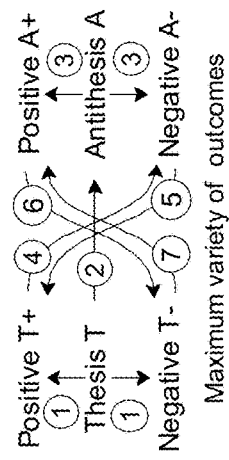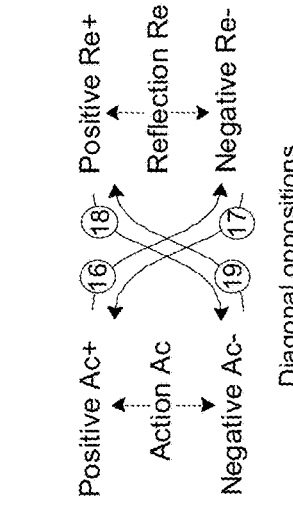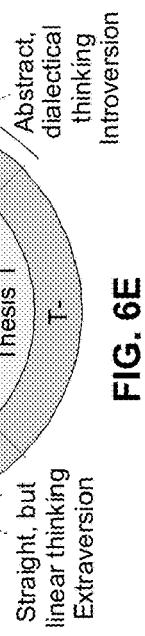

The major Thesis is labeled as k = 1, the 2nd most important thesis as k = 2, etc.

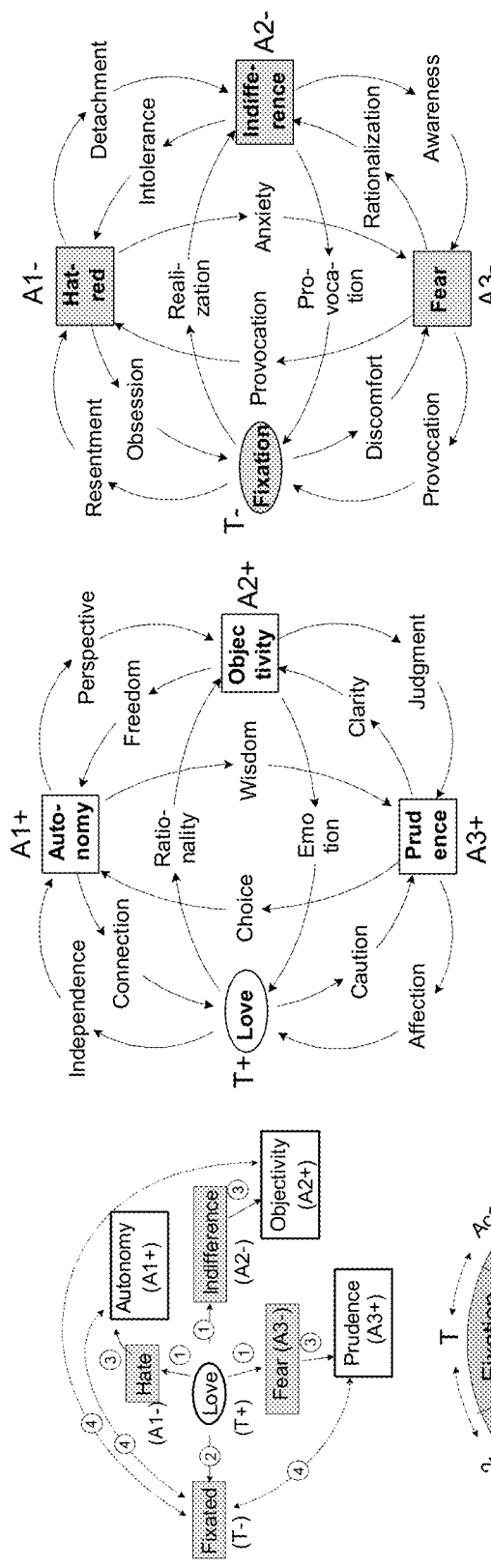
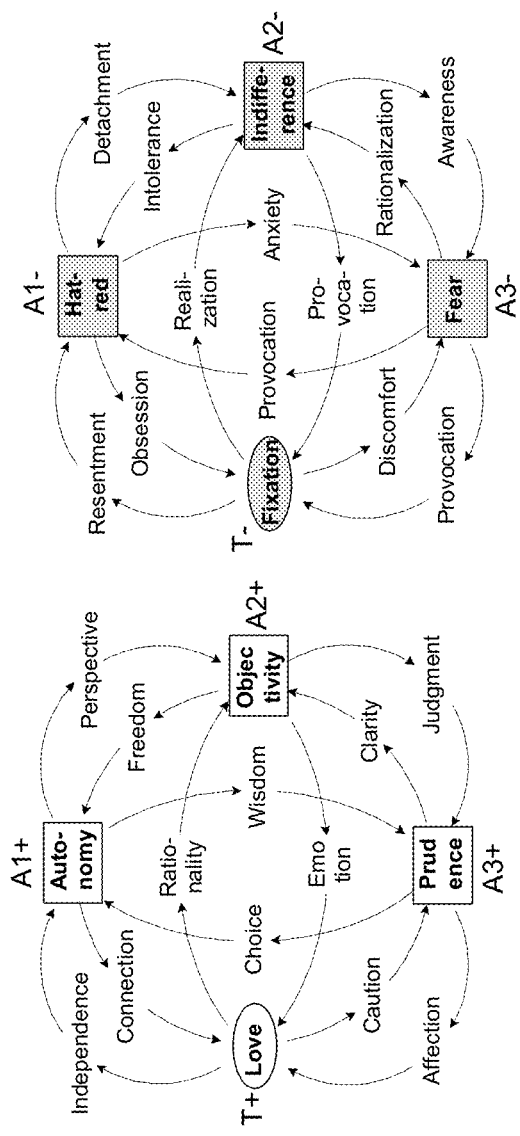
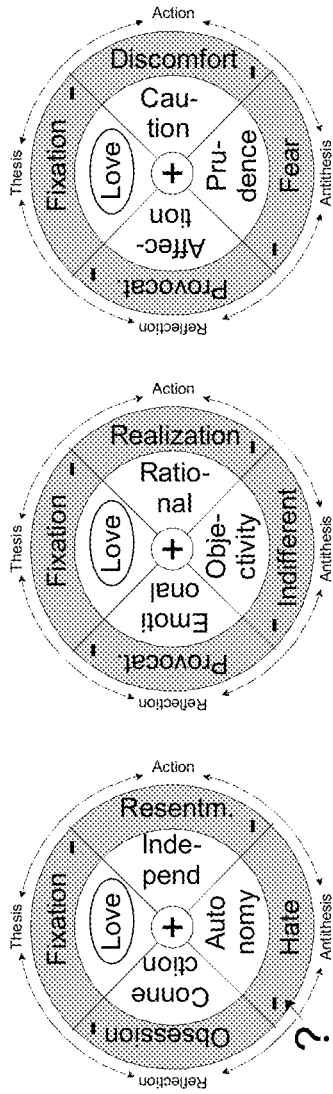
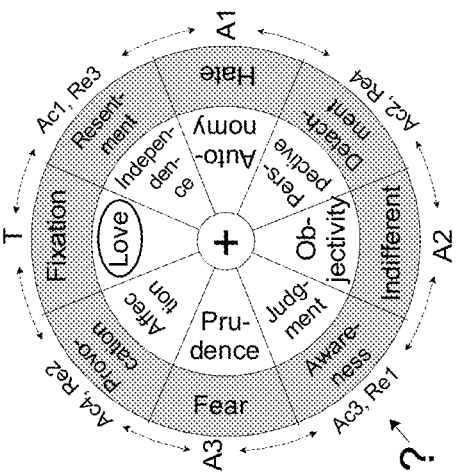
FIG. 11C
FIG. 11B
FIG. 11A
FIG. 11G
FIG. 11F
FIG. 11E
FIG. 11D

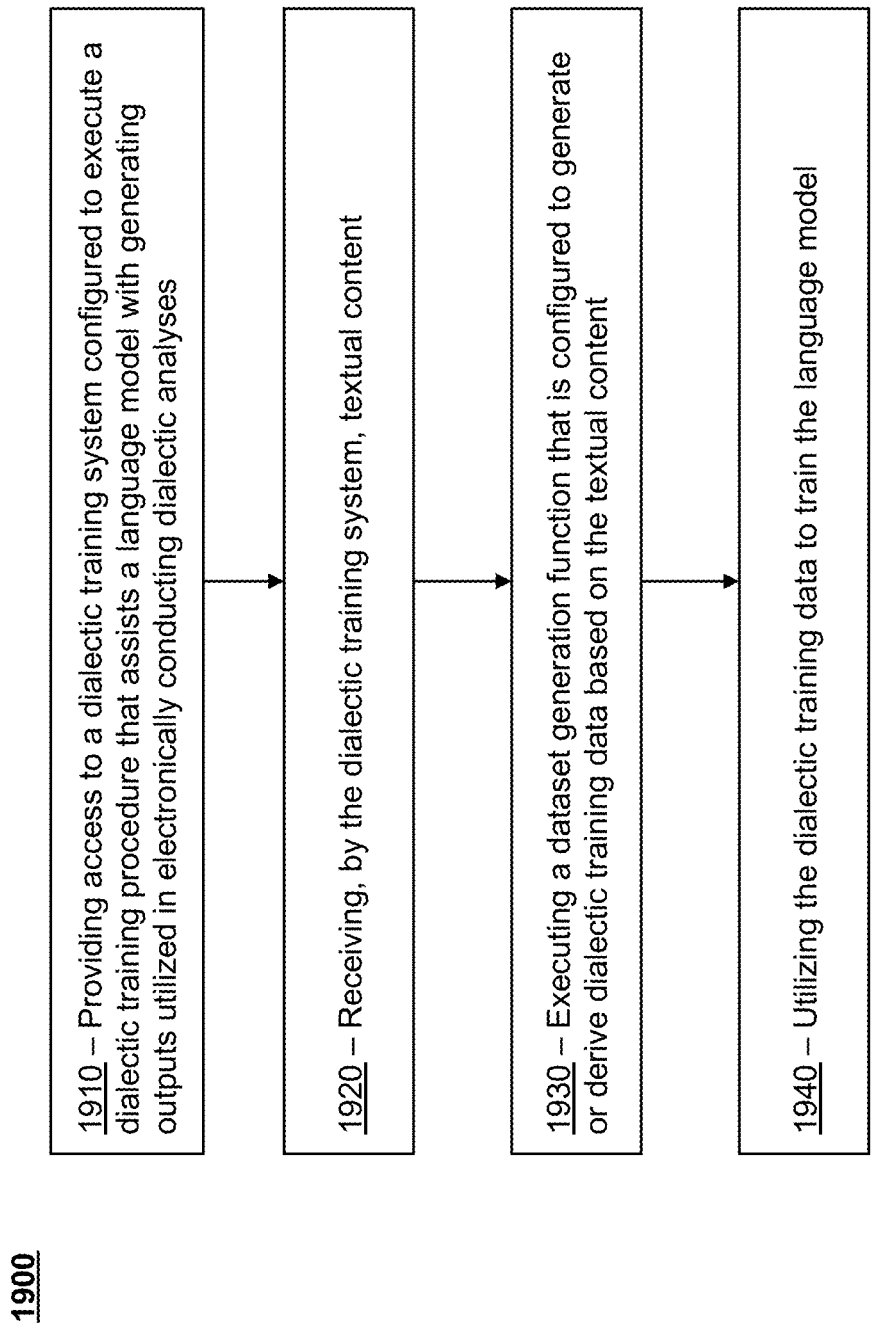

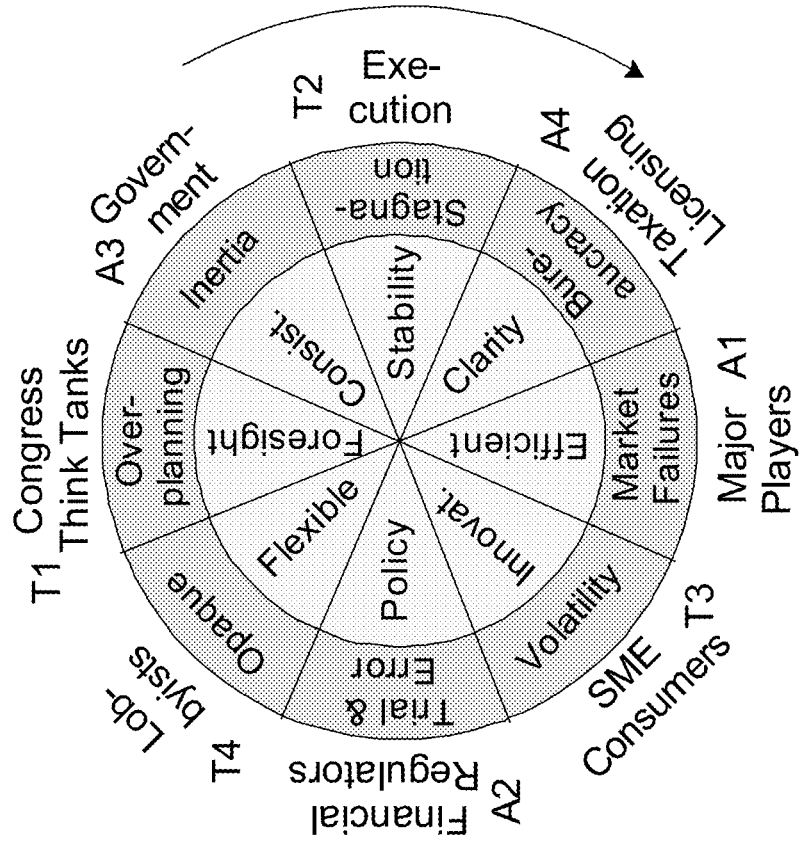
FIG. 26C
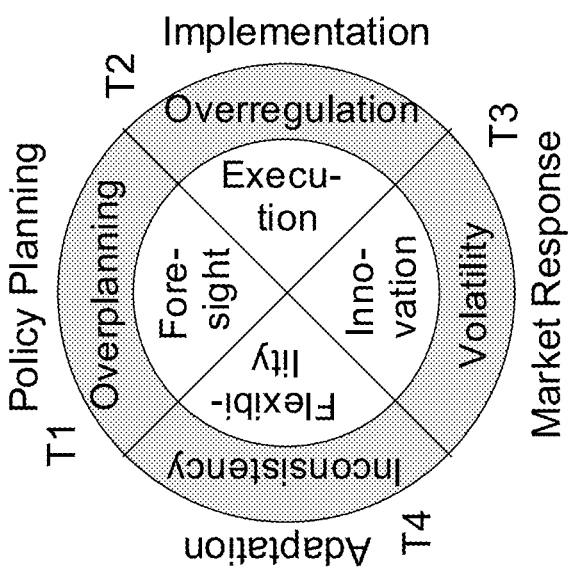
FIG. 26A
FIG. 26B

INTEGRATION OF MACHINE LEARNING MODELS WITH DIALECTICAL LOGIC FRAMEWORKS

CROSS-REFERENCE TO RELATED APPLICATIONS

This application is a continuation-in-part of U.S. patent application Ser. No. 18/677,875 filed on May 30, 2024, which is a continuation-in-part of U.S. patent application Ser. No. 18/631,009 filed on Apr. 9, 2024, which claims benefit of, and priority to, U.S. Provisional Patent Application No. 63/598,074 filed on Nov. 11, 2023. The contents of the aforementioned applications are herein incorporated by reference in their entireties.

TECHNICAL FIELD

This disclosure relates to improved systems, methods, and techniques for integrating dialectical logic frameworks with language models and/or other deep learning models. In certain embodiments, a dialectic training system is provided that enhances the ability of language models to generate responses for usage in performing dialectic analyses. In certain embodiments, a communication exchange between a dialectic logic engine and one or more language models enables dialectic analyses to be applied on input strings and one or more dialectically derived outputs to be generated. In some embodiments, the systems, methods, and techniques described herein serve to synthesize cognitive science, analytical philosophy, and artificial intelligence (AI) to generate dialectical outputs for a variety of use cases.

BACKGROUND

Dialectical theories, such as universal dialectics, provide a philosophical framework for examining the dynamic interplay of opposing forces or contradictions inherent in all phenomena. Dialectics emphasizes the dynamic interplay of opposing forces or contradictions in various domains, including cognition, society, and nature. It examines how these contradictions generate tension, leading to change and development over time. Dialectical thinking often involves qualitative analysis, conceptual frameworks, and philosophical reflection to understand the complexities of reality.

By embracing dialectical thinking, individuals can gain deeper insights into the complexities of reality, enabling them to navigate change more effectively and understand the underlying patterns shaping society, politics, nature, and many other subjects. The benefits of dialectical theory lie in its ability to foster critical thinking, facilitate informed decision-making, and empower individuals to enact positive transformations in their lives and communities.

When humans endeavor to apply dialectics, they often encounter several pitfalls. One common pitfall is reducing complex issues to simplistic binary oppositions. This oversimplification fails to capture the nuances and complexities of reality, leading to a superficial understanding of the dialectical process. Another common pitfall relates to the tendency of individuals to selectively interpret evidence to confirm their pre-existing beliefs or biases, rather than engaging in objective analysis. This confirmation bias can hinder genuine dialectical inquiry by reinforcing existing viewpoints without critically evaluating opposing perspectives. Another common pitfall can arise in scenarios where an individual fails to consider the broader social, historical, and cultural context, which can often result in incomplete or distorted interpretations of contradictions and their resolution. Additionally, while dialectics acknowledges the role of conflict and contradiction in driving change, an excessive focus on conflict may overlook areas of cooperation, compromise, and synthesis. Ignoring cooperative aspects of dialectical processes can lead to a pessimistic view of human interactions and social change. For these and other reasons, humans often are not able to perform dialectical analyses in an objective manner.

In recent years, the emergence of AI language models has caused excitement worldwide due to their transformative potential in revolutionizing natural language processing, content generation, and conversational interfaces across diverse domains and industries. These models excel at processing and generating text based on vast amounts of data they have been trained on. They can provide quick and accurate responses to queries, generate creative content, and assist with various language-related tasks.

Notably, however, AI language models do not consider dialectics in their processing or generation of text. This is because dialectics involves complex philosophical concepts related to the dynamic interplay of opposing forces or contradictions, which go beyond the scope of what current AI language models are designed to understand and incorporate into their responses. Additionally, the outputs generated by AI language models often include various types of biases, which, in many cases, can be attributed to the datasets utilized to train the models. Like human bias, AI-generated bias can negatively impact attempts at performing true, objective dialectic analyses.

In view of the foregoing, there is a need for a technological framework that is capable of conducting objective dialectic analyses in an automated manner and which overcomes the pitfalls described above.

BRIEF DESCRIPTION OF DRAWINGS

To facilitate further description of the embodiments, the following drawings are provided, in which like references are intended to refer to like or corresponding parts, and in which:

FIG. 4A is a block diagram illustrating exemplary dialectic parameters according to certain embodiments;

FIG. 4B is a block diagram illustrating exemplary dialectic outputs that can be generated by a dialectic analysis system according to certain embodiments;

FIG. 5 is a table identifying exemplary parameter constraint conditions that can be applied to improve the precision or accuracy of dialectic parameters according to certain embodiments;

FIG. 6A is a diagram illustrating an exemplary process for deriving or processing dialectic parameters according to certain embodiments;

FIG. 6B is a diagram illustrating an exemplary process for deriving or processing dialectic parameters according to certain embodiments;

FIG. 6C is a diagram illustrating an exemplary process for deriving or processing dialectic parameters according to certain embodiments;

FIG. 6D is a diagram illustrating an exemplary process for deriving or processing dialectic parameters according to certain embodiments;

FIG. 6E is an exemplary design for a dialectic wheel according to certain embodiments;

FIG. 6F is an exemplary design for a condensed dialectic wheel according to certain embodiments;

FIG. 6G is a diagram illustrating an exemplary process for deriving or processing dialectic parameters according to certain embodiments;

FIG. 11A is an exemplary procedure associated with generating poly-circular graphs according to certain embodiments;

FIG. 11B is an exemplary procedure associated with generating poly-circular graphs according to certain embodiments;

FIG. 11C is an exemplary procedure associated with generating poly-circular graphs according to certain embodiments;

FIG. 11D is an exemplary poly-circular graph according to certain embodiments;

FIG. 11E is an exemplary poly-circular graph according to certain embodiments;

FIG. 11F is an exemplary poly-circular graph according to certain embodiments;

FIG. 11G is an exemplary poly-circular graph according to certain embodiments;

FIG. 19 is a flow diagram illustrating an exemplary method according to certain embodiments;

FIG. 26A illustrates a first stage of constructing an exemplary dialectic or reference wheel according to certain embodiments;

FIG. 26B illustrates a second stage of constructing an exemplary dialectic or reference wheel according to certain embodiments;

FIG. 26C illustrates a third stage of constructing an exemplary dialectic or reference wheel according to certain embodiments.

Figure 1A:
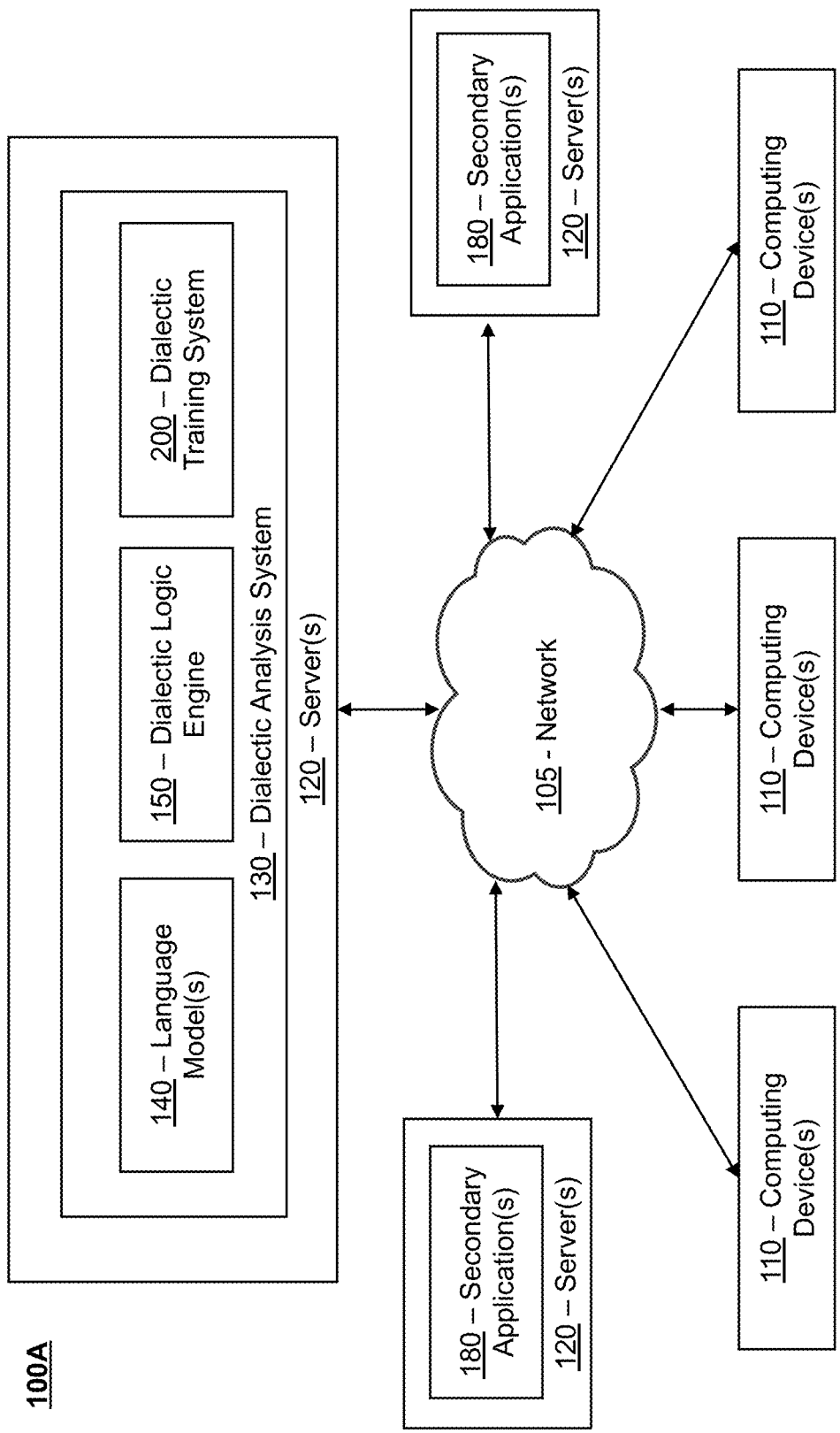
FIG. 1A is a diagram of an exemplary system according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION OF EXEMPLARY EMBODIMENTS

The present disclosure relates to technological frameworks for electronically executing dialectical analyses, as well as related to systems, methods, apparatuses, computer program products, and techniques for the same. These technological frameworks can leverage outputs from artificial intelligence (AI), machine learning, and/or deep learning models to automate performance of the dialectical analyses.

In certain embodiments, a dialectic analysis system comprises a dialectic logic engine that includes, or communicates with, one or more language models. The dialectic logic engine can be configured to execute various programmatic procedures or functions to perform a dialectic analysis on an input string, or multiple input strings, and generate one or more dialectic outputs corresponding to the input string. In doing so, the dialectic logic engine initiates communication exchanges with one or more language models, such as one or more generative large language models (LLMs), to elicit various text string responses which, in turn, are utilized to derive or generate the dialectic outputs. As explained in further detail below, the dialectic analysis can generate numerous types of dialectic outputs, and these dialectic outputs can used to enhance functionalities and decision-making capabilities for various types of systems and applications.

In certain embodiments, the dialectic logic engine can be deployed as an intermediary processing layer that is situated between client devices (e.g., devices hosting secondary applications or operated by end-users) and an AI system (e.g., which may include one or more generative language models). Because current AI systems are not capable of conducting dialectical analyses, the dialectic logic engine can manipulate or control the AI system to generate various types of content related to conducting dialectic analyses and can impose various constraints on the AI system to improve the accuracy and precision of the content. When requests are received from client devices to conduct dialectic analyses on input strings, these requests are initially transmitted to the intermediary processing layer, and the dialectic logic engine executes a programmatic process that initiates a communication exchange with the AI system and controls the AI system to produce various types of content in connection with performing dialectical analyses on the input strings. The intermediary processing layer then returns the dialectic outputs derived through the programmatic process to the client devices.

In some embodiments, the communication exchanges between the dialectic logic engine and the one or more language models enable the dialectic logic engine to ascertain a plurality of dialectic parameters that are used to generate the dialectic outputs corresponding to an input string. Each of the dialectic parameters can correspond to strings that aid the dialectic logic engine with performing a dialectic analysis corresponding to the input string. Examples of dialectic parameters that can be elicited or obtained via the communication exchanges between the dialectic logic engine and the one or more language models can include, inter alia, a thesis parameter (T), antithesis parameter (A), positive thesis parameter (T+), negative thesis parameter (T−), positive antithesis parameter (A+), negative antithesis parameter (A−), action parameter (Ac), positive action parameter (Ac+), negative action parameter (Ac−), reverse action parameter (Re), a positive reverse action parameter (Re+), and/or a negative reverse action parameter (Re−). Other types of dialectic parameters also may be elicited or obtained via the communication exchanges between the dialectic logic engine and the one or more language models.

In some embodiments, the algorithmic or programmatic procedure executed by the dialectic logic engine may determine which dialectic parameters are needed to generate a desired dialectic output and/or an order in which each of the dialectic parameters are to be obtained (e.g., because certain dialectic parameters may be utilized to derive other dialectic parameters). For each of the dialectic parameters, the dialectic logic engine can generate a custom prompt designed to elicit a corresponding dialectic parameter from the one or more language models. The dialectic logic engine can use some or all of the dialectic parameters to generate or synthesize one or more dialectic outputs.

In certain embodiments, the dialectic logic engine may execute a causality analysis process to examine concepts and their underlying causal relationships. This process may begin by deriving a concept parameter from an input string, initiating a communication exchange with a language model to generate archetypical association parameters that represent fundamental building blocks or quintessential ideas related to the concept parameter. The dialectic logic engine may store these parameters in a mapping schema, which may define relationships among them. Additionally, the dialectic logic engine may derive supplemental parameters to further expand the analysis. These supplemental parameters may include intermediate parameters, which may identify transitions between adjacent archetypical association parameters, and opposition parameters, which may represent contrasting or balancing elements. The mapping schema may store all these parameters along with their relationships, potentially arranging them in concentric circular layers with defined positions and constraints. This schema may serve as a foundation for generating various dialectic causality outputs. Such outputs may include dialectic wheels, tables, graphs, or natural language explanations that visualize or describe the relationships and transformations associated with the analyzed concept.

The types of dialectic outputs generated by the dialectic logic engine can vary. In one example, the dialectic outputs may include control statements which combine a portion of the dialectic parameter values derived for an input string into a statement based on a set of constraints and established relationships among the dialectic parameters. In other examples, the dialectic outputs may include parameter synopses relating to and/or comprising one or more of the dialectic parameters derived from an input string. In other examples, the dialectic outputs may include dialectic wheels that visualize the dialectic parameters (and/or relationships among the dialectic parameters) in an infographic or other graphical display. In further examples, the dialectic outputs can comprise interrogation queries that present questions pertinent to a subject or thesis of the input string. In further examples, the dialectic outputs can comprise detailed dialectic analyses related to the input strings and/or duality evaluation strings that assess the pros and cons associated with the input strings. These are other exemplary dialectic outputs are described in further detail below.

Because responses produced by language models can lack precision or accuracy in many cases, the dialectic logic engine can store a set of constraint conditions that serve to check the accuracy of responses and assess initial values derived for the dialectic parameters. The constraint conditions can be enforced in various contexts to improve the quality of the dialectic analyses and/or outputs generated by the analyses. In some examples, the constraint conditions can be enforced on responses generated by the language model in connection with deriving the dialectic parameters. These parameter constraint conditions can define relationships among the dialectic parameters which can be utilized to check the accuracy of the values generated by the language models for the dialectic parameters. In other examples, the constraint conditions can be enforced on control statements and/or other dialectic outputs generated by the language model. In scenarios where one or more constraint conditions are violated, the dialectic logic engine can generate additional prompts to query the language model for revised or updated values for the dialectic parameters and/or dialectic outputs until final values are obtained that satisfy all applicable constraint conditions. In this manner, the constraint conditions establish boundaries on the responses generated by the language model and refine the precision, accuracy, and reliability of the values utilized to generate the dialectic parameters and/or dialectic outputs.

In certain embodiments, the precision, accuracy, and reliability of the dialectic parameters and/or dialectic outputs can be further enhanced using bias evaluation functions executed by the dialectic logic engine. In some cases, sentiment analysis and/or other bias detection techniques can be applied to assess or quantify the level of bias in responses generated by the language models. In the event that responses produced by the language models include an unacceptable level of bias, the dialectic logic engine can communicate with the language models to obtain alternative response strings for usage in conducting the dialectical analyses described herein.

In certain embodiments, a dialectic training system is provided which executes a training procedure on the language model design to extend the capabilities of the language model to dialectic domains. The training procedure can be applied to fine-tune, create, or develop a language model that has enhanced capabilities with respect to generating responses used in conducting dialectic analyses. As explained below, various types of training data and training procedures can be applied to the language enhance to improve the precision, accuracy, and reliability of the language model in generating responses corresponding to dialectic parameters, dialectic outputs, and/or other text content used in performing dialectic analyses.

In some embodiments, the input strings analyzed by the dialectic analysis system are transmitted to the dialectic analysis system by end-users operating computing devices and, after the input strings are processed by the dialectic analysis system, the dialectic analysis system transmits one or more dialectic outputs to the computing devices for presentation to the end-users. This permits the end-users to query the dialectic analysis system to obtain dialectical analyses of any desired subject.

Additionally, in some embodiments, the dialectic analysis system can communicate with, and provide dialectic outputs to, one or more secondary applications to enhance the decision-making and/or understanding capabilities of the secondary applications. In some examples, the dialectic outputs derived or generated by the dialectic analysis system can utilized to enhance the functionalities of scientific research applications, critical thinking applications, environmental studies applications self-help applications, conflict resolution or mediation applications, historiography applications, and/or many other types of systems and applications.

In some configurations, the dialectic analysis system can be an application framework that is stored separately from the secondary applications, and which communicates with the secondary applications over a network (e.g., via one or more APIs provided by the dialectic analysis system). In other configurations, the dialectic analysis system can be integrated directly with the secondary applications (e.g., such as a subroutine or component of the secondary applications).

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Exemplary Systems & Architectures

Figure 1B:
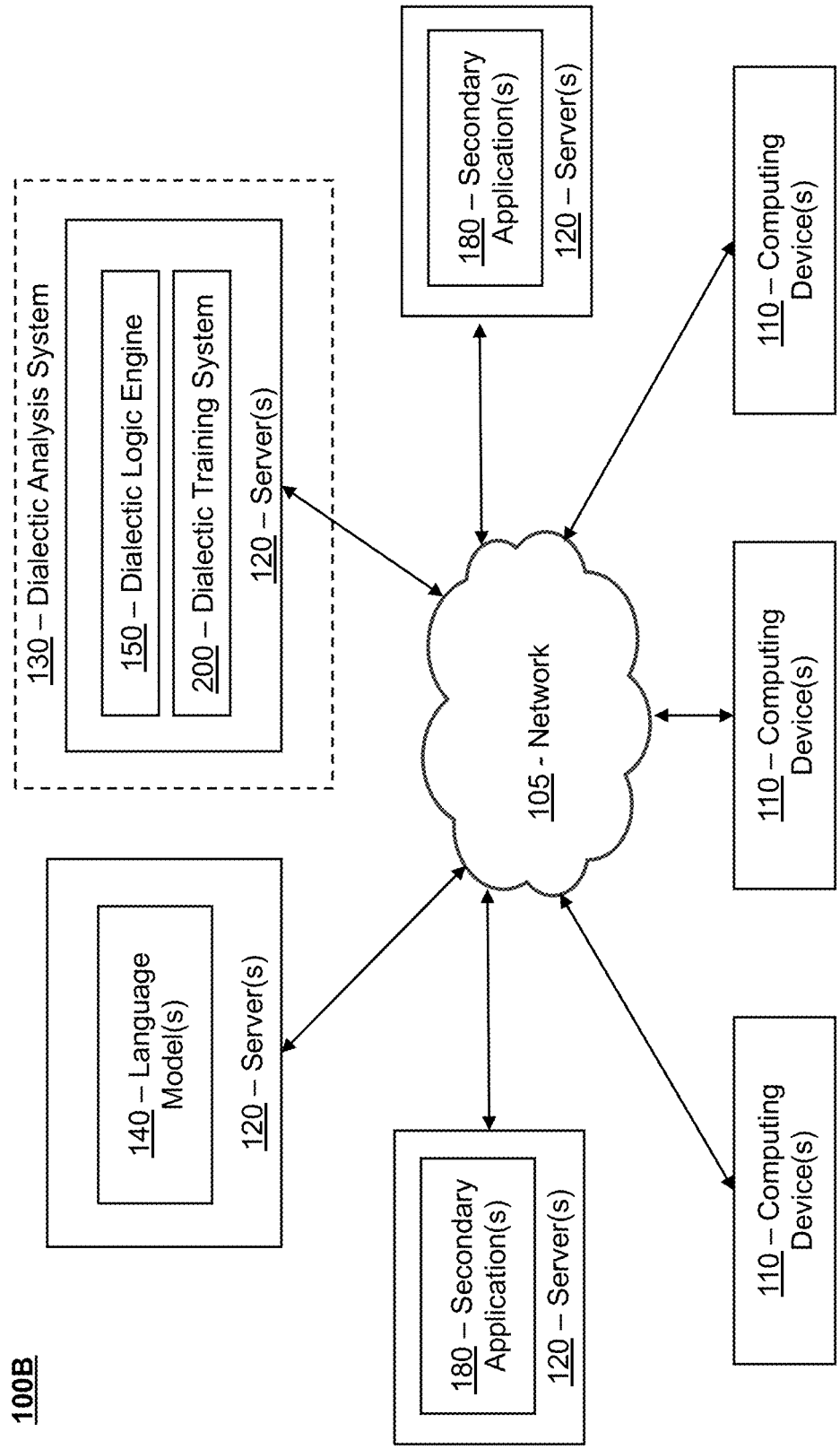
FIG. 1B is a diagram of another exemplary system according to certain embodiments.
Figure 2:
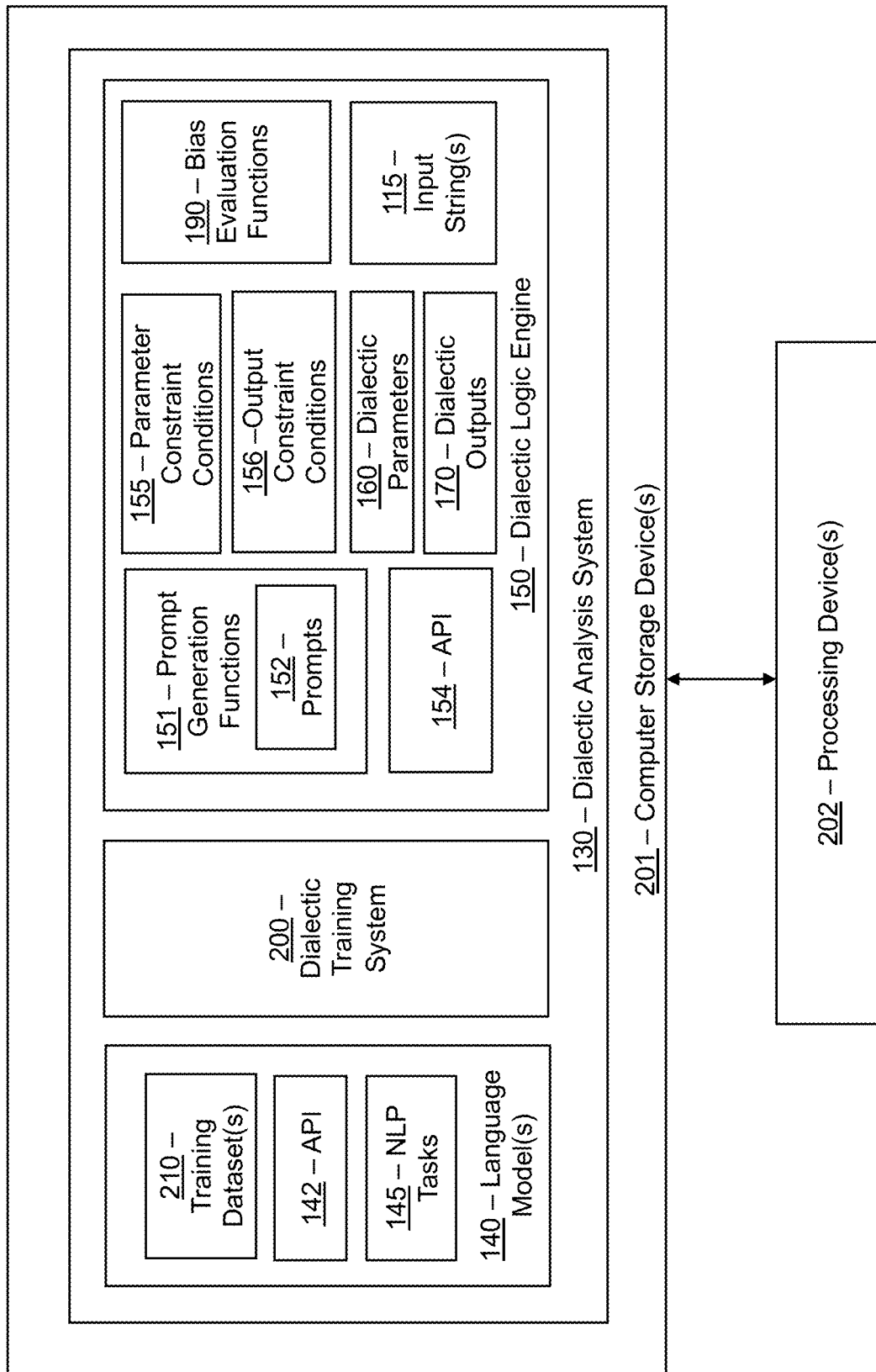
FIG. 2 is a block diagram demonstrating exemplary components of a dialectic analysis system according to certain embodiments.

FIG. 1A is a diagram of an exemplary system 100A in accordance with certain embodiments. In this system 100A, a dialectic logic engine 150, a language model 140, and a dialectic training system 200 are stored or hosted on the same server system. FIG. 1B is a diagram of another exemplary system 100B in accordance with certain embodiments. In this system 100B, the dialectic logic engine 150 and the dialectic training system 200 are stored on or hosted by a server system that is separate from the server system that stores or hosts the language model 140, are the separate server systems communicate with each other over a network 105. FIG. 2 is a block diagram illustrating exemplary features and/or functions associated with the dialectic logic engine 150 and the language model 140. FIGS. 1A-1B and 2 are jointly discussed below.

The system (100A, 100B) comprises one or more computing devices 110 and a plurality of servers 120 that are in communication over a network 105. A dialectic analysis system 130 is stored on, and executed by, one or more of the servers 120. One or more secondary applications 180 also may be stored on, and executed by, one or more of the servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, a satellite network, and/or other types of networks.

All the components illustrated in FIG. 1A-1B, including the computing devices 110, servers 120, dialectic analysis system 130, language model 140, dialectic logic engine 150, and/or dialectic training system 200 can be configured to communicate directly with each other and/or over the network 105 via wired or wireless communication links, or a combination of the two. Each of the computing devices 110, servers 120, dialectic analysis system 130, language model 140, dialectic logic engine 150, and/or dialectic training system 200 can include one or more communication devices, one or more computer storage devices 201, and one or more processing devices 202 that are capable of executing computer program instructions.

The one or more processing devices 202 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 202 can be configured to execute any computer program instructions that are stored or included on the one or more computer storage devices 201 to implement any functionalities of the dialectic analysis system 130, language model 140, dialectic logic engine 150, dialectic training system 200, and/or secondary applications 180 described in this disclosure.

The one or more computer storage devices 201 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices 201 may be physical, non-transitory mediums. The one or more computer storage devices 201 can store instructions for executing any of the functionalities of the dialectic analysis system 130, language model 140, dialectic logic engine 150, dialectic training system 200, and/or secondary applications 180 described herein.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, servers 120, dialectic analysis system 130, language model 140, dialectic logic engine 150, dialectic training system 200, and/or secondary applications 180 to be connected to the Internet and/or other networks. The modem devices can permit bi-directional communication between the Internet (and/or other network) and the computing devices 110, server(s) 120, dialectic analysis system 130, language model 140, dialectic logic engine 150, dialectic training system 200, and/or secondary applications 180. In certain embodiments, one or more router devices and/or access points may enable the computing devices 110, server(s) 120, dialectic analysis system 130, language model 140, dialectic logic engine 150, dialectic training system 200, and/or secondary applications 180 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, server(s) 120, dialectic analysis system 130, language model 140, dialectic logic engine 150, dialectic training system 200, and/or secondary applications 180 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the computing devices 110 mentioned above. The one or more servers 120 also can comprise one or more mainframe computing devices, one or more cloud servers, and/or one or more virtual servers. In some embodiments, one or more servers 120 hosting the dialectic analysis system 130, language model 140, dialectic logic engine 150, and/or dialectic training system 200 can be configured to execute web servers and can enable these components to communicate with the computing devices 110, the servers 120 hosting the secondary applications 180, and/or other devices over the network 105 (e.g., over the Internet).

Additionally, while the dialectic analysis system 130, language model 140, dialectic logic engine 150, dialectic training system 200, and/or secondary applications 180 can be stored on, and executed by, the one or more servers 120, these components additionally, or alternatively, can be stored on, and executed by, the one or more computing devices 110. Thus, in some embodiments, the dialectic analysis system 130, language model 140, dialectic logic engine 150, dialectic training system 200, and/or secondary applications 180 can be stored as server application on one or more servers 120 and, in other embodiments, can be stored as a local application on a computing device 110, or integrated with a local application stored on a computing device 110.

Additionally, in some embodiments, each of the dialectic analysis system 130, language model 140, dialectic logic engine 150, dialectic training system 200, and/or secondary applications 180 can be implemented as a combination of a front-end application (e.g., which is stored on a computing device 110) and a back-end application (e.g., which is stored on one or more servers 120). All functionalities of the dialectic analysis system 130, language model 140, dialectic logic engine 150, dialectic training system 200, and/or secondary applications 180 described herein can be executed by the front-end application, back-end application, or a combination of both.

The components of the system can be deployed in various configurations. FIG. 1A illustrates an exemplary configuration in which the language model 140, the dialectic logic engine 150, and the dialectic training system 200 are stored on the same server system. This configuration can be beneficial in scenarios where a single entity is responsible for managing the language model 140, the dialectic logic engine 150, and the dialectic training system 200, or in scenarios where the language model 140 is directly integrated within the dialectic analysis system 130. FIG. 1B illustrates another exemplary configuration in which the language model 140 is stored a server system that is separate from the server system that includes the dialectic logic engine 150 and the dialectic training system 200. This configuration can be beneficial in scenarios where separate entities manage the language model 140 and the dialectic analysis system 130, or in scenarios where a provider of the dialectic logic engine 150 or the dialectic training system 200 desires to utilize a third-party language model provided by a separate entity.

In certain embodiments, the dialectic analysis platform 130 provides secondary applications 180 and/or end-users operating computing devices 110 with access to the dialectic logic engine 150 described herein. In some examples, the secondary applications 180 and/or end-users can query the dialectic logic engine 150 (e.g., by submitting input strings 115 to the dialectic logic engine 150) and the dialectic logic engine 150 can return responses to secondary applications 180 and/or end-users that include one or more of the dialectic outputs 170 described herein.

In certain embodiments, the one or more computing devices 110 can enable end-users to access the dialectic analysis system 130 over the network 105 (e.g., over the Internet via a web browser application, mobile application, desktop application, etc.). In some exemplary scenarios, an end-user can utilize a computing device 110 to transmit an input string 115 (or multiple input strings 115) to the dialectic analysis system 130 over the network 105. Each input string 115 may include a text string comprising one or more characters, one or more words, one or more sentences, etc. In response to receiving the input string 115, the dialectic logic engine 150 executes an algorithm or procedure to generate one or more dialectic outputs 170 corresponding to the input string 115. As explained throughout this disclosure, the algorithm or procedure executed by dialectic logic engine 150 can communicate with one or more language models 140 to retrieve text strings or responses that are utilized in generating the one or more dialectic outputs 170. The one or more dialectic outputs 170 can then be transmitted over the network 105 to the computing device 110 operated by the end-user.

As explained in further detail below, the dialectic analysis system 130 can generate various types of dialectic outputs 170. In some cases, an end-user can utilize a computing device 110 to select or specify a particular type of dialectic output 170 that is desired. In response to receiving the selection (and the input string 115) from the end-user, the dialectic logic engine 150 can execute a particular algorithm or procedure that is specifically designed to generate the dialectic output 170 identified by the end-user's selection.

The dialectic analysis system 130 also can receive requests from one or more secondary applications 180 to generate dialectic outputs 170 in a similar manner. These secondary applications 180 may correspond to systems, programs, or applications that can utilize the dialectic outputs 170 for downstream processing operations, such as to enhance the decision-making or analytical capabilities of the secondary applications 180. In some embodiments, the dialectic analysis system 130 may include an application programming interface (API) 154 that enables the secondary applications 180 to query the dialectic analysis system 130 and receive dialectic outputs 170 in response to those queries.

Figures 4C, 4D:
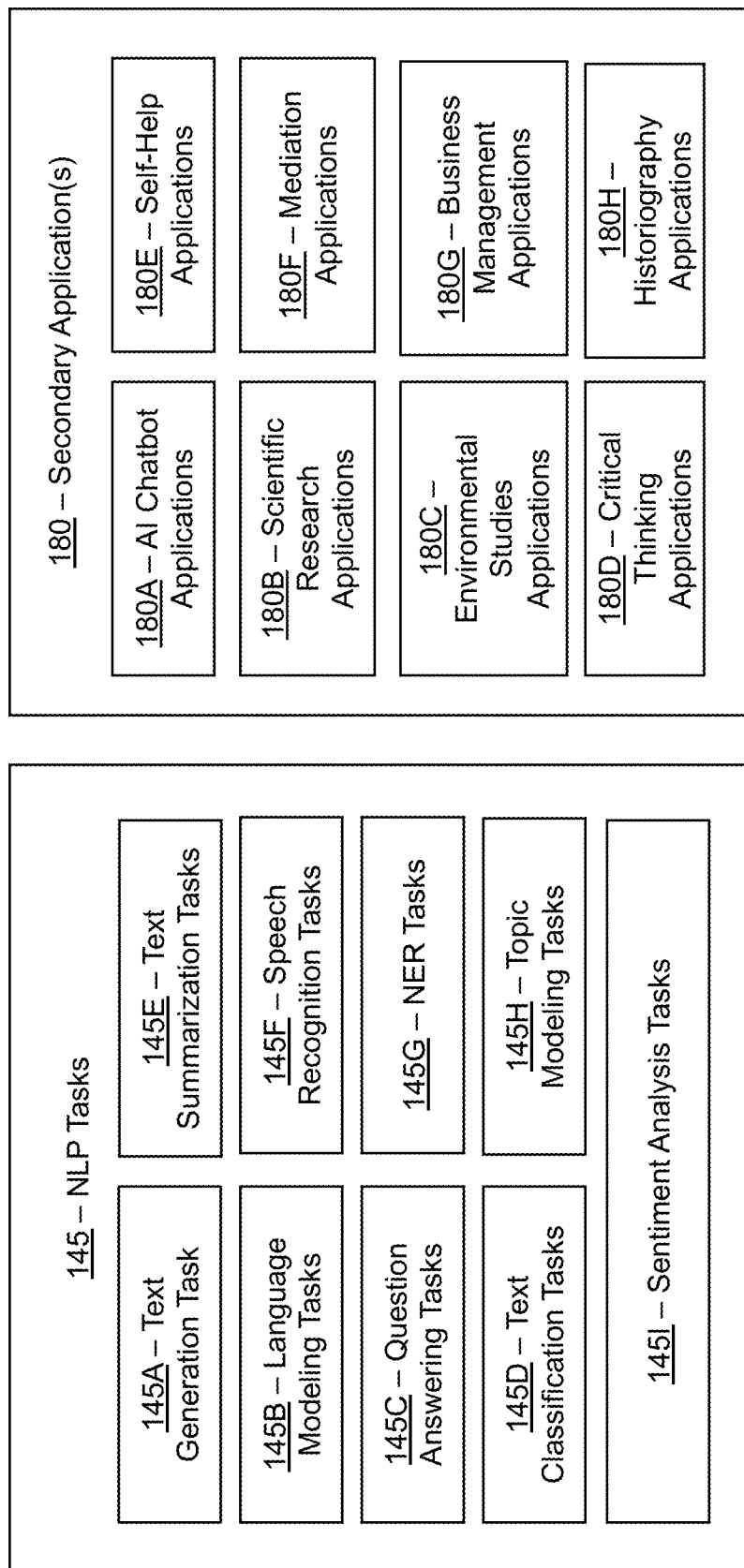
FIG. 4C is a block diagram illustrating exemplary natural language processing (NLP) tasks that can be executed by a language model according to certain embodiments.
FIG. 4D is a block diagram illustrating exemplary secondary applications according to certain embodiments.

As shown in FIG. 4D, examples of secondary applications 180 can include, inter alia, AI chatbot applications 180A, scientific research applications 180B, environmental applications 180C, critical thinking applications 180D, self-help applications 180E, conflict resolution applications or mediation applications 180F, business management applications 180G, historiography applications 180H, and/or many other types of systems and applications that can benefit from dialectical analyses. Many other types of secondary applications 180 also can benefit from the dialectic outputs 170.

Returning to FIGS. 1A-1B and 2, these secondary applications 180 can transmit an input string 115 (or multiple input strings 115) to the dialectic analysis system 130 (e.g., via API 154) and receive dialectic outputs 170 generated by the dialectic analysis system 130 (e.g., via API 154). The dialectic outputs 170 received from the dialectic analysis system 130 can then be utilized by the secondary applications 180 for various purposes (e.g., to enhance mediation functions, conflict resolution functions, scientific functions, critical thinking functions, etc.).

In some embodiments, the dialectic analysis system 130 can be separate or independent from the secondary applications 180. For example, the dialectic analysis system 130 and secondary applications 180 may be stored on separate devices and/or managed by different entities. In other embodiments, the dialectic analysis system 130 can be directly integrated with one or more secondary applications 180. For example, the dialectic analysis system 130 may represent as subsystem or component that is included within a secondary application 180.

As explained throughout this disclosure, the dialectic logic engine 150 can store and execute various programmatic procedures or functions associated with applying dialectic analyses to input strings 115 and/or generating dialectic outputs 170 corresponding to the input strings 115. The dialectic logic engine 150 can store rules, routines, scripts, programming logic, protocols, and/or software-implemented algorithms for defining the dialectic analyses. Additionally, these rules, routines, scripts, programming logic, protocols, and/or software-implemented algorithms can be configured to communicate with at least one language model 140 to elicit textual responses utilized in performing the dialectic analyses on the input strings 115. Numerous variations of the rules, routines, scripts, programming logic, protocols, and/or software-implemented algorithms are described throughout this disclosure.

Various types of language models 140 can be utilized in connection with performing the dialectic analyses described in this disclosure. In some examples, a language model 140 can include a large language model (LLM) and/or generative AI model, such as a GPT model, BERT model, etc. The discussion below provides exemplary details and configurations of the language models 140 that can be utilized to implement the techniques or functions described herein.

In certain embodiments, the dialectic analysis system 130 includes a dialectic training system 200 that can be utilized to fine-tune or develop a language model 140 to generate responses utilized in performing the dialectic analyses described herein with greater accuracy and precision. Further details of the dialectic analysis system 130 are provided below.

For simplicity purposes, certain portions of this disclosure describe the dialectic logic engine 150 as communicating with a single language model 140 to execute dialectic analyses, ascertain dialectic parameters 160, generate dialectic outputs 170, and/or for other purposes. However, it should be understood that, in some cases, the dialectic logic engine 150 can be configured to communicate with a plurality of language models 140 (e.g., two or more language models 140) to perform these functions. In some examples, the dialectic logic engine 150 may communicate with a first language model 140 to derive certain types of data (e.g., the dialectic parameters 160) and one or more additional language models to derive other types of data (e.g., dialectic outputs 170). In other examples, the dialectic logic engine 150 may communicate with two or more language models 140 to derive a single piece of data (e.g., one of the dialectic parameters 160 and/or one of the dialectic outputs 170). Thus, any portion of this disclosure that describes communications with a single language model 140 can be interpreted as communicating with one or more language models 140.

The system configurations described herein are provided as examples to demonstrate environments in which embodiments described herein can be deployed. Numerous modifications and variations to the disclosed embodiments are possible, and the techniques described herein can be implemented in many other contexts and environments.

Exemplary Dialectic Parameters

The dialectic logic engine 150 can select and execute various algorithms or procedures for generating or deriving a desired dialectic output 170. While the specific algorithm or procedure executed by the dialectic logic engine 150 to generate each type of dialectic output 170 can vary, each of the algorithms or procedures can involve communicating with a language model 140 to derive one or more dialectic parameters 160.

These dialectic parameters 160 derived by the dialectic analysis system 130 can provide a foundation for generating the various types of dialectic outputs 170. In some examples, a subset of the dialectic parameters 160 can correspond to viewpoints, arguments, and/or propositions that are set forth for consideration in performing a dialectical analysis, and another subset of dialectic parameters 160 can correspond to actions, transformations, or relationships among the viewpoints, arguments, and/or propositions. In some embodiments, the dialectic logic engine 150 may store variables corresponding to each of the dialectic parameters 160 and these variables can be assigned text string values related to a dialectic analysis. The dialectic logic engine 150 can store, inter alia, procedures for deriving these dialectic parameters 160 through communication exchanges with a language model 140, as well as rules of deriving dialectic outputs 170 by assembling or synthesizing the dialectic parameters 160.

FIG. 4A is a block diagram illustrating exemplary dialectic parameters 160 that can be generated or derived by the dialectic logic engine 150. In some embodiments, the dialectic parameters 160 include a thesis parameter 160A (or "T"), an antithesis parameter 160B (or "A"), a positive thesis parameter 160C (or "T+"), a negative thesis parameter 160D (or "T−"), a positive antithesis parameter 160E (or "A−+"), a negative antithesis parameter 160F (or "A−"), an action parameter 160G (or "Ac"), a positive action parameter 160H (or "Ac−+"), a negative action parameter 160I (or "Ac−"), a reverse action parameter 160J (or "Re"), a positive reverse action parameter 160K (or "Re+"), and/or a negative reverse action parameter 160L (or "Re−"). Each of these dialectic parameters 160 are described below.

Thesis Parameter 160A (T): In general, this parameter can correspond to a textual string that includes a proposition, argument, or viewpoint that is put forward for consideration and examination, which is derived from an input string 115. The thesis parameter 160A can represents an initial position or claim in a dialectical process, which express a particular perspective or understanding of a subject presented in the input string 115. In many cases, the thesis parameter 160A can provide a basis for the exploration of contrasting ideas, counterarguments, and alternative viewpoints.

Antithesis Parameter 160B (A): In general, this parameter can correspond to a textual string that includes to a proposition, argument, or viewpoint that that opposes or contrasts with the thesis parameter 160A. In some cases, the antithesis parameter 160B proposes an alternative perspective or argument that challenges the assumptions or conclusions of the thesis parameter 160A. The antithesis parameter can serve to highlight contradictions, tensions, or limitations within the thesis parameter 160A.

Positive Thesis Parameter 160C (T+): In general, this parameter can correspond to a textual string that represents a positive aspect, proposition, argument, and/or viewpoint associated with the thesis parameter 160A.

Negative Thesis Parameter 160D (T-): In general, this parameter can correspond to a textual string that represents a negative aspect, proposition, argument, and/or viewpoint associated with the thesis parameter 160A.

Positive Antithesis Parameter 160E (A+): In general, this parameter can correspond to a textual string that represents a positive aspect, proposition, argument, and/or viewpoint associated with the antithesis parameter 160B.

Negative Antithesis Parameter 160F (A-): In general, this parameter can correspond to a textual string that represents a negative aspect, proposition, argument, and/or viewpoint associated with the antithesis parameter 160B.

Action Parameter 160G (Ac): In general, this parameter can correspond to a textual string that identifies an action, activity, deed, and/or operation that can transform or transition a thesis parameter 160A to an antithesis parameter 160B.

Positive Action Parameter 160H (Ac+): In general, this parameter can correspond to a textual string that identifies an action, activity, deed, and/or operation that can transform or transition a positive thesis parameter 160C to a positive antithesis parameter 160E (or which can transition a thesis parameter 160A or a negative thesis parameter 160D to a positive antithesis parameter 160E).

Negative Action Parameter 160I (Ac-): In general, this parameter can correspond to a textual string that identifies an action, activity, deed, and/or operation that can transform or transition a negative thesis parameter 160D to a negative antithesis parameter 160F (or which can transition a thesis parameter 160A or a positive thesis parameter 160C to a negative antithesis parameter 160F).

Reverse Action Parameter 160J (Re): In general, this parameter can correspond to a textual string that identifies an action, activity, deed, and/or operation that can transform or transition an antithesis parameter 160B to a thesis parameter 160A.

Positive Reverse Action Parameter 160K (Re+): In general, this parameter can correspond to a textual string that identifies an action, activity, deed, and/or operation that can transform or transition a positive antithesis parameter 160E to a positive thesis parameter 160C (or which can transition an antithesis parameter 160B or a negative antithesis parameter 160F to a positive thesis parameter 160C).

Negative Reverse Action Parameter 160L (Re-): In general, this parameter can correspond to a textual string that identifies an action, activity, deed, and/or operation that can transform or transition a negative antithesis parameter 160F to a negative thesis parameter 160D (or which can transition an antithesis parameter 160B or a positive antithesis parameter 160E to a negative thesis parameter 160D).

Each of the dialectic parameters 160 described in this disclosure can correspond to a text string of any length (e.g., a text string comprising one or more characters, one or more words, one or more sentences, etc.). As explained in further detail below, the dialectic logic engine 150 can transmit prompts to one or more language models 140 to generate the text strings corresponding to each of the dialectic parameters 160.

The above-mentioned dialectic parameters 160 are intended to be examples of variables that can be used in dialectical analysis. However, the dialectic logic engine 150 can be configured to derive many additional types of dialectic parameters 160 and/or can be configured to use alternative types of dialectic parameters 160. Additionally, other terms or labels can be applied to the aforementioned parameters (e.g., the "positive" thesis or antithesis referred to as a "constructive", "balanced", or "subtle" thesis or antithesis, the negative thesis or antithesis can be referred to as a "destructive", "exaggerated", "overdeveloped", or "extremist" thesis or antithesis, etc.).

Additionally, the types of dialectic parameters 160 used to generate each of the dialectic outputs 170 can vary. In some examples, all of the dialectic parameters 160 mentioned above may be ascertained and utilized to generate a dialectic output 170. In other examples, only one of the dialectic parameters 160 mentioned above may be utilized to generate a dialectic output 170. In further examples, a subset of the dialectic parameters 160 (e.g., the thesis parameter 160A and antithesis parameter 160B) may be utilized to generate a dialectic output 170.

Exemplary Prompt Generation Techniques

Returning to FIGS. 1A-1B and 2, the dialectic logic engine 150 can store and execute one or more prompt generation functions 151 configured to generate or create prompts 152 for querying the language model 140 to obtain text string responses for usage in performing dialectical analyses. Amongst other things, the prompt generation functions 151 can generate prompts 152 to obtain text strings corresponding to the dialectic parameters 160 and/or dialectic outputs 170. The prompt generation functions 151 can create custom prompts 152 for each dialectic analysis that is performed. Each of the prompts 152 may correspond to a natural language text string designed to elicit a specific response from the language model 140. In some examples, in response to receiving these prompts 152, the language model 140 generates text strings (e.g., corresponding to the dialectic parameters 160 and/or dialectic outputs 170) and returns the text strings to the dialectic logic engine 150.

In some embodiments, the language model 140 can be configured with AI chatbot functionalities and the dialectic logic engine 150 can transmit prompts 152 to the language model 140 (e.g., via API 142). Upon receiving the prompts 152, the language model 140 executes one or more NLP tasks 145 for analyzing, understanding, and/or interpreting the queries or commands and/or one or more NLP tasks 145 for generating outputs responsive to the prompts. The outputs generated by the language model 140 can be returned, or transmitted to, the dialectic logic engine 150 via the API 142.

As discussed throughout this disclosure, the dialectic logic engine 150 can transmit prompts 152 to the language model 140 for various purposes. During an initial processing of an input string 115, the dialectic logic engine 150 can transmit prompts 152 to obtain the dialectic parameters 160. Additionally, in later processing phases, the dialectic logic engine 150 may send prompts 152 to obtain responses that are used in generating the dialectic outputs 170. For each prompt 152, the language model 140 executes one or more NLP tasks 145 to generate text strings responsive to the query or command.

The dialectic logic engine 150 (or prompt generation functions 151) can store code for generating custom prompts 152 corresponding to each of the dialectic parameters 160. Below is a pseudocode example demonstrating how the dialectic logic engine 150 (or prompt generation functions 151) can generate prompts 152 for querying a language model 140 to generate certain dialectic parameters 160 (in this example, a thesis parameter 160A, antithesis parameter 160B, a positive thesis parameter 160C, and an action parameter 160G).

The type and configuration of the language model(s) 140 described herein can vary. Various types of language models 140 can be utilized by the dialectic analysis system 130. In some embodiments, the language model 140 can include a generative pre-trained transformer (GPT) model (e.g., a GPT-1, GPT-2, GPT-3, GPT-4, or subsequently developed GPT model). Additionally, or alternatively, the language model 140 can include a BERT (Bidirectional Encoder Representations from Transformers) model, an XLNet (Extra-Long Transformer Network) model, a RoBERTa (Ro-

---

Pseudocode Example 1

```
$thesisPrompt = "Identify a dialectical thesis for a dialectic analysis related to" + $inputString;
$thesisParameter = languageModel($thesisPrompt);
$antithesisPrompt = "Identify an antithesis for a dialectic analysis that includes a thesis of" + $thesisParameter;
$antithesisParameter = languageModel($antithesisPrompt);
$postiveThesisPrompt = "Identify a positive viewpoint or proposition associated with" + $thesisParameter;
$positiveThesisParameter = languageModel($postiveThesisPrompt);
$actionPrompt = "Identify an action that transforms" + $thesisParameter + "into" + $antithesisParameter;
$actionParameter = languageModel($actionPrompt);
```

Note:
Many different variations are possible and, in some embodiments, prompts may not mention any of abovementioned keywords, as for instance, the major thesis may be identified through this prompt: "Identify the major idea of the user's message". Likewise, identification of the antithesis through this prompt: "Identify the (semantic) opposition of this statement". Identifying Positive side: "Identify the constructively subtle side", Negative - "identify the exaggerated side", . . .

---

As demonstrated above, the prompts 152 can be concatenated with variables corresponding to input strings 115 and/or variables corresponding to dialectic parameters 160 obtained in earlier communication exchanges with the language model 140. Thus, in some cases, the prompts 152 used to elicit certain dialectic parameters 160 may be customized using content generated for other previously ascertained dialectic parameters 160 and, therefore, certain dialectic parameters 160 may need to be obtained before others. The algorithms or programmatic procedures executed by the dialectic logic engine 150 can guide the order in which the dialectic parameters 160 are ascertained.

In this manner, the dialectic logic engine 150 can obtain all the dialectic parameters 160 needed to formulate or a derive a desired dialectic output 170. As mentioned above, only a subset of dialectic parameters 160 may be needed to derive certain types of dialectic outputs 170. When the dialectic logic engine 150 receives an instruction to generate a particular type of dialectic output 170, the dialectic logic engine 150 executes a procedure that obtains the specific dialectic parameters 160 from the language model 140 which may be required to generate the dialectic output 170.

As explained throughout this disclosure, the prompt generation functions 151 can be utilized to generate prompts 152 for many other purposes. Amongst other things, the prompts 152 may be generated to obtain text strings corresponding to dialectic outputs 170. Prompts 152 also may be generated for assessing the accuracy or precision of previous responses generated by the language model 140 and ensuring the responses satisfy applicable constraint conditions. As described below, prompts 152 can be generated in many other scenarios and for many other purposes as well.

Exemplary Language Models

As described throughout this disclosure, the dialectic analysis system 130 can include, or communicate with a language model 140 to generate the dialectic parameters 160, dialectic outputs 170, and/or other parameters described within this disclosure.

bustly Optimized BERT pre-training approach) model, a DeBERTa (Decoding-enhanced BERT with disentangled attention) model, a CTRL (Conditional Transformer Language Model) model, and/or a T5 (Text-to-Text Transfer Transformer) model. These or other types of machine learning or AI language models can be used to implement the language model 140. Additionally, as mentioned above, the language model 140 can represent a single model in some embodiments and, in other embodiments, the language model 140 can be comprised of multiple learning models (including any combination of the aforementioned models).

In certain embodiments, the language model 140 can include a transformer neural network architecture that includes a self-attention mechanism, which allows the model to weigh the importance of different parts of a prompt input when generating its output or response. The self-attention mechanism allows the model to selectively focus on different parts of the input when generating its output or response, rather than relying on a fixed context window like other language models. Additionally, the transformer neural network architecture can include a series of layers, each of which applies self-attention and other types of neural network operations on a given input that is received. The layers can be arranged in a stacked configuration, such that the output of one layer is fed as input to the next layer, thereby allowing the model to gradually refine its representation of the input as it is processed through the layers.

Various types of training procedures can be utilized to train the language model 140. In some cases, one or more supervised or semi-supervised training procedures can be utilized to train the language model 140. Additionally, or alternatively, one or more unsupervised training procedures can be utilized to train the language model 140.

In some embodiments, the language model 140 is trained via a self-supervised training procedure that includes both an unsupervised training phase and a supervised training phase. The unsupervised training phase can include a pre-training step in which the learning model 140 is trained on a large corpus of text to learn patterns and relationships between words, phrases, sentences, and/or other human language elements. The supervised training phase can be used for fine-tuning and can train the language model 140 using one or more labeled datasets to facilitate learning of specific natural language processing (NLP) tasks 145, such as language translation, language generation, question answering, text classification, text summarization, etc.

Many additional types of training procedures can be utilized to train the language model 140 described herein.

FIG. 4C discloses exemplary NLP tasks 145 that can be learned and/or executed by the language model 140 in accordance with certain embodiments. The exemplary NLP tasks 145 can include text generation tasks 145A, language modeling tasks 145B, question answering tasks 145C, text classification tasks 145D, text summarization tasks 145E, speech recognition tasks 145F, named entity recognition (NER) tasks 145G, topic modeling tasks 145H, sentiment analysis tasks 145I and/or other tasks. Each of the tasks can be utilized to generate various types of language model outputs, such outputs corresponding to dialectic parameters 160 and/or dialectic outputs 170.

The text generation tasks 145A executed by the language model 140 can generally involve generating natural language text (e.g., based on given inputs or prompts received by the language model 140).

The language modeling tasks 145B performed or executed by the language model 140 can generally involve generating outputs that predict a next word or sequence of words in text string based on the context of preceding words. In some cases, the language model 140 can include a statistical language model or deep learning model (e.g., such as recurrent neural networks or RNNs) to execute the language modeling tasks 145B.

The question answering tasks 145C executed by the language model 140 can generally involve generating outputs that answer questions or requests posed in natural language text (e.g., such as when the language model 140 operates as a chatbot and/or operates as a search engine to identify content).

The text classification tasks 145D executed by the language model 140 can generally involve generating outputs that assign labels or categories to portions of text.

The text summarization tasks 145E executed by the language model 140 can generally involve generating outputs that create a summary of a longer piece of text (e.g., using extractive or abstractive summarization techniques).

The speech recognition tasks 145F executed by the language model 140 can generally involve generating outputs that transcribe spoken words into written text.

The NER tasks 145G executed by the language model 140 can generally involve generating outputs that identify and classify named entities (e.g., such as people, organizations, and locations) in a piece of text.

The topic modeling tasks 145H executed by the language model 140 can generally involve generating outputs that identify the topics and themes present in text or a collection of documents.

The sentiment analysis tasks 145I executed by the language model 140 can generally involve generating outputs that identify or classify sentiment, emotions, and/or opinions included in textual content. In some examples, the sentiment analysis tasks 145I can be configured to classify textual content as being positive, negative, and/or neutral, and these classifications can be utilized to identify bias in the textual content.

In certain embodiments, the language model 140 can execute one or more the aforementioned NLP tasks 145 (and/or other NLP tasks 145) to generate responses corresponding to the dialectic parameters 160 and/or dialectic outputs 170 described herein.

The language model 140 described herein can be configured to execute any or all of the NLP tasks 145 mentioned above, as well as other types of NLP tasks 145. Various training datasets 210 can enable the language model 140 to perform these and other NPL tasks 145.

Returning to FIGS. 1A-1B and 2, in some embodiments, the training datasets 210 can be customized or supplemented with domain-specific textual content relating to dialectical analyses. A transfer learning procedure can be executed to fine-tune the training of the language model 140 on the domain-specific textual content. For example, the training dataset 210 can be supplemented with text relating to exemplary dialectical analyses, including exemplary input strings 115, and labeled outcomes corresponding to dialectic parameters 160 and/or dialectic outputs 170 associated with the input strings 115. The training dataset 210 also can be supplemented with text content obtained with historical user interactions with the dialectic analysis system 130 (including any of the interactions described in this disclosure). Using this domain-specific content to supplement the training of the language model 140 can enhance or improve the precision of the language model 140 with respect to generating dialectic parameters 160 and/or dialectic output 170. Additional details are provided further below regarding exemplary training datasets 210 and exemplary training procedures that can be applied to enhance the capabilities of the language model 140 in connection with performing the dialectic analyses described herein.

In certain embodiments, the language model 140 also can include a continuous learning (or incremental) learning framework that enables the language model 140 to continuously learn over time based on interactions with dialectic analysis system 130. The continuous learning framework can continuously refine and increase the quality and precision of the language model outputs and/or refine the manner in which the language model 140 responds to prompts 152 generated by the dialectic analysis system 130.

Despite the vast amounts of training data that may be utilized to train the language model 140, the dialectic parameters 160 generated by language model 140 may require refinement or modification in many scenarios, even for the state-of-the-art language models currently available. This can be attributed, at least in part, to the fact that language models 140 are not equipped to generate responses using a dialectical process.

As explained below, the dialectic analysis system 130 can include various features and functionalities that account for overcoming the shortcomings of traditional language models and/or enhancing the accuracy, precision and reliability of the responses generated by the language model 140 in connection performing the dialectic analyses described herein. For example, as explained below, the dialectic logic engine 150 can execute functionalities that enforce various constraint conditions on the responses generated by the language models. Additionally, or alternatively, a dialectic training system 200 can execute functions for fine-tuning, training, and/or developing language models 140 to produce responses that optimized for usage in conducting the dialectic analyses described herein.

Exemplary Parameter Constraint Conditions

In certain embodiments, to address the lack of precision or accuracy that may be inherit in certain responses generated by the language model 140, the dialectic logic engine 150 may store a set of parameter constraint conditions 155 to ensure that the dialectic parameters 160 generated by language model 140 are determined with high precision and accuracy. Each dialectic parameter 160 can be associated with one or multiple parameter constraint conditions 155. In some examples, the parameter constraint conditions 155 for a given dialectic parameter 160 can identify a relationship of that dialectic parameter to one or more additional dialectic parameters 160 (e.g., indicating whether the dialectic parameter 160 is complimentary or contradictory to other dialectic parameters 160 or related to other dialectic parameters 160 in various ways).

FIG. 5 is a table 500 illustrating an exemplary scheme for imposing parameter constraint conditions 155 on the dialectic parameters 160. In certain embodiments, additional types of parameter constraint conditions 155 also can be applied and/or some of the parameter constraint conditions 155 shown can be modified or omitted.

The top row of the table identifies exemplary dialectic parameters 160. The first column of the table identifies relationship attributes that can be utilized to constrain the content of each dialectic parameter 160 based on its relation to other dialectic parameters 160. In this example, the relationship attributes can hone the precision of a text string corresponding to a dialectic parameter 160 by requiring the dialectic parameter 160 to be: 1) complimentary to one or more specified dialectic parameters 160; 2) contradictory to one or more specified dialectic parameters 160; 3) opposite to one or more specified dialectic parameters 160; 4) a positive side or viewpoint of one or more specified dialectic parameters 160; 5) a negative side or viewpoint of one or more specified dialectic parameters 160; 6) an overdevelopment of one or more specified dialectic parameters 160; 7) an underdevelopment of one or more specified dialectic parameters 160; 8) a cause of one or more specified dialectic parameters 160; and/or 9) an effect of one or more specified dialectic parameters 160. Many other types of parameter constraint conditions 155 can be enforced on the dialectic parameters 160. In some examples, the parameter constraint conditions 155 also may include conditions specifying that a dialectic parameter 160 is: 10) an "inherent goal of" one or more other dialectic parameters 160: 11) an "implied obligation of" one or more other dialectic parameters 160; and/or 12) an "inherent risk of" one or more other dialectic parameters 160.

After some or all of the dialectic parameters 160 are initially obtained via interactions between the dialectic logic engine 150 and the language model 140, the dialectic logic engine 150 may check the accuracy of each dialectic parameter 160 based on the constraint conditions 155. In some sense, this can serve as a quality control check on the text strings generated by the language model 140 to populate the dialectic parameters 160.

In certain embodiments, the process of assessing the precision or accuracy of the dialectic parameters 160 can be performed by executing additional communication exchanges between the dialectic logic engine 150 and the language model 140. For example, for each dialectic parameter 160, the dialectic logic engine 150 (or prompt generation functions 151 associated therewith) may generate one or more prompts 152 for querying or instructing the language model to compare the text string value of the dialectic parameter 160 with the text strings of other dialectic parameters 160 based on relationships imposed by the constraint conditions 155.

In one basic example, the dialectic logic engine 150 may verify or check the accuracy of an antithesis parameter 160B by generating a prompt 152 that instructs the language model 140 to compare the antithesis parameter 160B to the thesis parameter 160A and to indicate whether or not the antithesis parameter 160B is contradictory to the thesis parameter 160A. In another example, the dialectic logic engine 150 may verify or check the accuracy of a thesis parameter 160C by generating a prompt 152 (or series of prompts 152) that instructs the language model 140 to confirm the positive thesis parameter 160C is complimentary to a positive antithesis parameter, contradictory to a negative antithesis parameter, opposite to the negative antithesis parameter, and a positive side or viewpoint of the thesis parameter. The dialectic logic engine 150 can perform similar types of verifications on the other dialectic parameters 160 using the constraint conditions 155 set forth in FIG. 5.

In the event that any of the dialectic parameters 160 do not satisfy the one or more of the parameter constraint conditions 155, the dialectic logic engine 150 may generate one or more additional prompts 152 to request revised or updated text strings for those parameters which are not consistent with one or more of the parameter constraint conditions 155. In some scenarios, the procedure for assessing the accuracy of the dialectic parameters 160 may be an iterative or repetitive process that terminates when all parameter constraint conditions 155 are satisfied.

The programmatic process applied by the dialectic logic engine 150 to iteratively refine the inferences or responses of the language model 140 based on the parameter constraint conditions 155 marks in improvement in generative AI control technologies. In some sense, this constraint-enforcing framework serves to establish precision-based boundaries for controlling the inferences made by the language model 140 and can significantly improve the quality of the dialectic parameter values while ensuring consistency among the dialectic parameters.

Exemplary AI-Based Communication Exchanges

Figure 3:
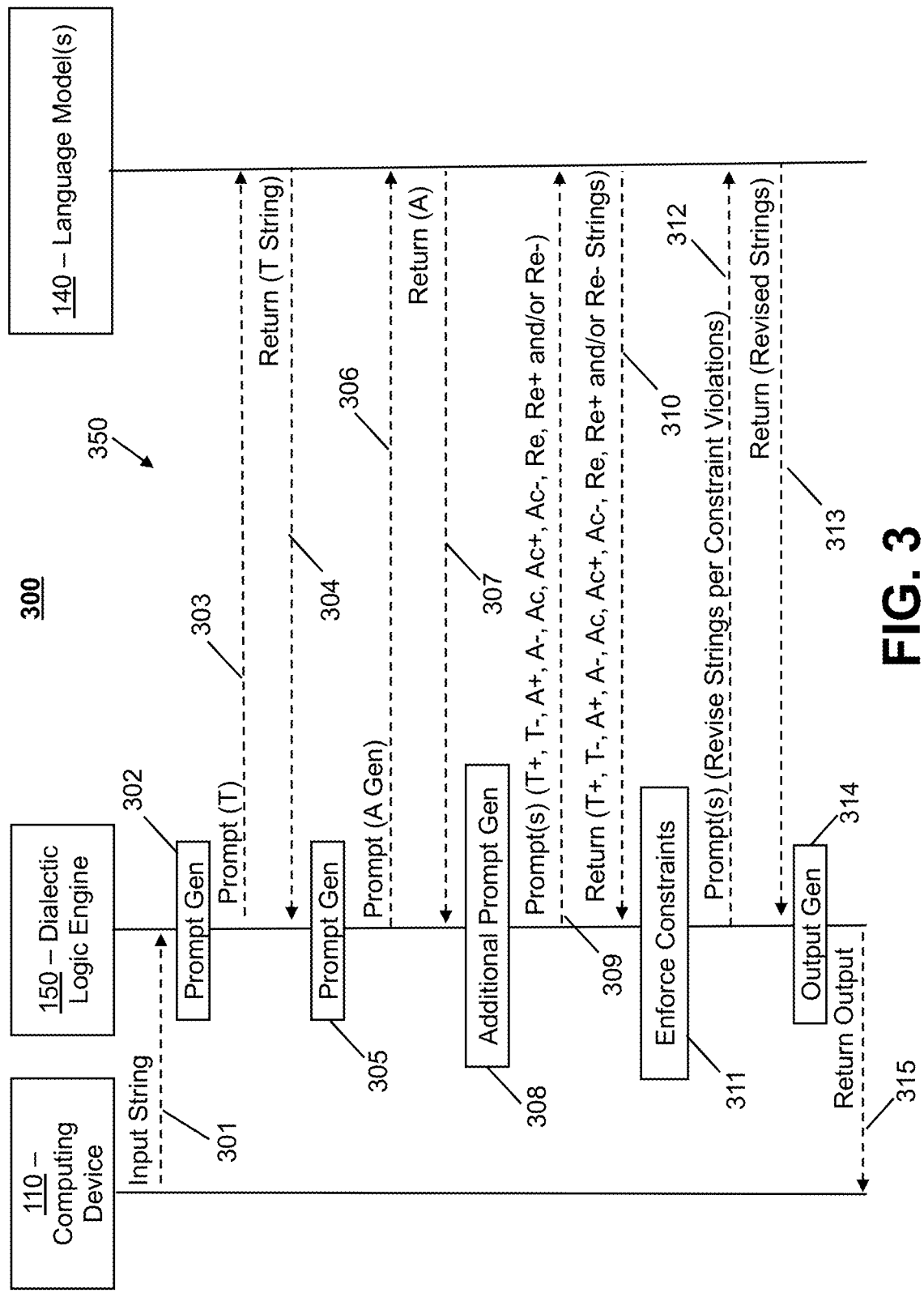
FIG. 3 is a diagram illustrating an exemplary process flow for generating a dialectic output based on a communication exchange with a language model according to certain embodiments.

FIG. 3 is a diagram illustrating an exemplary process 300 for generating a dialectic output 170 based on an input string 115 according to certain embodiments. The diagram illustrates exemplary communications between a computing device 110, a dialectic logic engine 150, and a language model 140. As described below, a communication exchange 350 between the dialectic logic engine 150 and the language model 140 is used to derive a plurality of dialectic parameters 160 which, in turn, can be utilized to generate a dialectic output 170 corresponding to the input string 115 specified by the computing device 110.

It should be understood that the process flow 300 is provided for explanatory purposes and can be varied in numerous ways. Amongst other things, the steps of the process can be performed in different orders, additional steps can be added to the process, and one or more illustrated steps can be omitted from the process altogether.

In step 301, a computing device 110 transmits a request to the dialectic logic engine 150 for a dialectic output 170. The request includes an input string 115 to be used in conducting a dialectical analysis. In some cases (such as where the dialectic logic engine 150 is capable of generating multiple types of dialectic outputs 170), the request also may identify a desired type of dialectic output 170 to be generated. In some cases, the input string 115 may be specified by an end-user and/or an input string 115 specified by a secondary application 180.

In step 302, the dialectic logic engine 150 generates a first prompt 152 for querying or instructing the language model 140 to generate a thesis parameter 160A corresponding to the input string 115.

In step 303, the dialectic logic engine 150 transmits the first prompt to the language model 140.

In step 304, the language model 140 returns a text string to the dialectic logic engine 150 that includes the thesis parameter 160A.

In step 305, the dialectic logic engine 150 generates a second prompt 152 for querying or instructing the language model 140 to generate an antithesis parameter 160B corresponding to, or based on, the thesis parameter 160A.

In step 306, the dialectic logic engine 150 transmits the second prompt to the language model 140.

In step 307, the language model 140 returns a text string to the dialectic logic engine 150 that includes the antithesis parameter 160B.

In step 308 and 309, the dialectic logic engine 150 optionally continues this process and generates one or more additional prompts 152 for querying or instructing the language model 140 to generate one or more additional dialectic parameters 160. Each of the one or more additional prompts 152 are transmitted to the language model 140.

The particular prompts 152 generated and transmitted in steps 308 and 309 can vary based on the type of dialectic output 170 desired to be generated by the dialectic logic engine 150. In some cases, the dialectic logic engine 150 can generate prompts 152 designed to elicit one or more of the following: a positive thesis parameter 160C, a negative thesis parameter 160D, a positive antithesis parameter 160E, a negative antithesis parameter 160F, an action parameter 160G, a positive action parameter 160H, a negative action parameter 160I, a reverse action parameter 160J, a positive reverse action parameter 160K, and/or a negative reverse action parameter 160L.

In step 310, the language model 140 returns one or more text strings to the dialectic logic engine 150 that includes the one or more additional dialectic parameters 160.

In step 311, the dialectic logic engine 150 enforces constraint parameter conditions 155 on the dialectic parameters 160 and/or assesses whether the dialectic parameters 160 satisfy the parameter constraint conditions 155.

In step 312, the dialectic logic engine 150 optionally generates and transmits one or more additional prompts 152 to request revised or modified text strings for one or more of the dialectic parameters 160 in response to detecting that at least a portion of the initial values for the dialectic parameters 160. violate one or more parameter constraint conditions 155.

In step 313, the language model 140 returns one or more revised text strings responsive to the one or more additional prompts 152 transmitted in the previous step.

In some scenarios, steps 312 and 313 may repeatedly or iteratively be performed to continuously refine or hone the precision of the dialectic parameters 160. This repeated or iterative process may terminate when the values for all of the dialectic parameters 160 satisfy all of the parameter constraint conditions 155.

In step 314, the dialectic logic engine 150 generates one or more dialectic outputs 170 based, at least in part, on the dialectic parameters 160 derived in the previous steps.

The type of dialectic output 170 generated can vary. In some scenarios, the dialectic logic engine 150 can apply a programmatic process to derive a dialectic output 170 based on the dialectic parameters 160 obtained in the proceeding steps after the final values for the dialectic parameters 160 are ascertained. Additionally, or alternatively, for certain types of dialectic outputs 170, the dialectic logic engine 150 may initiate additional communication exchanges 350 with the language model 140 to generate various types of text strings to be included in the dialectic output 170. As explained below, the dialectic logic engine 150 also may initiate additional communication exchanges 350 with the language model 140 to improve the accuracy or precision of the dialectic outputs 170, such as by ensuring dialectic outputs 170 generated by the system comply with a set of output constraint conditions 156 (e.g., such as those set forth in Table 3 below).

In step 315, the dialectic logic engine 150 transmits the one or more dialectic outputs 170 to the computing device 110 that initially sent the request. In some scenarios, the dialectic output 170 may be displayed to end-user operating the computing device 110. In other scenarios, the dialectic output may be provided as an input to one or more secondary applications 180 for usage in downstream processing operations.

Exemplary Dialectic Outputs

FIG. 4B is a block diagram demonstrating exemplary dialectic outputs 170 that can be generated by the dialectic analysis system 130. As mentioned above, the dialectic analysis system 130 can be configured to generate various types of dialectic outputs 170. In general, each dialectic output 170 can comprise one or more text strings that are derived or deduced using a dialectical analysis and/or using one or more of the dialectic parameters 160 described herein. Examples of the dialectic outputs 170 are described below.

In some embodiments, the dialectic outputs 170 generated by the dialectic analysis system 130 can include one or more parameter synopsis outputs 171, one or more dialectic wheels 172, and/or one or more AI inference outputs 173. The types of AI inference outputs 173 can vary and, in some cases, can include one or more control statements 173A, one or more interrogation outputs 173B, one or more quotation outputs 173C, and/or one or more duality evaluation outputs 173D. Each of these exemplary dialectic outputs 170 are described in further detail below.

In general, a parameter synopsis output 171 can correspond to a text string that includes the dialectic parameters 160 derived from an input string 115 and/or provides a summarization, overview, or description of the dialectic parameters 160 that were derived from the input string 115. In some embodiments, the dialectic logic engine 150 can generate the parameter synopsis output 171, at least in part, by combining and/or concatenating the values associated with the dialectic parameters 160 into one or more text strings and/or incorporating the values of the dialectic parameters 160 into tables, graphs, sentences, and/or other formats.

In some embodiments, the parameter synopsis output 171 can be stored in one or more variables and passed to one or more secondary applications 180 (e.g., critical thinking applications 180D, mediation applications 180F, etc.), which can use the parameter synopsis output 171 for various subsequent or downstream processing operations. In other embodiments, a parameter synopsis output 171 can be displayed to end-users via computer devices 110.

In general, a dialectic wheel 172 can correspond to a graphical display or infographic, such as a wheel or diagram, that includes some or all of the dialectic parameters 160 that were generated based on a given input string 115. As discussed in further detail below, the dialectic wheels 172 can be configured in a variety of different formats to display various types of information.

In some embodiments, a dialectic wheel 172 can provide a visualization of dialectic parameters 160 in graphical format and may include graphics or data that identifies relationships among the dialectic parameters 160. In some examples, in response to receiving an input string 115, a dialectic wheel 172 can display at least two of the following dialectic parameters 160 derived from the input string: a thesis parameter 160A, an antithesis parameter 160B, a positive thesis parameter 160C, a negative thesis parameter 160D, a positive antithesis parameter 160E, a negative antithesis parameter 160F. Additionally, in some embodiments, the dialectic wheel 172 can incorporate or include one or more action/reverse parameters (e.g., an action parameter 160G, a positive action parameter 160H, a negative action parameter 160I, a reverse action parameter 160J, a positive reverse action parameter 160K, and/or a negative reverse action parameter 160L) related to the dialectic parameters 160 included in the dialectic wheel 172.

FIG. 6E is an exemplary design for a dialectic wheel 172 according to certain embodiments. In this example, the dialectic wheel 172 comprises a three-tiered arrangement of three concentric circles. The dialectic parameters 160 derived by the dialectic logic engine 150 can be incorporated into designated regions of the dialectic wheel 172.

The middle tier of the dialectic wheel 172 can include a thesis parameter (T) and an antithesis parameter (A) situated opposite each other. An action parameter (Ac) is situated in between the thesis parameter (T) and the antithesis parameter (A), which identifies an action, activity, deed, or operation capable of transforming or transitioning the thesis parameter (T) to the antithesis parameter (A). Along similar lines, a reverse action parameter (Re) (also referred to as a "reflection" in some cases) is situated opposite the action parameter (Ac) between the thesis parameter (T) and the antithesis parameter (A), which identifies an action, activity, deed, or operation capable of transforming or transitioning the antithesis parameter (A) to the thesis parameter (T).

The inner tier of the dialectic wheel 172 can include a positive thesis parameter (T+) and a positive antithesis parameter (A+) situated opposite each other. A positive action parameter (Ac+) is situated in between the positive thesis parameter (T+) and the positive antithesis parameter (A+), which identifies an action, activity, deed, or operation capable of transforming or transitioning the positive thesis parameter (T+) to the positive antithesis parameter (A+). Along similar lines, a positive reverse action parameter (Re+) (or positive reflection) is situated opposite the positive action parameter (Ac+) between the positive thesis parameter (T+) and the positive antithesis parameter (A+), which identifies an action, activity, deed, or operation capable of transforming or transitioning the positive antithesis parameter (A+) to the positive thesis parameter (T+).

The outer tier of the dialectic wheel 172 can include a negative thesis parameter (T−) and a negative antithesis parameter (A−) situated opposite each other. A negative action parameter (Ac−) is situated in between the negative thesis parameter (T−) and the negative antithesis parameter (A−), which identifies an action, activity, deed, or operation capable of transforming or transitioning the negative thesis parameter (T−) to the negative antithesis parameter (A−). Along similar lines, a negative reverse action parameter (Re−) (or negative reflection) is situated opposite the negative action parameter (Ac−) between the negative thesis parameter (T−) and the negative antithesis parameter (A−), which identifies an action, activity, deed, or operation capable of transforming or transitioning the negative antithesis parameter (A−) to the negative thesis parameter (T−).

Figure 8C:
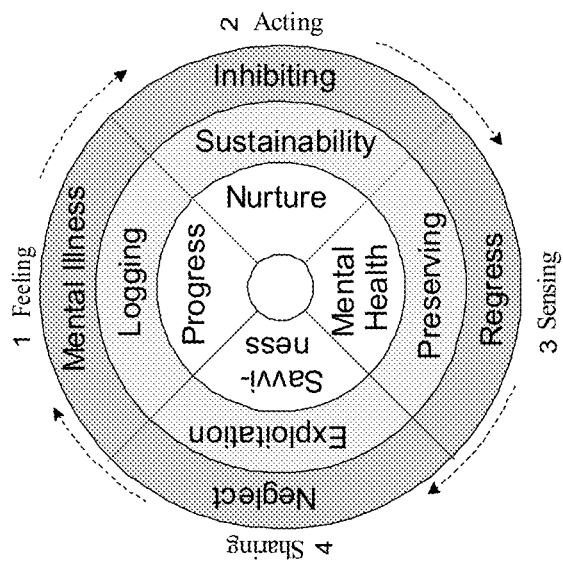
FIG. 8C is a dialectic wheel generated based on a third exemplary thesis parameter according to certain embodiments.
Figure 8B:
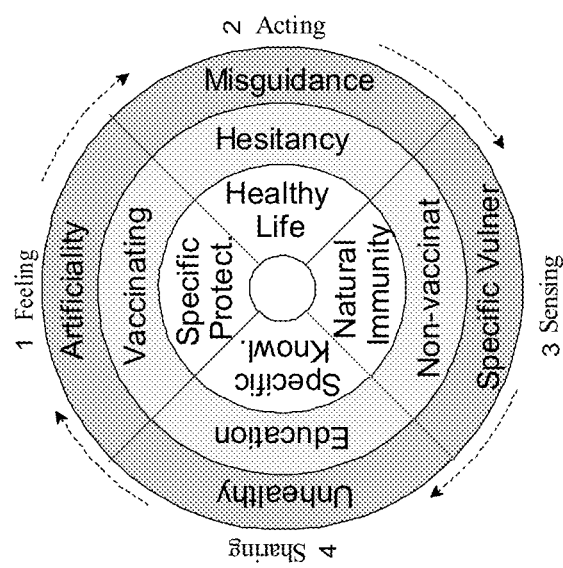
FIG. 8B is a dialectic wheel generated based on a second exemplary thesis parameter according to certain embodiments.
Figure 8A:
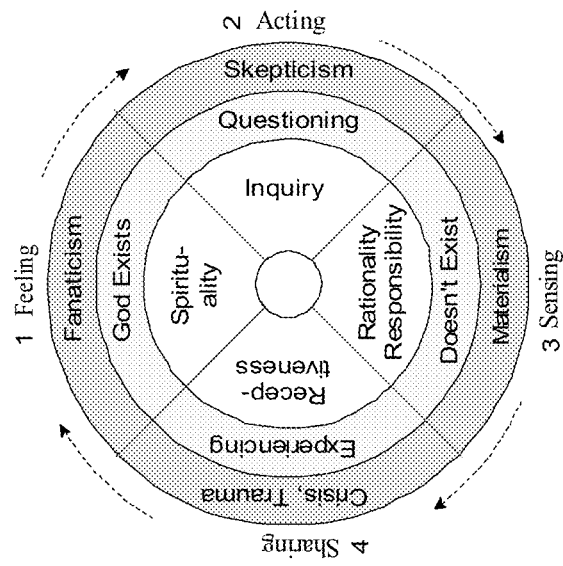
FIG. 8A is a dialectic wheel generated based on a first exemplary thesis parameter according to certain embodiments.

FIGS. 8A-8C illustrate examples of three-tiered dialectic wheels 172 that are populated with values of dialectic parameters derived from different input strings 115. FIG. 8A may represent a dialectic wheel 172 that is derived from a thesis parameter 160A corresponding to "God Exists" (which, in turn, may be derived from an input string 115). FIG. 8B may represent a dialectic wheel 172 that is derived from a thesis parameter 160A corresponding to "Vaccination". FIG. 8C may represent a dialectic wheel 172 that is derived from a thesis parameter 160A corresponding to "Logging".

FIG. 6F is another exemplary design for a dialectic wheel 172 according to certain embodiments. In this example, the dialectic wheel 172 comprises a condensed two-tiered arrangement of concentric circles. In this condensed version, the dialectic wheel 172 comprises an inner tier that includes a positive thesis parameter (T+), a positive antithesis parameter (A+), and corresponding positive action/reverse action parameters. The outer tier includes a negative thesis parameter (T−), a negative antithesis parameter (A−), and corresponding negative action/reverse action parameters.

FIGS. 6A-6D and 6G are diagrams illustrating relationships among dialectic parameters 160 included in the dialectic wheels 172 and/or exemplary procedural steps that can be utilized to generate the dialectic wheels 172. FIG. 6A illustrates the starting steps for generating an exemplary dialectic wheel 172. In particular, it demonstrates that thesis parameter (T) yields its positive (T+) and negative (T−) sides (step 1), along with antithesis parameter (A) (step 2) and its positive (A+) and negative (A−) sides (step 3). It should be noted that the positive and negative sides of the thesis parameter (T) and antithesis parameter (A) can differ from conventional understanding of "pros and cons", given that they may be required to satisfy the parameter constraint conditions 155 in FIG. 5. In some examples, T+ must be the opposition of A−, and T− must be the opposition of A+(which can correspond to "generative" steps 3 and 6 in FIG. 6A and the verification steps 4-7 in FIG. 6B). Likewise, in some examples, T− must be an overdevelopment of T and/or T+ and an underdevelopment of A+, while A− must be an overdevelopment of A and/or A+ and an underdevelopment of T+.

As explained above, the parameter constraint conditions 155 identified in FIG. 5 may be enforced to improve the accuracy of deriving the dialectic parameters 160 which, in turn, can improve the dialectic wheels 172 utilized to visualize those dialectic parameters 160. However, a typical AI generative model, such as language model 140, may not be capable of generating the dialectic parameters 160 all at once while satisfying all applicable constraint conditions 155. Given such, the specific sequence or order in which the dialectic parameters 160 are generated may become important.

Along these lines, the relationships and/or procedural order illustrated in FIG. 6A can be beneficial in scenarios where a dialectic wheel 172 is being generated with the aim of identifying the maximum variety of all possible positive and negative outcomes. The relationships and/or procedural order illustrated in FIG. 6B can be beneficial in scenarios where there are clear negatives with questionable positives. One can imagine the opposite situation, in which all positives are clear, while negatives are questionable. In these and other scenarios, the dialectic logic engine 150 can ascertain or derive the dialectic parameters 160 in an appropriate order, and incorporate the dialectic parameters 160 into dialectic wheels 172.

FIGS. 6C-6H demonstrate a circular causation in that the positive and negative sides of T and A can be related by certain Actions (Ac, Ac+, Ac−) and reflections or "reversed actions" (Re, Re+, Re−). These parameters can obey all the same symmetry rules, as T and A in FIG. 5. In addition, they yield the concentric dialectic wheels 172 (FIGS. 6E-G) inducing a new type of causal relations (see bottom section in FIG. 5). The scheme illustrated in FIG. 6B also exemplifies the possibility of obtaining simplified wheels in a lesser number of steps than enumerated earlier.

Figure 7D:
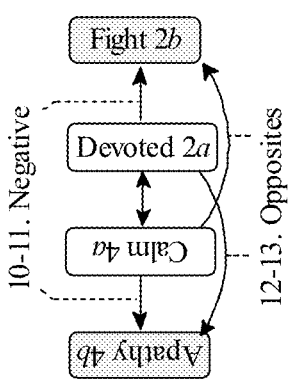
FIG. 7D is a diagram illustrating a process that can be used to derive dialectic wheels or outputs according to certain embodiments.
Figure 7C:
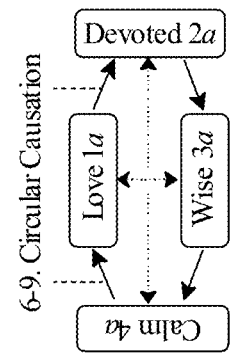
FIG. 7C is a diagram illustrating a process that can be used to derive dialectic wheels or outputs according to certain embodiments.
Figure 7B:
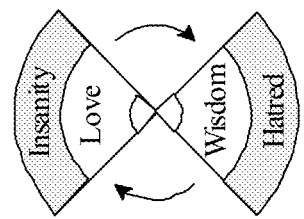
FIG. 7B is a diagram illustrating a process that can be used to derive dialectic wheels or outputs according to certain embodiments.
Figure 7A:
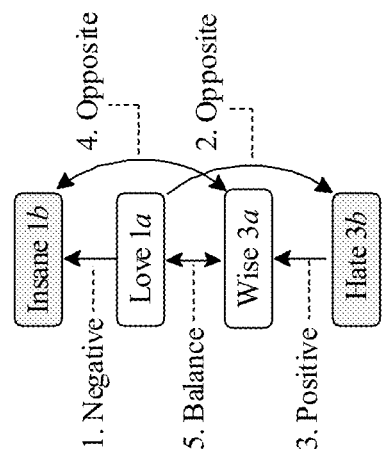
FIG. 7A is a diagram illustrating a process that can be used to derive dialectic wheels or outputs according to certain embodiments.
Figure 7H:
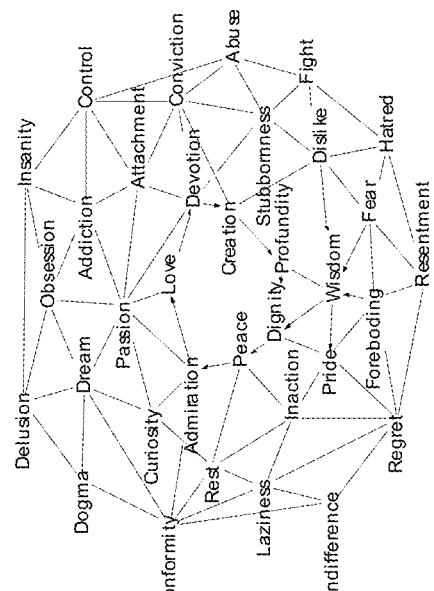
FIG. 7H is a multilayer graph according to certain embodiments.
Figure 7G:
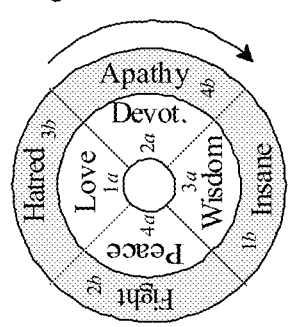
FIG. 7G is an exemplary dialectic wheel according to certain embodiments.
Figure 7F:
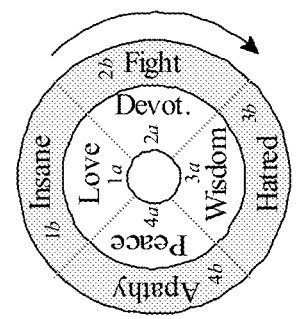
FIG. 7F is an exemplary dialectic wheel according to certain embodiments.
Figure 7E:
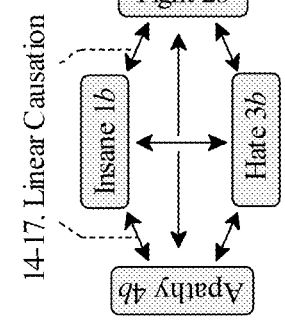
FIG. 7E is a diagram illustrating a process that can be used to derive dialectic wheels or outputs according to certain embodiments.

FIGS. 7A-7H illustrate exemplary techniques for generating a two-tier or two-layer wheel for the word "Love" (in which T=T+). FIG. 7A illustrates the generation of T−(step 1), A−(step 2), A+(step 3), and verification of overall correctness (step 4). FIG. 7B illustrates a "half-wheel" that can be used for generating "artificial wisdom" statements. In some examples, this scheme reveals that "Love without Wisdom yields Insanity, while Wisdom without Love yields Hatred" (additional details provided below). If the generated statements sound useful, then the obtained half-wheel is determined to be correct. FIGS. 7C-E show analogous steps for determining actions and reverse action parameters.

In scenarios where the dialectic logic engine 150 is generating a condensed or two-tier dialectic wheel 172, the parameter constraint conditions 155 in FIG. 5 also be reduced e.g., such by equating T to either T+ or T−, depending on a sentiment it associated with T (which can be identified by the sentiment analysis functions described in this disclosure).

FIG. 7H illustrates the "inverted" dialectic wheel 172 in which locations of the negative effects are switched to opposing sides (1b=T−vs. 3b=A−, and 2b=Ac−vs. 4b=Re−). Each segment of such a wheel represents a coordinate that is suitable for quantitative measuring of given effects (in this example, love, devotion, wisdom, and peace).

FIG. 7H illustrates a possible "multilayer" graph that may be obtained after merging many different attempts. Here, statements nearer the center are more positive. Similar to polar coordinates, distance indicates "negativity" while the angle represents the dialectical element: T, Ac, A, or Re.

The dialectic logic engine 150 can store algorithms, procedures or the like to generate the various types of dialectic wheels 172 described throughout this disclosure, and can be configured to execute the any of the procedures or functions described with respect to FIGS. 6A-6G and FIGS. 7A-7H.

The dialectic logic engine 150 also can store algorithms, procedures or the like to generate various types of AI inference outputs 173.

In certain embodiments, an AI inference output 173 may correspond to one or more text strings that are derived based on inferences generated by the language model 140 using one or more dialectic parameters 160 as inputs to the language model 140. Thus, the generation of each AI inference output 173 can involve generating one or more prompts 152 (e.g., using the prompt generation functions 151 of the dialectic logic engine 150) to elicit a specific type of analysis or output from the language model 140.

In some examples, generating an AI inference output 173 can include generating one or more control statements 173A. In general, a control statement 173A can one or more text strings that include deductions, reasoning, and/or analyses performed on one or more of the dialectic parameters 160 derived from an input string 115. In some sense, the control statements 173A may be viewed as generating artificial wisdom or advice based on subjects, ideas, or concepts included in input strings 115 and/or based on thesis parameters 160A derived from input strings 115.

Table 1 is an example of an exemplary input string 115 and a plurality of control statements 173A that are generated by the language model 140 in response to the input string 115.

TABLE 1

| | |
|---|---|
| Input String | "I am bored." |
| Control Statement Output | "The central idea here is boredom. The antithesis of boredom could be excitement or engagement. An exaggerated form of boredom might be apathy, while an exaggerated form of excitement might be recklessness. The positive side of boredom (apathy) could be mindfulness, which is opposite to recklessness. The positive side of excitement (recklessness) could be passion, which is opposite to boredom and apathy. So, without passion, mindfulness can become apathy. Without mindfulness, passion can become recklessness. To transform apathy into passion, try to focus on the present moment. Engage with your surroundings, pay attention to the details, and try to find beauty or interest in the mundane. To transform recklessness into caution, try to think before you act. Consider the potential consequences of your actions and make sure you're not putting yourself or others at risk. Beware of anything that can turn mindfulness into recklessness, such as impulsivity or lack of self-control. Also, be careful not to let caution turn into apathy, such as when fear of making a mistake or getting hurt prevents you from taking any action at all. A real-life example of this might be someone who's bored with their job. They might impulsively quit and jump into a new career without thinking it through (recklessness), or they might become so apathetic that they stop trying to improve or find enjoyment in their work. A better approach would be to mindfully engage with their current job while cautiously exploring other career options." |

Table 2 provides another example of an exemplary input string 115 and a plurality of control statements 173A that are generated by the language model 140 in response to the input string 115.

TABLE 2

| | |
|---|---|
| Input String | "What is the meaning of life?" |
| Control Statement Output | "The meaning of life a deeply philosophical question and can vary depending on one's person beliefs and experiences. However, let's break it down using a concept.<br>Consider the central idea of life as 'Growth'. The antithesis could be 'Stagnation'. The negative aspect of growth, an exaggerated form, could be "Over-expansion', while the positive side of stagnation, its constructive aspect, could be 'Stability'.<br>On the other hand, the negative aspect of stagnation, an exaggerated form, could be "Decay", while the positive side of growth, its constructive aspect, could be 'Development'.<br>The control statements here could be: 'Development without Stability leads to Over-expansion' and 'Stability without Development leads to Decay'.<br>To transform Over-expansion into Stability, one might need to slow down, take time to reflect, and focus on maintaining what has already been achieved rather than constantly seeking more. To transform Decay into Development, one might need to step out of their zone, seek new experiences, and embrace change.<br>Beware of the traps that can convert Development into Decay, such as complacency or fear of change, and Stability into Over-expansion, such as greed or restlessness.<br>A real-life example could be a business. A business needs to grow and develop to succeed, but if it expands too quickly without a stable foundation, it may collapse. On the other hand, if a business becomes too comfortable and stops innovating, it may decay and be outcompeted. Therefore, a balance between growth (development) and stability is crucial." |

As demonstrated by the above examples, the control statements 173A generated via a communication exchange between the dialectic logic engine 150 and the language model 140 can include various artificial wisdom statements that are generated by applying a dialectical analysis on the dialectic parameters 160 previously generated.

In some cases, the dialectic logic engine 150 can generate and transmit multiple prompts 152 to the language model to generate these type of artificial wisdom analyses. For example, one or more prompts 152 may be generated to derive the first portion of the response that summarizes some of the dialectic parameters 160 (such as the central idea (or thesis), the antithesis, and corresponding positive/negative sides of each). One or more prompts 152 may be generated to derive the next portion of the response which includes the control statements describing relationships among the dialectic parameters 160. One or more prompts 152 may be generated to derive the following portion of the response that describe actions that can result in positive transformations and reverse actions that can lead to common traps or negative transformations. One or more prompts 152 may be generated to derive the last portion of the response that ties together preceding elements with a real-life or real-world example.

In many cases, the responses generated by a language model 140 may require refinement or modification because language models 140 are not equipped to generate responses using a dialectical process.

To address the lack of precision or accuracy that may be inherit in certain responses generated by the language model 140, the dialectic logic engine 150 may store a set of output constraint conditions 156 to ensure that the control statements 173A are generated with high precision and accuracy. These output constraint conditions 156 are similar in some sense to the parameter constraint conditions 155 used to refine the dialectic parameters 160, but instead serve to refine the precision of control statements 173A (which are derived using the dialectic parameters 160 that have already been refined, such as by using the exemplary parameter constraint conditions 155 in FIG. 5).

Table 3 illustrates exemplary output constraint conditions 156 that can be applied to improve the precision or accuracy of the control statements 173A.

TABLE 3

| N | Rule Statement | Notification | Verification of |
|---|---|---|---|
| 1 | T+ without A+ yields T− | (T+) − (A+) = (T−) | T+, A+, T− |
| 2 | A+ without T+ yields A− | (A+) − (T+) = (A−) | T+, A+, A− |
| 3 | Ac+ without Re+ yields Ac− | (Ac+) − (Re+) = (Ac−) | Ac+, Re+, Ac− |
| 4 | Re+ without Ac+ yields Re− | (Re+) − (Ac+) = (Re−) | Ac+, Re+, Re− |
| 5 | Ac transforms T to A | (Ac) + (T) = (A) | Ac |
| 6 | Ac+ transforms T− to A+ | (Ac+) + (T−) = (A+) | Ac+ |
| 6a | Ac+ transforms T+ to A+ | (Ac+) + (T+) = (A+) | Ac+ |
| 7 | Ac− transforms T+ to A− | (Ac−) + (T+) = (A−) | Ac− |
| 7a | Ac− transforms T− to A− | (Ac−) + (T−) = (A−) | Ac− |
| 8 | Re transforms A to T | (Re) + (A) = (T) | Re |
| 9 | Re+ transforms A− to T+ | (Re+) + (A−) = (T+) | Re+ |
| 9a | Re+ transforms A+ to T+ | (Re+) + (A+) = (T+) | Re+ |
| 10 | Re− transforms A+ to T− | (Re−) + (A+) = (T−) | Re− |
| 10a | Re− transforms A− to T− | (Re−) + (A−) = (T−) | Re− |

TABLE 3-continued

| N | Rule Statement | Notification | Verification of |
|---|---|---|---|
| 11 | T+ and A+ are complementary only when Ac+ and Re+ are complementary, and vice versa | (T+ ∩ A+) ↔ (Ac+ ∩ Re+) | T+, A+, Ac+, Re+ |
| 11a | Stable T+ is impossible without Ac+, A+, and Re+ | (T+) = (Ac+) + (A+) + (Re+) | T+, A+, Ac+, Re+ |
| 12 | T is often related to Ac, A, Re | T = Ac + A + Re | Ac, Re |
| 13 | 'True' T should ideally bring T+, Ac+, A+, Re+ | 'True' T = (T+) + (Ac+) + (A+) + (Re+) | T+, A+, Ac+, Re+ |
| 14 | Misrepresented T may bring T−, Ac−, A−, Re− | 'False' T = (T−) + (Ac−) + (A−) + (Re−) | T−, A−, Ac−, Re− |
| 15 | T should be measured using scales of T+ to A−, Ac+ to Re−, A+ to T−, Re+ to Ac− | T = f ((A −; T+), (Re−; Ac+), (T−; A+), (Ac−; Re+)) | T+, T−, A+, A−, Ac+, Ac−, Re+, Re− |

As demonstrated above, each control statement 173A can be associated with a corresponding output constraint condition 156, which is identified in the column labeled "Rule Statements." Amongst other things, the output constraint conditions 156 provide a framework for formulating a string corresponding to a control statement 173A based on the relationship between or among dialectic parameters 160 relevant to the control statement 173A.

In certain embodiments, additional types of output constraint conditions 156 also can be applied and/or some of the output constraint conditions 156 shown can be modified or omitted. Each of the constraint conditions 155 identified above can be formulated using a variety of alternative statements or syntax rules. For example, in rules 12-14 of Table 3, the word "true" can be replaced with "right" or "real", the word "bring" can be replaced with "yield", "mean", etc. Likewise, rules 12-15 can be reduced to fewer elements, e.g. "'True' T brings T+ with A+" is also valid. Many other variations or modifications are also possible.

In the event that an initial string generated by the language model 140 for a given control statement 173A does not satisfy one or more output constraint conditions 156 corresponding to the control statement 173A, the dialectic logic engine 150 may generate one or more additional prompts 152 to request revised or updated text strings for the control statement 173A, such as to refine the control statement 173A to be consistent with any or all applicable output constraint conditions 156.

The programmatic process applied by the dialectic logic engine 150 to refine the inferences or responses generated by the language model 140 for the control statements 173A marks in improvement in generative AI control technologies. In some sense, this constraint-enforcing framework serves to establish precision-based boundaries for controlling the inferences made by the language model 140 and can significantly improve the quality and accuracy of the control statements 173A.

For scenarios in which condensed or simplified dialectic wheels 172 are generated to visualize the dialectic parameters 160, the output constraint conditions 156 in Table 3 also can be simplified or reduced, e.g., such as by equating T to either T+ or T−, depending on a sentiment associated with T (which can be identified by the sentiment analysis functions described herein). This also may include adding the respective polarity sign to other neutral forms (Ac, A and Re) in a given statement (e.g., for positive T statement 5 becomes 6a).

Many other types of AI inference outputs 173 are capable of being generated by the dialectic analysis system 130 in addition to the control statements 173A describe herein. In other examples, the AI inference outputs 173 can include interrogation outputs 173B, quotation outputs 173C, and duality evaluation outputs 173D.

In some embodiments, an interrogation output 173B can include one or more text strings that include one or more questions related to one or more dialectic parameters 160 derived from an input string 115. The text strings, or questions included therein, can be generated based on a communication exchanged between the dialectic logic engine 150 and the language model 140. In some cases, the language model 140 may utilize a thesis parameter 160A derived from an input string 115 to generate a response that includes one or more questions relevant to the thesis parameter.

In one example, an input string 115 for "Lonely" may return an interrogation output 173B that includes questions such as: "What are the underlying reasons that may cause you to feel lonely?", "Have you connected with friends, family, or community groups recently?", etc. In this example, the questions returned in the input string can serve as a self-help tool that identifies the source of an issue or problem identified in the input string 115.

In some embodiments, a quotation output 173C can include one or more text strings identifying one or more quotations (e.g. famous or notable quotations) that are related to one or more dialectic parameters 160 (e.g., a thesis parameter 160A) derived from an input string 115. The text strings, or quotations included therein, can be generated based on a communication exchange between the dialectic logic engine 150 and the language model 140.

In one example, an input string 115 for "Winning is everything" may return a quotation output 173C that includes: "'Victory is the sweetest when you've known defeat.'—Malcom Forbes" and/or "'Victory belongs to the most persevering.'—Napoleon Bonaparte'".

In some embodiments, a duality evaluation output 173D can include one or more text strings identifying at least one pro and at least one con based on one or more dialectic parameters 160 (e.g., a thesis parameter 160A) derived from an input string 115. The text strings, or pros/cons included therein, can be generated based on a communication exchanged between the dialectic logic engine 150 and the language model 140.

In one example, an input string for "Car" may return a duality evaluation output 173D that includes: "Positive Sides: 1) Convenience: A car provides the freedom to travel wherever and whenever you want. 2) Comfort: Cars offer a comfortable mode of transportation, especially for long distances . . . etc." and "Negative Sides: 1) Cost: Owning a car can be expensive. 2) Environmental Impact: Cars contribute to pollution . . . etc.)".

The types of AI inference outputs 173 is nearly limitless and can include many other types of text strings that are derived based the dialectic parameters 160. Further examples of dialectic outputs 170 are discussed below in connection with the section discussion poly-circular graphs 174.

Other types of dialectic outputs, including dialectic causality outputs 175, are described throughout this disclosure.

Automated Wheel Generation Examples

Figure 9A:
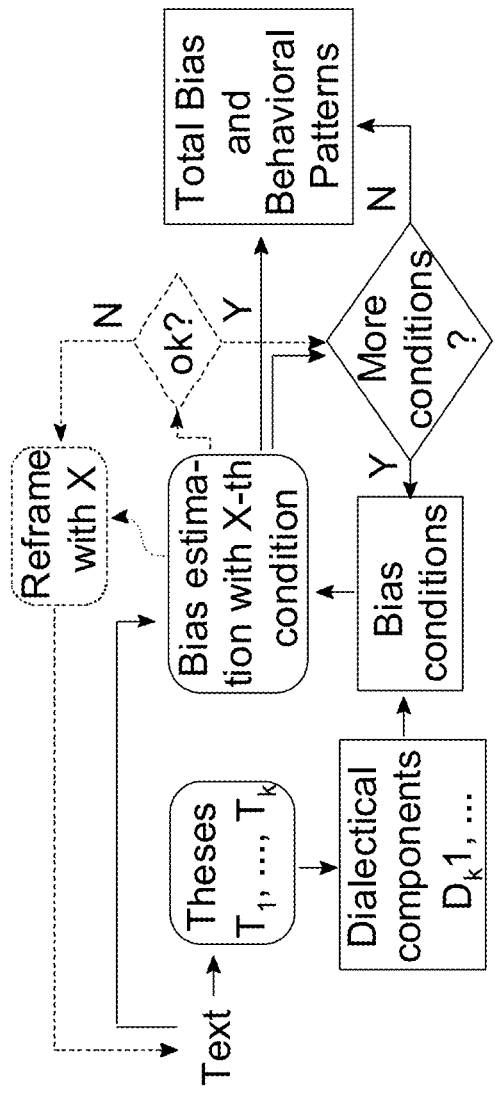
FIG. 9A is a diagram illustrating a process flow for the automated bias identification according to certain embodiments.
Figure 9B:
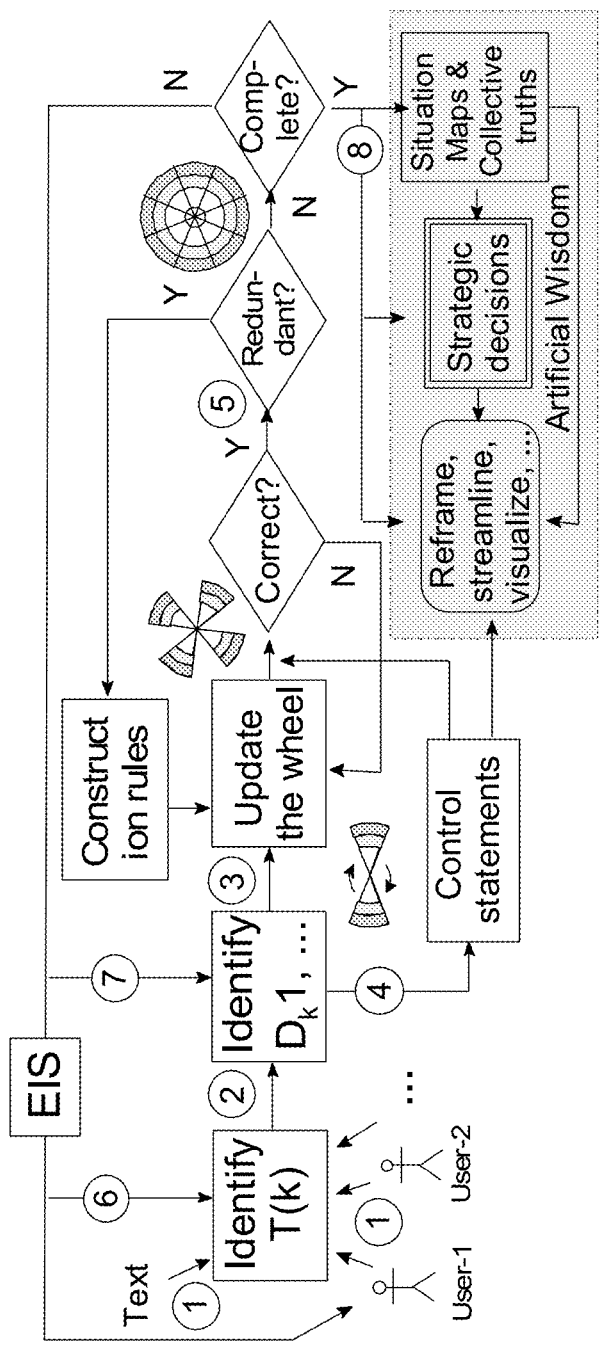
FIG. 9B is a diagram illustrating a process flow for processing multiple theses according to certain embodiments.
Figure 9C:
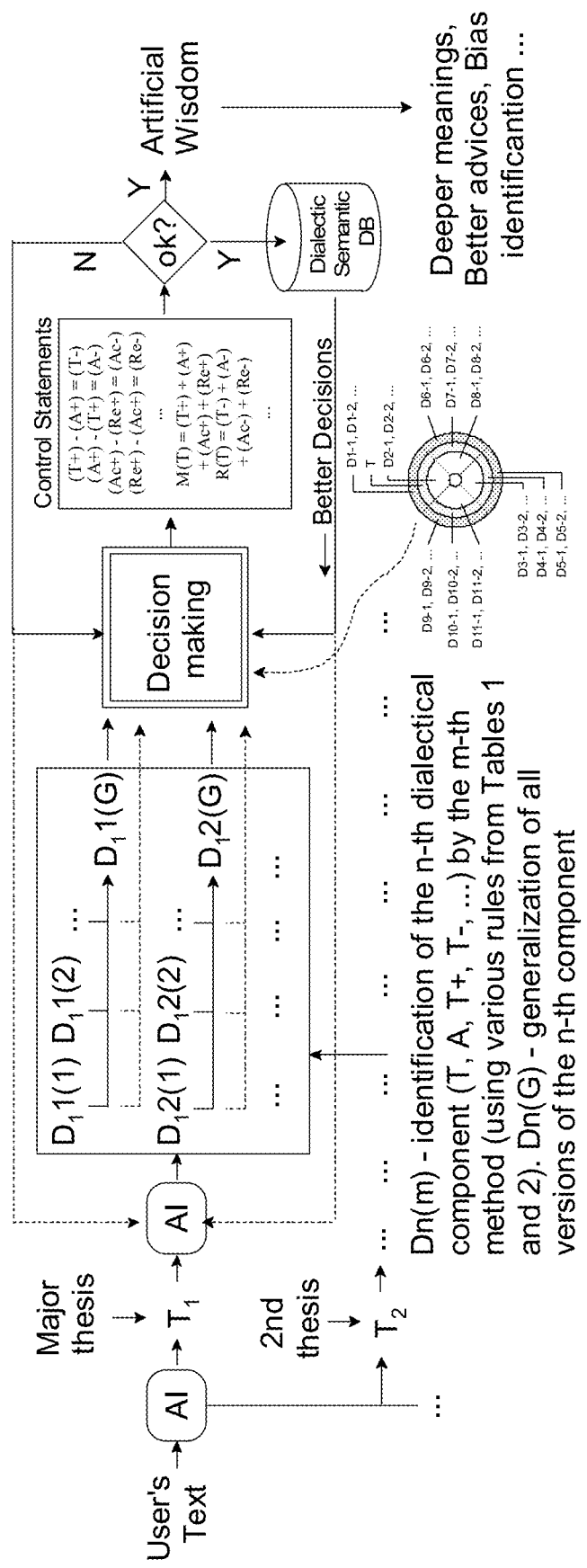
FIG. 9C is a diagram illustrating a process flow for generating dialectic wheels according to certain embodiments.

FIG. 9C is a diagram illustrating a process flow for generating dialectic wheels according to certain embodiments. This exemplary process flow illustrates how the rules in Table 3 can be practically applied in some embodiments. This is merely intended to provide an exemplary logical scheme, whereas examples of implementation architectures are discussed separately throughout this disclosure.

In FIG. 9C, a user's text (e.g., input string 115) is reduced to one or more major theses that are then converted into dialectical components (Dn). D1 means T+, D2–T–, etc. Each component can be identified by many alternative methods (using constraints in FIG. 5 and Table 3), that are distinguished by index m. For instance, T+ can be identified either directly from T, as its "positive, constructive, and subtle side", or through intermediate step of A–, as its opposition (denoted as T+=A(A–)). Cn-G is generalization of all possible values of the n-th component. The decision as to which value is the best, or which new value should be generated, can be made by either the user (based on a simultaneous perception of a holistic picture represented by the dialectic wheel), or by an independent AI system (e.g., a language model). All decisions can be ranked by their reliabilities and used to enhance the accuracy of subsequent predictions through custom "Value Bots", employing methods like transfer, incremental, or few-shot learning. (This example employs DSKG, Dialectic Semantic Knowledge Graph, and DKM, Dialectic Knowledge Manager).

Bias Evaluation Examples

In many instances, the responses produced by the language model 140 can include bias, even for the most advanced AI generative language models. This can be attributed, at least in part, to biased content that is included in large scale datasets typically used to train these models.

To address this problem, in some embodiments, the dialectic logic engine 150 can include and/or execute bias evaluation functions 190 that are capable of detecting, filtering, and/or removing bias from responses generated by the language model 140. The bias evaluation functions 190 can improve the precision, accuracy, and objectivity of the dialectic parameters 160 and/or dialectic outputs 170 derived by the dialectic analysis system 130.

In certain embodiments, some or all of the responses generated by the language model 140 (e.g., in connection with generating dialectic parameters 160, dialectic outputs 170, etc.) can be analyzed using the bias evaluation functions 190 to detect whether the responses include bias and/or exceed a threshold level of bias. In response to detecting bias in a language model response and/or detecting that the bias in the response exceeds a threshold level of bias, the dialectic logic engine 150 can generate a prompt 152 to request a revised or updated response string from the language model 140. Each revised or updated response from the dialectic logic engine 150 also can be analyzed by the bias evaluation functions 190 and the dialectic logic engine 150 may repeatedly request revised or updated response strings until a response is received that does not include bias (or includes an acceptable level of bias).

The bias evaluation functions 190 can utilize various techniques to detect bias in the responses generated by the language model 140. In some cases, the bias evaluation functions 190 generate prompts 152 that include the responses generated by the language model 140 and transmit the prompts 152 to the language model 140 for bias evaluation purposes. In response to receiving these prompts 152, the language model 140 may execute one or more NLP tasks 145 (e.g., one or more sentiment analysis tasks 145I) on the responses generated by the language model 140 and return a value (e.g., a numerical value ranging from 0 to 1). This numerical value can be compared to a threshold that indicates whether or not the response is acceptable, or whether a revised or updated string should be obtained. As explained below, other bias detection techniques also can be employed.

Table 4 shows an example of initial testing results produced by a language model 140 (e.g., GPT 4.0) in generating a dialectic wheel 172 for T="God exists" (see FIG. 8A). Each value in this table can be obtained by applying one or more parameter constraint conditions 155 (such as the exemplary conditions in FIG. 5) and/or one or more output constraint conditions 156 (such as the exemplary conditions in Table 3). Bolded areas in the table indicate the largest discrepancies from the final decisions that were made after considering all information from the $3^{rd}$ and $4^{th}$ columns. The $5^{th}$ column was obtained by a human expert after considering all AI suggestions. In some embodiments, these decisions can be fed back into an AI training module that is utilized to train the language model 140.

TABLE 4

| Dn | Rule | AI (GPT 4.0) | Dn(G) | Decision |
|---|---|---|---|---|
| 1) T | | God Exists (1.0) | | God Exists |
| 2) T+ | + of T | Hope, Guidance (0.9) | Enlightenment (0.8) | Spirituality |
| | A(A–) | Meaningfulness (0.9) | | |
| 3) T– | – of T | Conflict, Fear (0.8) | Turmoil (0.7) | Fanaticism |
| | A(A+) | Irrationality (0.7) | | |
| | 1 | Illusion (0.6) | | |
| 4) A | A(T) | God doesn't exist (1.0) | | God doesn't exist |
| 5) A+ | + of A | Rationality (1.0) | Stability (0.8) | Rationality |
| | A(T–) | Harmony, Security (.6) | | |
| 6) A– | – of A | Nihilism (0.3) | Pessimism (0.5) | Materialism |
| | A(T+) | Despair, Misdirect (.2) | | |
| | 2 | Cynicism (0.4) | | |

TABLE 4-continued

| Dn | Rule | AI (GPT 4.0) | Dn(G) | Decision |
|---|---|---|---|---|
| 7) Ac | 5 | Questioning (1.0) | | Questioning |
| 8) Ac+ | 6<br>A(Re-) | Dialogue, Understand.<br>Moderation, Accuracy | Harmony (0.3) | Inquiry |
| 9) Ac- | 7<br>3<br>A(Re+) | Dogmatism, Ignorance<br>Empty Talk (0.1)<br>Confusion, Obscurity | Misguidance (0.2) | Skepticism |
| 10) Re | 8 | Faith, Revelation (0.6) | | Experiencing |
| 11) Re+ | 9<br>A(Ac-) | Insight, Clarity (0.8)<br>Open-mindedness (0.9) | Enlightenment (0.9) | Receptiveness |
| 12) Re- | 10<br>4<br>A(Ac+) | Extremism, Misinterpret<br>Isolation, Misapplication<br>Miscommunication (0.7) | Division (0.8) | Crisis, Trauma |
| 13) T+,<br>A+, Ac+,<br>Re+ | 11 | Hope complements<br>Rationality, only when<br>Dialogue complements<br>Insight, and vice<br>versa (0.8) | Enlightenment<br>complements<br>Stability only when<br>Harmony<br>complements<br>Enlightenment (0.7) | Spirituality<br>Complements<br>Rationality, only<br>when Inquiry<br>complements<br>Receptiveness |
| 14) T<br>deeper<br>meaning | 13 | True existence of God<br>brings Hope,<br>Rationality, Dialogue,<br>Insight | . . . Enlightenment,<br>Stability, Harmony | . . . Spirituality,<br>Rationality,<br>Inquiry,<br>Receptiveness |
| | 14 | False existence of God<br>brings conflict, nihilism,<br>dogmatism, extremism | . . . turmoil,<br>pessimism,<br>misguidance,<br>division | . . . fanaticism,<br>materialism,<br>skepticism, crisis |

In the above table, the letters refer to respective parameter constraint conditions 155 from FIG. 5, the numbers refer to respective output constraint conditions 156 from Table 3, and A(X) indicates opposition of X. Additionally, the numbers in parentheses indicate Similarity between the given concept and the one in the last column, as estimated by GPT 4.0

In particular, the numbers in parentheses indicate similarity between the intermediate and final concepts (0—dissimilar, 1—identical), representing the simplest type of bias estimation. The dissimilar concepts (bolded areas) indicate biased responses generated by the language model 140 in attempting to enforce constraint conditions (e.g., such as parameter constraint conditions 155 and/or output constraint conditions 156). For instance, in the 6$^{th}$ row, while generating parameter A–(negative side of non-existence of God) during a testing phase, an AI language model suggested "Nihilism", "Despair" and "Cynicism", while the balanced decision is "Materialism". In the 9th row, for parameter Ac–(transformation of Spirituality into Materialism) the AI language model also suggested "Dogmatism" and "Empty Talk", while the weighted decision is "Skepticism". This demonstrates that current AI language models can be misleading in explaining spiritual matters and often generate inaccurate responses.

In Table 4, the bias estimations are based on a similarity to a final decision. However, other bias estimation techniques also can be utilized. In Table 5 below, bias estimation is performed based on sentiment analysis. In Table 6, cultural or ideological bias detection is performed.

TABLE 5

| Dn | Rule | AI (GPT 4.0) | S | Error Type | Decision |
|---|---|---|---|---|---|
| 1) T | | Vaccination | 1.0 | | Vaccination |
| 2) T+ | + of T<br>A(A-) | Immunization<br>Resilience | 0.9<br>0.6 | Too broad | Specific Protection |
| 3) T- | – of T<br>A(A+)<br>1 | Overvaccination<br>Dependence<br>Coercion | 0.7<br>0.2<br>0.3 | Too vague | Artificial Immunity |
| 4) A | A(T) | Non-Vaccination | 1.0 | | Non-Vaccination |
| 5) A+ | + of A<br>A(T-) | Autonomy<br>Under-vaccination | 0.2<br>0.4 | Can't be (–) | Natural Immunity |
| 6) A- | – of A<br>A(T+)<br>2 | Vulnerability<br>Antivaccination<br>Vulnerability | 0.9<br>0.5<br>0.9 | Too vague<br>Too vague<br>Too vague | Specific<br>Vulnerability |
| 7) Ac | 5 | Hesitancy/Refusal | 1.0 | | Hesitancy |
| 8) Ac+ | 6<br>A(Re-) | Infection/Exposure<br>Non-vaccination | 0.1<br>0.2 | Can't be (–)<br>Same as A | Healthy Lifestyle |
| 9) Ac- | 7<br>3<br>A(Re+) | Exposure/Risk<br>Disease Spread<br>Outbreak | 0.4<br>0.6<br>0.6 | Exaggerate<br>Exaggerate | Misguidance |
| 10) Re | 8 | Education/Trust | 1.0 | | Education |
| 11) Re+ | 9<br>A(Ac-) | Precaution/Immunization<br>Safety | 0.2<br>0.3 | Too vague<br>Too vague | Specific<br>Knowledge |
| 12) Re- | 10<br>4<br>A(Ac+) | Vaccination/Intervention<br>Preventive Health<br>Immunity | 0.1<br>0.2<br>0.3 | Can't be (+)<br>Can't be (+)<br>Can't be (+) | Unhealthy Lifestyle |

TABLE 5-continued

| Dn | Rule | AI (GPT 4.0) | S | Error Type | Decision |
|---|---|---|---|---|---|
| 13) T+, A+, Ac+, Re+ | 11 | Immunization is complementary with autonomy only when Infection is complimentary with precaution | 0.7 | Morally wrong | Specific Protection is complimentary with natural immunity only when healthy lifestyle is complimentary with specific knowledge |
| 14) T deeper positive | 13 | 'True' vaccination brings public health protection through community immunity | 0.8 | Too vague | . . . Specific Protection, Natural Immunity, Healthy Lifestyle, Specific Knowledge |
| 15) T deeper negative | 14 | Risks of Vaccination include Mild side effects (pain at injection site, fever) | 0.2 | Too narrow, down-playing | . . . Artificial Immunity, Misguidance, Specific Vulnerability, Unhealthy Lifestyle |
| 16) T measuring | 15 | Vaccination should be measured using the scales of Efficacy, Safety, Immunogenicity, Coverage | 0.8 | Too narrow | . . . specificity of protection, lifestyle healthiness, natural immunity strength, specificity of knowledge |

In Table 5, the letters refer to respective parameter constraint conditions 155 from FIG. 5 and the numbers refer to output constraint conditions 156 from Table 3. S equals the similarity between the given concept and the one in the last column, as estimated by GPT 4.0.

Table 5 shows analysis of T=Vaccination (see FIG. 8B), indicating large bias in our general perception. Here, bolded areas indicate much more serious biases that can be seen using the most primitive sentiment analysis. Step 5—positive side of non-vaccinating—suggested negative statement ("Under-vaccination"). Row 8—positive action—suggested negative actions ("Infection" and "Non-vaccinating"). Row 12—negative side of reflection—suggested positive actions ("Vaccinating" and "Preventive Health"). Row 13 suggested morally wrong statement ("vaccination is as complimentary to autonomy, as infection is complimentary to precaution"), essentially denying the autonomy and natural immunity whatsoever. Row 15 downplays the risks of vaccination, ignoring specific health effects and disrupted lifestyles. An assumption that natural immunity is not enough for being safe automatically limits freedom of living independently.

Table 6 shows test results demonstrating cultural or ideological bias (which also be referred to as "analysis using prior knowledge") in the responses produced by an exemplary language model. In this example, T=Logging (FIG. 8C), for which GPT 4.0 yields bias right from the very first step. It suggests A=Reforestation instead of Preservation ($4^{th}$ row in Table 5), as if artificial plantations could replace natural forests. Therefore, although semantically Reforestation is close to Preservation, culturally and ideologically there is a huge gap. Thus, the positive side of forest preservation (A+) is not simply "more trees", but our better mental health ($5^{th}$ row). The negative side of forest preservation (A−) is not Decline, but simply Material Inconvenience ($6^{th}$ row). These types of biased responses produced by a language model can produce radically distorted statements in the end of table ($12^{th}$ and $14^{th}$ rows).

TABLE 6

| Dn | Rule | AI (GPT 4.0) | Dn(G) | Decision |
|---|---|---|---|---|
| 1) T | | Logging (1.0) | | Logging |
| 2) T+ | + of T | Productivity (0.8) | Development (0.7) | Material Convenience |
| | A(A−) | Settlement (0.4) | | |
| 3) T− | − of T | Deforestation (0.1) | Degradation (0.4) | Mental Illness |
| | A(A+) | Deterioration (0.6) | | |
| | 1 | Depletion (0.5) | | |
| 4) A | A(T) | Reforestation (0.8) | | Preservation |
| 5) A+ | + of A | Restoration (0.7) | Reforestation (0.2) | Mental Health |
| | A(T−) | Afforestation (0.2) | | |
| 6) A− | − of A | Displacement (0.1) | Decline (0.7) | Material Inconvenience* |
| | A(T+) | Inactivity (0.2) | | |
| | 2 | Stagnation (0.2) | | |
| 7) Ac | 5 | Sustainability (1.0) | | Sustainability |
| 8) Ac+ | 6 | Therapy (0.8) | Healing (0.8) | Nurture |
| | A(Re−) | Care (0.9) | | |
| 9) Ac− | 7 | Degradation (0.2) | Decay | Coddling, Inhibiting |
| | 3 | Stagnation (0.5) | | |
| | A(Re+) | Stagnation (0.5) | | |

TABLE 6-continued

| Dn | Rule | AI (GPT 4.0) | Dn(G) | Decision |
|---|---|---|---|---|
| 10) Re | 8 | Exploitation (1.0) | | Exploitation |
| 11) Re+ | 9<br>A(Ac−) | Innovation (0.9)<br>Improvement (0.8) | Progress | Savviness |
| 12) Re− | 10<br>4<br>A(Ac+) | Neglect (1.0)<br>Disruption (0.5)<br>Neglect (1.0) | Dysfunction | Neglect |
| 13) T+, A+,<br>Ac+, Re+ | 11 | Progress and Reforestation are complimentary only when Therapy and Innovation are complimentary (0.7) | | Material Convenience and Mental Health are complimentary only when Therapy and Savviness are complimentary |
| 14) T deeper positive | 13 | 'True' logging brings Economic growth and material convenience | | . . . Progress, Mental Health, Nurturing, Savviness |
| 15) T deeper negative | 14 | 'False' logging brings Biodiversity loss, deforestation, environmental degradation (0.5) | | . . . Mental Illness, Suffocation, Material Inconvenience, Neglect |
| 16) T measuring | 15 | Logging should be measured on the scales of Sustainability, environment. impact, economic viability, biodiversity Preservation, carbon sequestration (0.2) | | . . . Mental Health, Savviness, Material Convenience, Nurturing |

Due to the multiplicity of constraints (e.g., those in FIG. 5 and Table 3), currently available AI language model most often fails to satisfy all of constrains, although they may satisfy at least some of the constraints. In view of such, the simultaneous consideration of all the results corresponding to the dialectic parameters 160 can be beneficial in arriving at the best decision. Therefore, in some embodiments, the dialectic logic engine 150 can enforce the constraints after all the values of the dialectic parameters 160 are initially determined (and/or after all the values of the dialectic parameters 160 are established in each iteration of the refining process).

FIG. 9A is a diagram illustrating a process flow for using dialectical rules for the automated bias identification. The dialectical bias represents the most general type of all biases, as it emerges from direct semantic oppositions. All other biases, including confirmation, cultural, and ideological, are not strictly related to semantic oppositions, and thus represent narrower cases. In some cases, dialectical bias can be viewed as the extent to which all dialectical conditions are upheld in any given text or consideration. Table 6 lists some exemplary conditions that can be assigned with different weights.

Table 7 shows examples of dialectical bias conditions (e.g., destructivity-constructively conditions). In moral maxims we can use the following equivalences: True=Right=Positive=Good=Constructive, and False=Wrong=Negative=Bad=Destructive.

TABLE 7

| N | The extent to which the text: | Moral Explanation |
|---|---|---|
| 1 | . . . implies or reinforces A+ | 'True' ideas reinforce the positive side(s) of their oppositions |
| 2 | . . . implies or reinforces Ac+ and Re+ | 'True' ideas induce positive actions and reflections |
| 3 | . . . reinforces complementarity of T+, A+, Ac+, Re+ | Objective reality is superposition of many subjective realities |
| 4 | . . . stipulates T−, A−, Ac−, Re− | 'False' ideas reinforce the negative sides of T, A, Ac, Re |
| 5 | . . . guards against T−, A−, Ac−, Re− not just merely 'negating wrong', but telling a touching parable | Anything Bad gives raise to the Good only through the right lessons |
| >5 | . . . implies or reinforces any given rule from Table 3 | True statements must adhere to all dialectical rules |
| . . . | . . . | . . . |

Table 8 shows the bias identification results for representative texts using the bias detection functions 190 based on conditions 1 and 4 from Table 11 (below) and GPT 4.0. There is clear qualitative agreement with the prevailing public sentiment, while the numeric scores provide an additional insight. The particular values depend on the dialectical conditions and AI prompts that are being used.

TABLE 8

| Text | Dialectical Bias |
| --- | --- |
| The Communist Manifesto (1848) by K. Marx and F. Engels, Part I | 0.1-Deeply Biased: The text is heavily biased towards T– or A–, with very little or no acknowledgment of A+. |
| Bible, John Chapter 1, King James Version (KJV) | 0.5-Neutral Description: The text is descriptive and neutral, not strongly aligning with A+ or T–/A– |
| US Constitution, Article I (Senate and House of Representatives) | 0.5-Neutral Description (as above) |
| "The Declaration of Independence" (1776) by Thomas Jefferson | 0.6-Moderate Constructivity: The text favors A+ over T– or A–, but still includes some negative aspects |
| "I Have a Dream" speech (1963) by Martin Luther King Jr | 0.9-Nearly Ideal: The text aligns very closely with A+, avoiding T– and A– effectively. It represents a nearly ideal constructive approach |

The bias evaluation functions 190 executed by the dialectic logic engine 150 can be configured to identify and/or correct bias outputs from the language model 140 in any of the above-described scenarios.

Exemplary Conflict Resolution Applications

As mentioned above, the dialectic parameters 160 and/or dialectic outputs 170 (e.g., dialectic wheels 172) can be utilized in connection with various types of secondary applications 180. Below is an example of how the dialectic parameters 160 and/or dialectic outputs 170 can be utilized in connection with a conflict resolution application (e.g., a mediation application 108F and/or similar type of application).

The semantic simplicity of constraints in FIG. 5 and Table 3 can be used to enhance the mutual understanding of the opponents, waking up their honesty and self-obligatory considerations. Any demand (T) brings an obligation to reinforce the positive side of an opponent (A+), eliminating an inherent unfairness of the demand by itself. If T=Unfair Demand, then A=Fair Demand, and A+=Mutual Satisfaction. Table 9 gives some examples of demands vs. obligations.

TABLE 9

| Situation | Side | Demands (T) | Obligations (A+) |
| --- | --- | --- | --- |
| One sidedness | Any side | Anything unfair | Mutual satisfaction |
| Inequality | Communists | Social equality | Motivational diversity |
| Pandemics | Government | Vaccination is mandatory | Strengthen natural immunity |
| Deforestation | Industry | Material convenience | Strengthen spiritual values |
| Workspace stress | Employees | Manage Workplace Stress | Productivity boost |
|  |  | Improve Communication | Clearer directives |
|  | Employers | Meet deadlines | Adaptability |
|  |  | High performance | Sustainable work pace |
| Cuban Missile crisis | US | Removal of Soviet Missiles from Cuba | Preservation of Strategic Deterrence |
|  |  | No Further Weapons to Cuba | Strengthening Cuba's defense |
|  | USSR | Guarantee Against Invasion of Cuba | Global Peace and Stability |
|  |  | Removal of US Missiles from Turkey | Mutual Security Assurance |

Negative Scenario: Every side writes down its arguments and demands (T1-1, T1-2, . . . , T2-1, T2-1, . . . ). Every argument is converted into a half-wheel, that immediately imposes certain obligations to each side (see Table 10 below).

TABLE 10

| N | User 1 | User 2 | Statements | Examples for T(X1) in workplace conflict |
|---|---|---|---|---|
| | Can Negotiate | Can Defend | T(21), T(22), . . . | Meet Deadlines |
| | Can Defend | Can Negotiate | T(11), T(12), . . . | Manage Workplace Stress |
| | Should Agree | Should Get | T(21)+, T(22)+, . . . , | Timeliness |
| | Should Get | Should Agree | T(11)+, T(12)+, . . . , | Work-life balance |
| | Must Yield | Must Get | A(11)+, A(12)+, . . . | Productivity boost |
| | Must Get | Must Yield | A(21)+, A(22)+, . . . , | Sustainable work pace |
| | Must Avoid | Must Avoid | All negatives | Micromanagement, etc. |

T−=what makes you feel bad, wrong, negative, destructive, rude, exaggerated, over-excited, imbalanced, overdeveloped, underdeveloped, biased, partial, regretful, ashamed, dependent, vulnerable, weak, depressed, guilty, blue, anxious, angry, etc.

T+=what makes you feel good, correct, positive, constructive, subtle, balanced, equitable, unbiased, impartial, appropriate, content, proud, independent, autonomous, resilient, strong, uplifted, guilt-free, cheerful, calm, peaceful, etc.

Multiple Theses Examples

In some embodiments, the dialectic logic engine 150 can be configured to derive and process multiple thesis parameters 160A from a single input string 115. Each thesis parameter 160 can be separately processed using the techniques described throughout this disclosure. Additionally, in some embodiments, the dialectic logic engine 150 can be configured to combine or merge the results of these processes in generating the dialectic outputs 170.

FIG. 9B shows that any text and/or users' opinions can be converted into multiple theses that, in turn, can be converted into various types of "Artificial Wisdom". Step 1 indicates extraction of the major theses (differentiated by the index k, that can also indicate the given theses relative importance). Step 2 implies that each thesis can be converted into dialectical components ($D_k1=T(k)+$, $D_k2=T(k)-$, etc.). Step 3 suggests that these components can be converted into a dialectic wheel based on the similarity of original theses, as outlined in Table 11 (which maintains all the same step numbers as in FIG. 9).

Table 11 shows an exemplary expanded decision-making framework that can be utilized by the dialectic logic engine 150 to process multiple theses.

TABLE 11

| N | Step | Meaning |
|---|---|---|
| 1 | Write down all theses (T(1), T(2), . . . ) | Summarize thoughts |
| 2 | Convert each T into half-wheel (T+, T, T−, A+, A, A−) using Tables 3 and FIG. 5 | Identify missing concepts |
| 3 | Align all Ts and As on a single circular framework with concentric layers, so that: | Create dialectical wheel |
| 3.1 | all positive statements (T(X)+, A(X)+) occur in the smallest layer closest to the center | Positive layer formation |
| 3.2 | all negative statements (T(X)−, A(X)−) occur in the largest layer furthest from the center, | Negative layer formation |
| 3.3 | neutral statements (T(X), A(X)) occur in the middle layer between positive and negative statements | Neutral layer formation |
| 3.4 | each half-wheel occurs on a single diagonal line, whereby T(X)+, T(X), T(X)− on one side of the wheel, whereas A(X)+, A(X), A(X)− on the opposite side of the wheel | Obey dialectical symmetry from Table 3 and FIG. 5 |
| 3.5 | the most similar statements and half-wheels occur closest to each other (in adjacent positions-see the 'causality' control statements in Table 12) | Prerequisite for circular causality |
| 3.6 | the most dissimilar half-wheels should lay on perpendicular diagonals | Verify circular causality |
| 3.7 | circular sequence represents the most natural causal transformations | As above |
| 4 | Optional: generate additional control statements for checking the correctness of the wheel (Table 12) | Verify the wheel |
| 5 | Optional: Merge adjacent Ts or segments if they look redundant, leaving only the most essential factors for consideration | Optimize the wheel |
| 6 | Optional: If required, repeat all previous steps, until the wheel is good enough | Optimize the wheel |
| 7 | Optional: Insert actions and reflections between the adjacent segment (see Table 12, Causality Expansion) | Finalize the wheel |
| 8 | Generate Artificial Wisdom to solve the problems | |

Table 12 identifies control statements that are useful for verifying the correctness of the expanded decision-making framework.

TABLE 12

| N | Rule Statement | Comment |
|---|---|---|
| 1 | T(X)+ and A(X)+ reinforce each other | Individual |
| 2 | T(X)+ without A(X)+ yields T(X)− | Truths |
| 3 | A(X)+ without T(X)+ yields A(X)− | as in |
| 4 | Ac(X)+ without Re(X)+ yields Ac(X)− | Table 3 |
| 5 | Re(X)+ without Ac(X)+ yields Re(X)− | |
| 6 | T(X) transforms T(X − 1) into T(X + 1) | Natural |
| 7 | T(X)+ transforms both T(X − 1)+ and T(X − 1)− into T(X + 1)+ | Causality |
| 8 | T(X)− transforms both T(X − 1)+ and T(X − 1)− into T(X + 1)− | conditions |
| 9 | Same for A(X), A(X)+, A(X)− | |
| 10 | Ac(X) transforms T(X) to T(X + 1) | Causality |
| 11 | Ac(X)+ transforms T(X)− to T(X + 1)+ | Expansion |
| 12 | Ac(X)+ transforms T(X)+ to T(X + 1)+ | |
| 13 | Ac(X)− transforms T(X)+ to T(X + 1)− | |

TABLE 12-continued

| N | Rule Statement | Comment |
|---|---|---|
| 14 | Ac(X)– transforms T(X)– to T(X + 1)– | |
| 15 | Re(X) transforms A(X) to Z(X + 1) | |
| 16 | Re(X)+ transforms A(X)– to A(X + 1)+ | |
| 17 | Re(X)+ transforms A(X)+ to A(X + 1)+ | |
| 18 | Re(X)– transforms A(X)+ to A(X + 1)– | |
| 19 | Re(X)– transforms A(X)– to A(X + 1)– | |
| 20 | T(X)+ and A(X)+ are complementary only when T(X ± M/2)+ and A(X ± M/2)+ are complementary, and vice versa (here M = half of the maximum X) | Collective Truths: |
| 21 | T(X)+ requires T(X ± M/2)+, A(X)+, and A(X ± M/2)+ | Desired |
| 22 | Any T(X) is often related to all other T(X), but it may also bring any of A(X) (X varies from 1 to maximum X) | Factual |
| 23 | 'True' T(X) should ideally bring all T+ and A+ | Desired |
| 24 | Misrepresented T(X) may bring all T– and A– | Undesired |
| . . . | . . . | . . . |

In the above table, X is the statement number, varying from 1 to M (maximal value). It is assumed that numbers follow the order of the natural causation, so that T(X) is most similar to T(X−1) and T(X+1), while A(X) is most similar to (X−1) and A(X+1). Note that T(M+1)=A(1) A(M+1)=T(1) T(0)=A(M), and A(0)=T(M).

Table 13 exemplifies the analysis of the introduction to The Communist Manifesto by K. Marx and F. Engels, (part I: Bourgeois and Proletarians). During testing, a language model was asked to extract 3 major theses (denoted as T(X)). Their positive sides (T(X)+) coincide with the declared goals of the Manifesto. The last two rows outline conditions for their practical achievement (based on the rule 11 a from Table 3) and potential positive and negative outcomes (based on rules 23 and 24 from Table 11).

TABLE 13

| Dn | Thesis 1 (X = 1) | Thesis 2 (X = 2) | Thesis 3 (X = 3) |
|---|---|---|---|
| T(X) | Class Struggles | Bourgeoisie Revolution | Social Development |
| T(X)+ | Social Justice | Progressive Equality | Social Harmony |
| T(X)– | Class Warfare | Violent Overthrow | Social Dependence |
| A(X) | Social Harmony | Aristocratic Conservatism | Social Stagnation |
| A(X)+ | Social Cooperation | Peaceful Reform | Self-reliance |
| A(X)– | Social Apathy | Stagnation and Inequality | Isolation |
| Ac($X^b$) | Collaboration | Traditional values | Exclusion, Neglect |
| Ac($X^b$)+ | Reconciliation | Cultural Stability | Independence |
| Ac($X^b$)– | Regression | Rigidity and Dogmatism | Abandonment |
| Re($X^b$) | Polarization | Economic liberalization | Inclusion, Innovation |
| Re($X^b$)+ | Innovation | Market Freedom | Unity, Progress |
| Re($X^b$)– | Discontent | Deregulation frenzy | Disruption |
| 11a | Social justice requires social cooperation, reconciliation, and innovation | Progressive equality results from peaceful reform, cultural stability, and market freedom | Social harmony requires self-reliance, independence, unity, and progress |

NOTE:
T(1) typically brings sum of T(X), but it may also bring A(X). Misrepresented, it may bring sum of T(X)– and A(X)–: Class struggle typically brings Bourgeoisie Revolution and social development, but it may also bring social harmony, aristocratic conservativism, or social stagnation. Misrepresented, it risks causing warfare, violence, dependence, apathy, stagnation, inequality, and isolation.

Figure 10C:
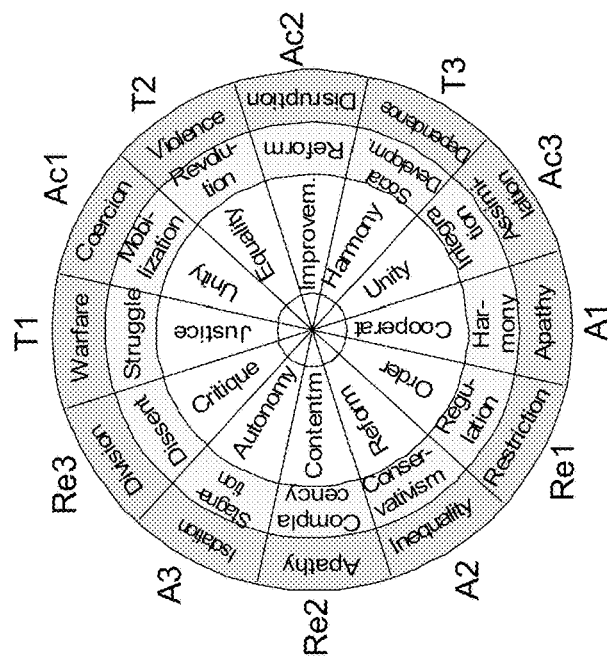
FIG. 10C is an exemplary dialectic wheel according to certain embodiments.
Figure 10B:
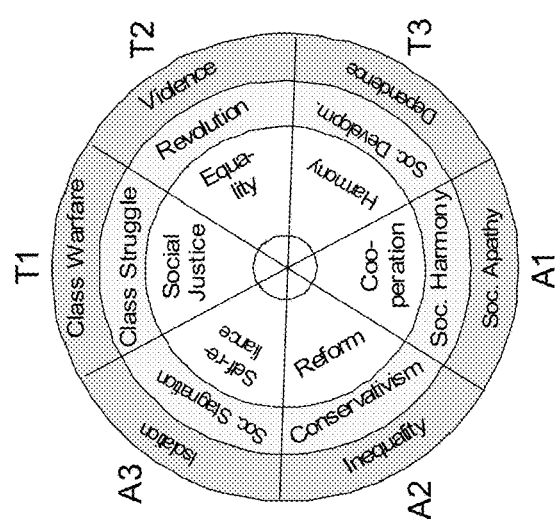
FIG. 10B is an exemplary dialectic wheel according to certain embodiments.
Figure 10A:
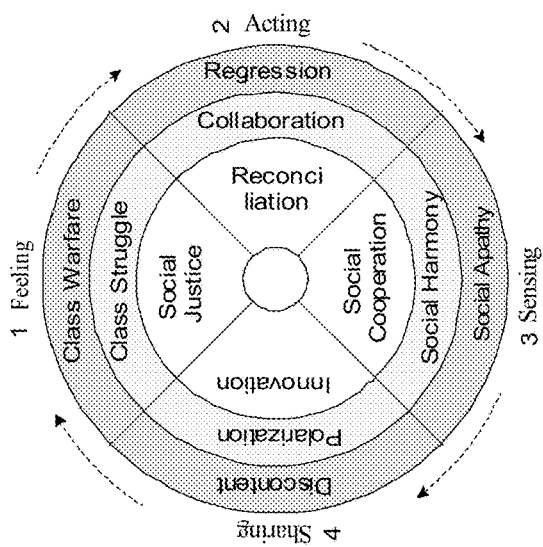
FIG. 10A is an exemplary dialectic wheel according to certain embodiments.
Figure 12:
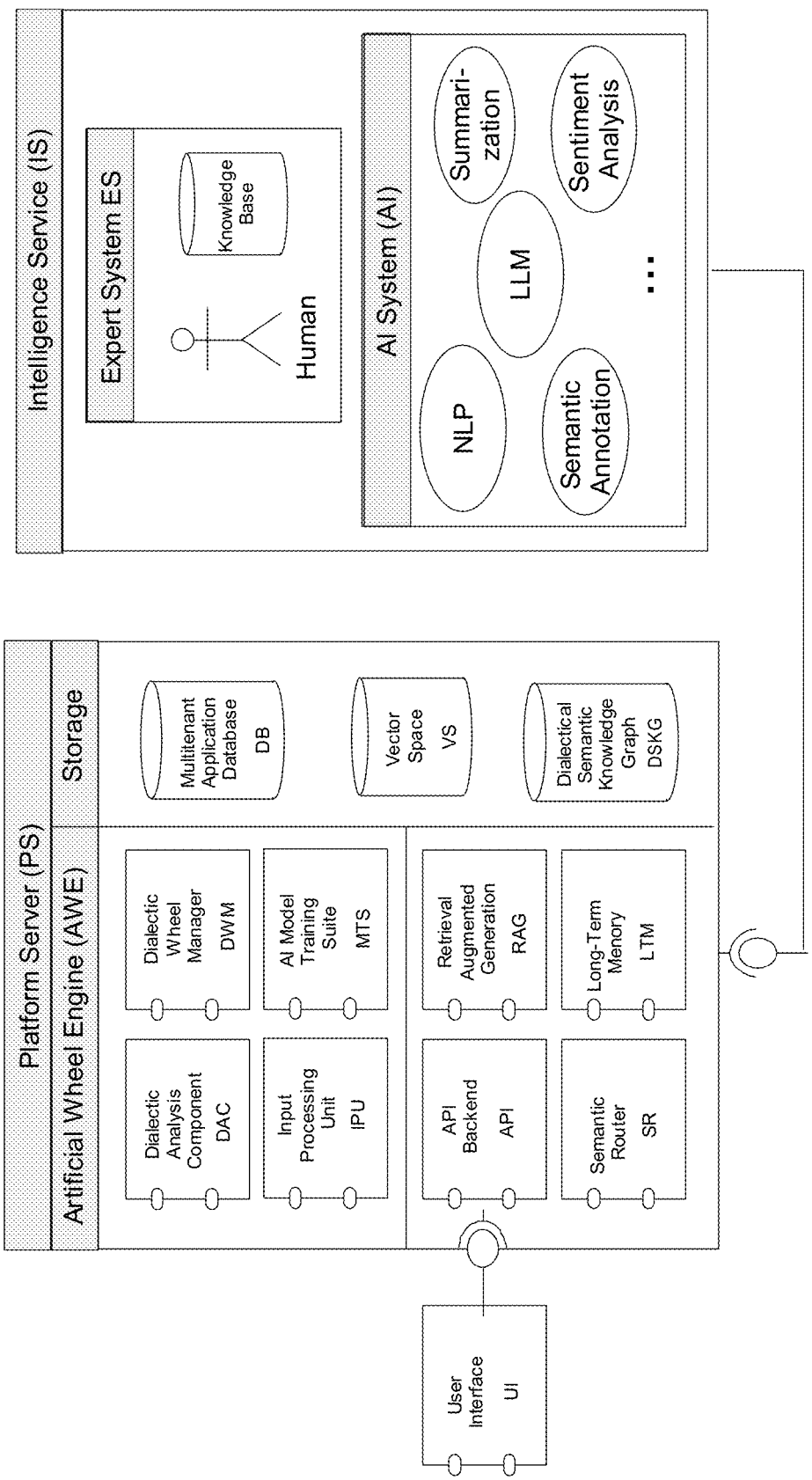
FIG. 12 is a diagram of an exemplary system according to certain embodiments.
Figure 13:
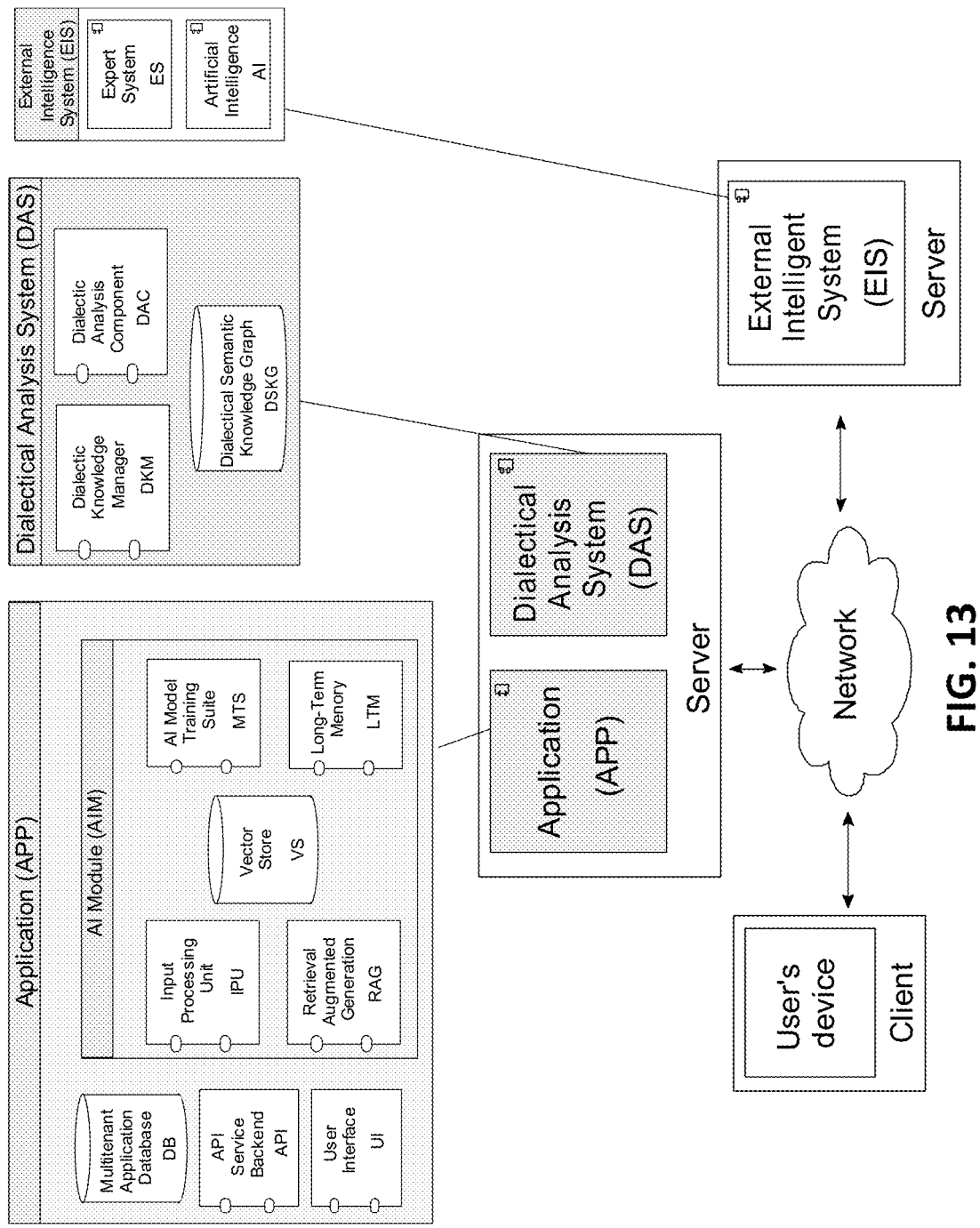
FIG. 13 is a diagram of an exemplary system according to certain embodiments.

The respective dialectic wheel for Thesis 1 is in FIG. 10A, while for all three theses in FIGS. 10B-C (which differ by the absence or presence of actions and reflections). Essentially, they represent three different 'situation maps' of the same story with different level of detail. In all maps the inner circle represents the desired development (going clockwise), the outer circle—the undesired (in either direction), the middle circle—the factual development that was observed so far. If the obtained maps are not useful enough, then it is considered these were not accurate enough. Given that the original theses (T1, T2, . . . ) are correct, the obtained situation maps are also correct.

Exemplary Poly-Circular Graphs

The above description provided examples of dialectic wheels 172 that connect adjacent concepts into two-dimensional networks. In certain embodiments, the dialectic logic engine 150 also can be configured to extend this concept to poly-circular graphs 174, which demonstrate or illustrate all possible interrelations between any concepts under consideration. These poly-circular graphs 174 are discussed below with reference to FIGS. 11A-11G.

The simplest case is when dealing with more than one possible antithesis. Consider example in FIG. 11A, in which a thesis (Love) yields three alternative antitheses (A1–, A2–, A3–). FIG. 11A shows the starting setup (which is an expanded version of the dialectic wheels discussed with reference to FIGS. 6A-6G and 7A-7H). FIGS. 11B and 11C illustrate poly-circular graphs 174 with positive and negative concepts, respectively. In contrast to flat wheels, poly-circular graphs usually (although not always) contain concepts of only one kind, either positive or negative, because they may form self-regulated system with resonant synchronization in which antagonistic elements cannot coexist (see below).

In some embodiments, a key step is to decide which positive side of antithesis (A+) is the most "complimentary"

to the original thesis (T or T+), and placing them in the diagonal positions. In this example, Objectivity (A2+) is chosen, yielding the flat wheel shown in FIG. 11D. Once all direct links between "diagonal" nodes are cancelled, the positive and negative effects can be merged into a single wheel again. FIGS. 11E-G represent even smaller wheels, each of which consider only one type of antithesis. In some cases, this may be the best approach to derive dialectical wheels when the starting conditions are not clear enough. The process can begin with poly-circular graphs 174 that consider all possible situations and then gradually reduce it to the optimum flat wheels.

The dialectic logic engine 150 can enforce various constraint conditions on the wheels (e.g., such as those set forth in FIG. 5 and Table 3). These conditions can be provided to the language model 140 as part of the processes shown in FIGS. 11A-C. In some cases, the responses generated by the language model 140 may lack correctness or sufficient accuracy (as identified by question marks in 11D-E). In this example, "Awareness" is not an overdevelopment of "Judgment" (D), and "Hate" is not an overdevelopment of "Autonomy" (E). This demonstrates the inability of many language models 140 to cope with all dialectical constraints, thus suggesting that the processes described herein can be used to test or assess the validity of language model 140 to deal with complex problems. In scenarios where a dialectic parameter associated with wheel is lacks sufficient accuracy or correctness (e.g., violates one or more constraint conditions), the dialectic logic engine 150 may communicate with the language model 140 to obtain new or revised responses as described above.

In certain embodiments, the poly-circular graphs 174 can be utilized to model higher consciousness. In a more general sense, poly-circular graphs 174 unify diverse viewpoints into a cohesive "Higher Truth", which is instrumental in discerning subjectivity from objectivity, fostering constructiveness, and resolving conflicts and dilemmas. If all transformations between any two or more concepts are collectively accepted, then they create extra-semantic meanings. Based on the Bayesian formula, the interaction between any two concepts (X and Y) yields "coupled" meanings (X|Y and Y|X), that further interact with other concepts (Z, . . . ), leading to a new "objective reality" (X|Y|Z| . . . ). This process, akin to an N-body interaction, is a form of simultaneous complementarity among many concepts.

In certain embodiments, the poly-circular graphs 174 can be utilized as meditative introspection tools. Poly-circular graphs 174 can be obtained from the two-dimensional "Value Maps", by estimating probabilities for "diagonal" links between non-adjacent concepts. Such tools allow for deep, meditative analysis, treating Value Maps as dynamic, regularly updated diaries.

In certain embodiments, the poly-circular graphs 174 also can be utilized for collective decision-making functions. This method applies in both organizational and public contexts, where diagonal probabilities are determined through voting and argument evaluation. Suitable for both practical dilemmas and deeper topics on platforms similar to Wikipedia®, participants contribute concepts, nodes, and arguments for linking or unlinking, along with ratings for existing nodes and arguments based on their linkage strength. All links and nodes are evaluated through direct voting and their pros and cons, with "good" nodes forming robust interlinked clusters resistant to "local biases" and "bad" nodes creating fragile linear or mono-circular chains.

In certain embodiments, the poly-circular graphs 174 also can be applied in blockchain applications. Participant contributions may be evaluated based on the validity of their nodes, links, and arguments, integrating with blockchain technology to facilitate decentralized collective decision-making. This system ensures every member's direct involvement in decision-making and rewards them based on their input's quality and activity level.

Exemplary Dialectic Training System Configurations

In certain embodiments, the dialectic analysis system 130 comprises a dialectic training system 200 that can be applied to fine-tune or train a language model 140 to generate human language responses that are useful for conducting the dialectic analyses described herein. As explained below, the dialectic training system 200 can execute various types of dialectic training procedures 230 to enhance the performance of the language models 140 with respect to generating responses used in these dialectic analyses. Additionally, the dialectic training system 200 can generate various types of training datasets 210 that are utilized in fine-tuning or training the language model 140.

The dialectic training procedures 230 and/or training datasets 210 can be utilized the improve the accuracy of outputs or responses generated by the language model 140 in connection with any type of dialectic analysis described in this disclosure and/or other types of dialectic analyses. In certain embodiments, the enhanced outputs of the language model 140 may be utilized in performing dialectic analyses that involve generating or deriving the one or more dialectic parameters 160 from textual content. Additionally, or alternatively, the enhanced outputs of the language model 140 may be utilized in dialectic analyses that involve generating or deriving one or more dialectic outputs 170 described herein. The enhanced outputs also may be utilized for conducting other types of dialectic analyses not specifically mentioned in this disclosure.

The dialectic training procedures 230 executed by the dialectic training system 200 on the language model 140 can generally include any training procedure that is designed to improve the performance of the language model 140 in connection with understanding or interpreting prompts 152 utilized in conducting these dialectic analyses and/or designed to improve the performance of the language model 140 in connection with generating responses to the prompts 152. In certain embodiments, the dialectic training procedures 230 may enhance the ability of the language model 140 with respect to interpreting or understanding prompts 152 designed to elicit dialectic parameters 160, dialectic outputs 170, and/or other textual content relevant to conducting dialectic analyses and/or the ability of the language model 140 to generate responses or outputs corresponding to dialectic parameters 160, dialectic outputs 170, and/or other textual content.

In certain embodiments, the dialectic training procedures 230 can enhance the ability of the language model 140 to perform one or more of one or more NLP tasks 145 (e.g., such as text interpretation tasks, question answering tasks 145C, and/or other tasks) for interpreting or understanding these prompts 152. The dialectic training procedures 230 also can enhance the ability of the language model 140 to perform one or more NLP tasks 145 (e.g., text generation tasks 145A, question answering tasks 145C, and/or other tasks) for generating the responses that are responsive to the prompts 152 and/or which are otherwise related to conducting the dialectic analyses.

The types of dialectic training procedures 230 applied to the language model 140 can vary. In certain embodiments, the dialectic training procedure 230 can include one or more supervised training procedures, one or more semi-supervised training procedures, and/or one or more unsupervised training procedures.

In certain embodiments, the dialectic training procedure 230 can correspond to, or include, a fine-tuning procedure 231 designed to enhance the capabilities of an existing or pre-trained language model 140. In some examples, the fine-tuning procedure 231 can utilize a domain-specific training dataset 210 comprising dialectic training data 220 to fine-tune or further train an existing model to better understand prompts 152 generated by the dialectic logic engine 150 in conducting dialectic analyses and/or to generate responses to the prompts 152.

Additionally, or alternatively, the dialectic training procedures 230 can correspond to, or be incorporated within, a model initialization procedure 232 that is designed to develop or train a new, custom language model 140. For example, the model initialization procedure 232 may include an initial training phase in which the model learns the statistical patterns and relationships within human language or text by adjusting its internal parameters (e.g., its weights and biases) through an optimization process (e.g., such as gradient descent or other optimization process). After the initial training phase, the dialectic training procedure 230 can be applied to optimize the language model's performance of specific NLP tasks 145 used in conducting in conducting dialectic analyses.

In some embodiments, the dialectic training procedure 230 can include a question answering (QA) training procedure 233 (regardless of whether the training procedure is applied in the context of a fine-tuning procedure 231 or a model initialization procedure 232). The QA training procedure 233 utilizes pairs of questions and corresponding answers to train the language model 140 to better understand questions or prompts related to dialectic analyses and to more accurately generate outputs related to dialectic analyses using the dialectic question answering datasets 225 described below. Amongst other things, the QA training procedure 233 can improve the ability of the language model to perform question answering tasks 145C and/or other NLP tasks 145 related to generating dialectic parameters 160 and/or dialectic outputs 170 based on prompts 152 designed to elicit dialectic parameters 160 and/or dialectic outputs 170.

The training datasets 241 utilized to train the language model 140 can include various types of dialectic training data 220. In general, the dialectic training data 220 can include any textual content that is useful for training a language model 140 to interpret or generate textual content used in dialectic analyses. In some embodiments, the dialectic training data 220 may comprise textual content derived from dialectical analyses described in this disclosure. For example, the dialectic training data 220 may comprise thesis parameters 160A, antithesis parameters 160B, positive thesis parameters 160C, negative thesis parameters 160D, positive antithesis parameters 160E, negative antithesis parameters 160F, action parameters 160G, positive action parameters 160H, negative action parameters 160I, reverse action parameters 160J, positive reverse action parameters 160K, negative reverse action parameters 160L, and/or other dialectic parameters 160 derived in connection with conducting dialectic analyses. Additionally, or alternatively, the dialectic training data may comprise textual content associated with dialectic outputs 170, such as data corresponding to, or derived from, parameter synopsis outputs 171, dialectic wheels 172, derivation string outputs 173, control statements 173A, etc.

Additionally, or alternatively, the dialectic training data 220 may comprise dialectic question answering datasets 225, which include pairs of questions/answers that are related to conducting dialectic analyses. For example, the dialectic question answering datasets 225 may comprise questions (or prompts 152) that can be utilized to elicit dialectic parameters 160, and the corresponding answers to those questions. Feeding the language model 140 with the question/answer pairs can enable the language model 140 to learn or understand the nuances of different types of dialectic questions or prompts 152, and to generate dialectic responses to those questions with greater accuracy and precision.

The content of the dialectic training data 220 and/or dialectic question answering datasets 225 may be derived or obtained from various sources. In some embodiments, some or all of the dialectic training data 220 may be obtained from data aggregated by the dialectic analysis system 130 (e.g., dialectic parameters 160, dialectic outputs 170, and/or other data derived from text strings submitted to the system). Additionally, or alternatively, some or all of the dialectic training data 220 may be derived from one or more human experts on dialectics. Additionally, or alternatively, some or all of the dialectic training data 220 may be derived from one or more domain-specific training datasets related to dialectics. The dialectic training data 220 can be derived or obtained from other sources as well.

In some embodiments, the dialectic training procedure 230 described herein includes at least two phases: a dataset generation phase, which generates or derives dialectic training data 220 used to train a language model 140, and a training phase, which fine-tunes or trains the learning model 140 using the dialectic training data 220. In the training phrase, a learning mechanism of the language model 140 may process or utilize the dialectic training procedure 230 to adapt its parameters and improve performance on dialectic domains.

In some embodiments, the learning mechanism of the language model 140 includes a forward propagation process in which the dialectic training procedure 230 is passed through the model to make predictions based on the current parameters of the language model 140. A loss computation function may compute a loss between labels (or answers for QA datasets) included in the dialectic training procedure 230, which quantifies the difference between the predicted values and the actual values. Additionally, a backpropagation and optimization process may be applied, which utilize the loss or error to update the parameters (e.g., weights and biases) of the language model 140 and to minimize the error between the predicted outputs and the actual target values. This learning process may be repeated for many epochs or iterations to gradually improve the model's performance on question answering tasks 145C and/or other NLP tasks 145.

In some embodiments, the dialectic training procedure 230 may include other phases in addition to the dataset generation and training phases. For example, in some embodiments, the dialectic training procedure 230 may include an initialization phase in which the weights and biases of the language model 140 are set to initial values based on processing of a large corpus of data. The dialectic training procedure 230 may include other phases, such as post-processing training phases, as well.

In some embodiments, during the dataset generation phase of the dialectic training procedure 230, the dialectic training system 200 can utilize a dataset generation function 240 to generate some or all of the dialectic training data 220 utilized to train the language model 140. The dataset generation function 240 can generally include any function or procedure that is configured to create or synthesize the dialectic training data 220 utilized to train the language model 140. In some examples, the dataset generation function 240 can include a data processing pipeline that applies multiple functions or processes to generate or derive the dialectic training data 220 from a text corpus. In some examples, the data processing pipeline may include functions that involve text collection, text preprocessing, text augmentation, compatibility filtering, bias removal, and/or text adaptation to generate dialectic training data 220 that is suitable for training the language model 140. Exemplary techniques for implementing a dataset generation function 240 are described below.

Figure 18A:
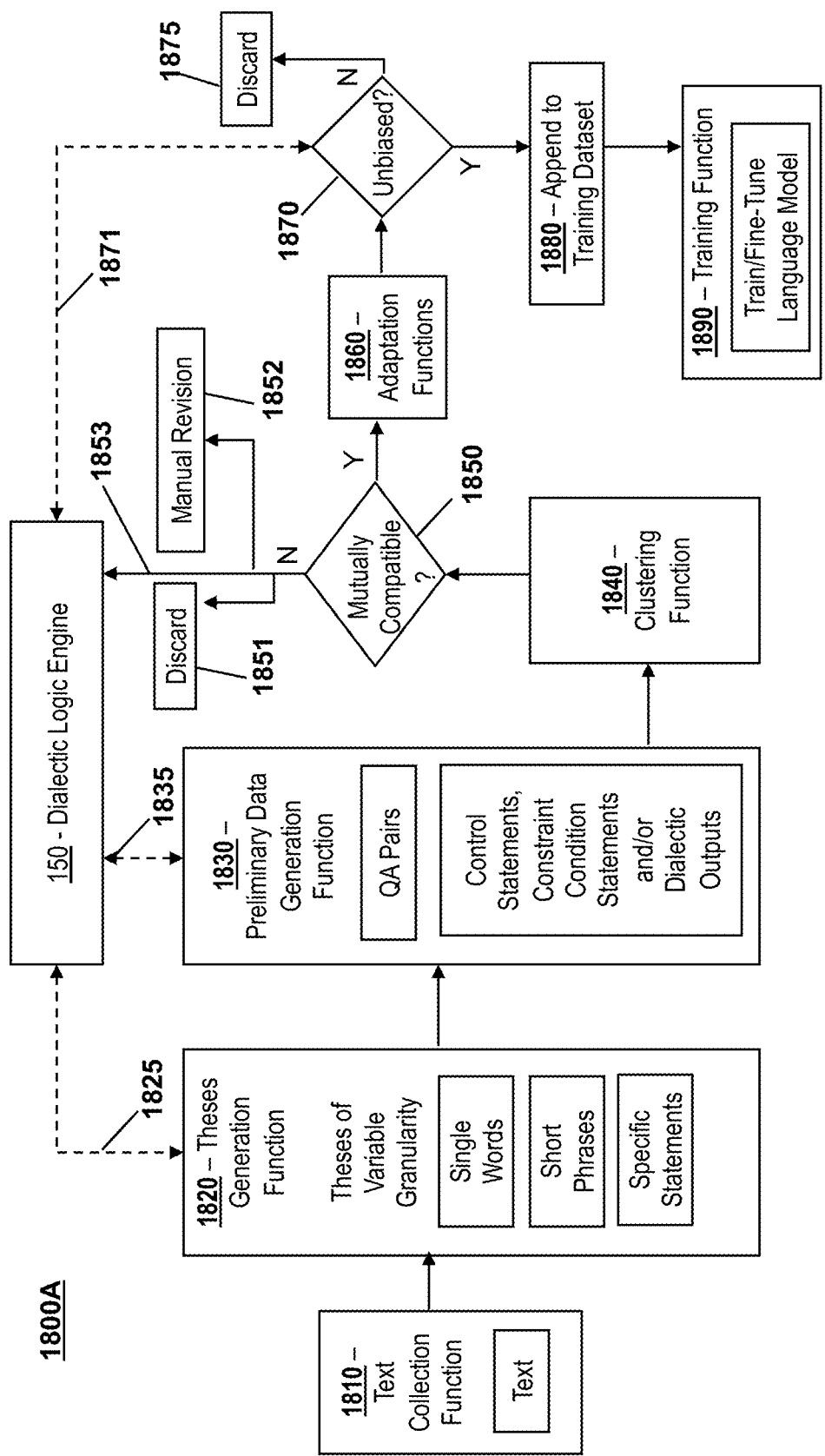
FIG. 18A is a flow diagram illustrating an exemplary dialectic training procedure according to certain embodiments.
Figures 18B, 18C:
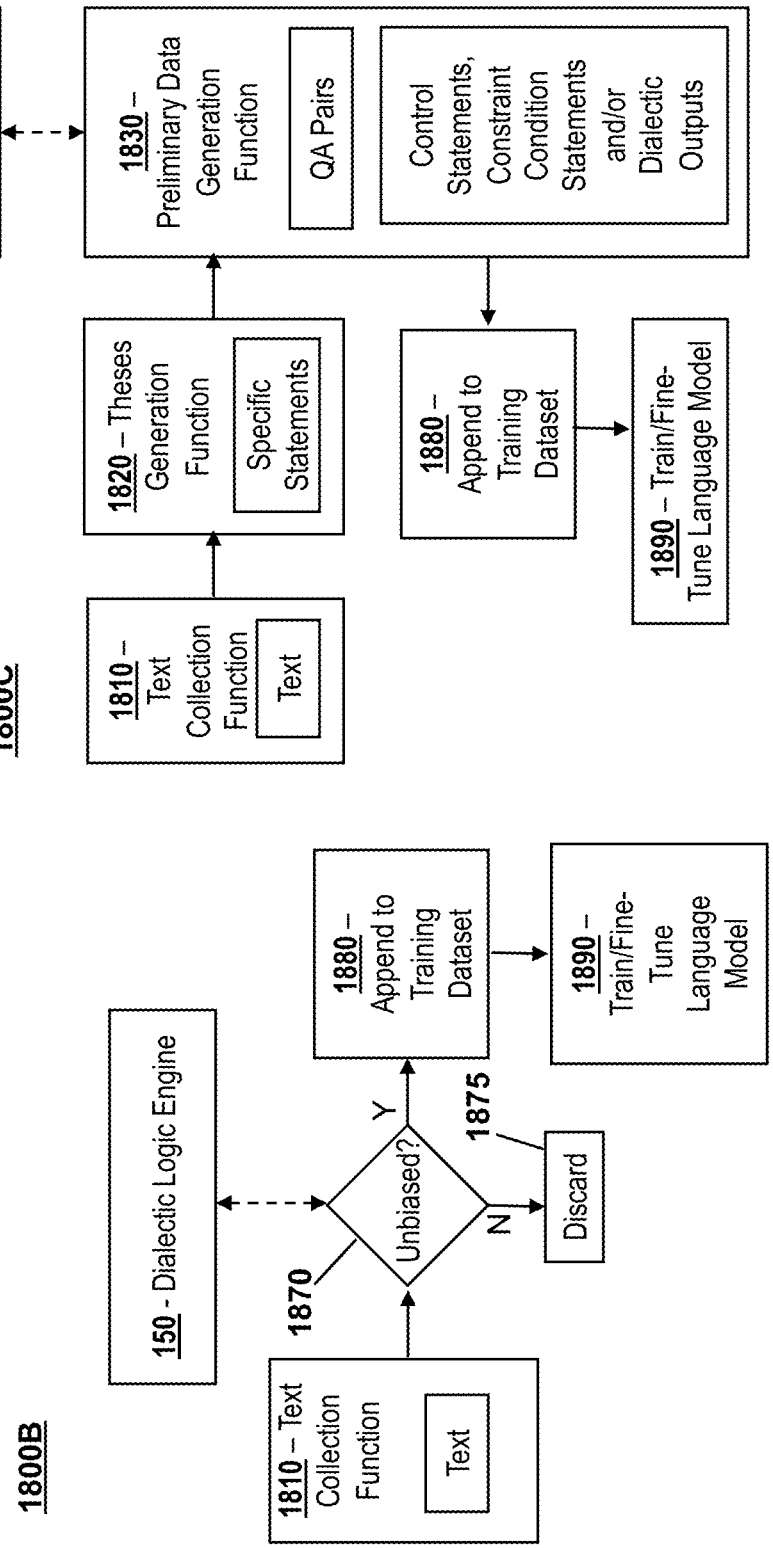
FIG. 18B is a flow diagram illustrating another exemplary dialectic training procedure according to certain embodiments.
FIG. 18C is a flow diagram illustrating another exemplary dialectic training procedure according to certain embodiments.

FIGS. 18A-C illustrate three exemplary process flows (1800A, 1800B, 1800C) that may be executed by the dataset generation function 240 to generate dialectic training data 220 that can be utilized to train or fine-tune a language model 140. It should be understood that these process flows are provided for explanatory purposes and can be varied in numerous ways. Amongst other things, the steps or phases of the process flows can be performed in different orders, additional steps or phases can be added to the process flows, and one or more illustrated steps or phases can be omitted from the process flows altogether.

The process flow 1800A illustrated in FIG. 18A includes an exemplary processing pipeline that processes textual content across multiple phases to derive a training dataset 210 for training a language model 140.

The dataset generation function 240 may include a text collection function 1810 to collect or access textual content. The textual content may be retrieved from various sources. In some examples, the textual content may be aggregated by the dialectic analysis system 130 based on interactions with end-users, secondary applications 180, and/or external systems (e.g., in connection with performing the dialectic analyses described herein). In other examples, the textual content may be scraped from the Internet and/or files. In further examples, the textual content be obtained from one or more pre-existing datasets that are designed to train a language model 140. The textual content can be obtained or accessed in other ways as well.

The dataset generation function 240 also may include a theses generation function 1820 configured to extract or derive thesis parameters 160A from the textual content. In some embodiments, the dataset generation function 240 may utilize, or communicate with, the dialectic logic engine 150 to extract the thesis parameters 160A from the textual content, as indicated by connection 1825.

The theses generation function 1820 may be designed to extract thesis parameters 160A of variable granularity. For example, thesis parameters 160A may be extracted which correspond to single words, short phrases, specific statements, and/or sentences. Varying the types of thesis parameters 160A can help improve the training of the language model 140 in later phases. Amongst other things, the variable granularity of the thesis parameters 160A can enhance the generalization capabilities of the language model 140, such as by adapting to new inputs and reducing tendencies to over fit to specific patterns. Additionally, this variability can increase the robustness or resiliency of the language model 140 with respect to handling ambiguities or noisy inputs.

The dataset generation function 240 may further include a preliminary data generation function 1830. The preliminary data generation function 1830 receives the thesis parameters 160A extracted in the previous phase, and derives an initial set of dialect training data, some portions of which may be suitable to train the language model 140 and other portions which may be discarded (or which may require refinement). In some embodiments, the dataset generation function 240 may utilize, or communicate with, the dialectic logic engine 150 to generate the initial set of dialect training data from the thesis parameters 160A, as indicated by connection 1835.

The content of initial dialect training data derived or generated by the preliminary data generation function 1830 can vary. In some techniques, the initial dialect training data may include question/answer pairs derived from the thesis parameters 160A extracted in the previous phase. That is, for each thesis parameter 160A, the dataset generation function 240 may generate one or more questions or prompts corresponding to the thesis parameter 160A, as well as corresponding answers to each of the questions or prompts.

To illustrate by way of example, a thesis parameter 160A that corresponds to "War is bad" may result in the generation of questions and answers such as:

Q: What is the implied goal of the thesis "War is bad" ?
A: To promote peace.
Q: What is the antithesis of "War is bad" ?
A: War is good.

The questions/answers generated in this phase can be generated using some or all of the constraint conditions set forth in FIG. 5 and/or Table 3. Thus, in some embodiments, the questions can correspond to queries or prompts that are designed to elicit dialectic parameters 160 (e.g., thesis parameters 160A, antithesis parameters 160B, positive thesis parameters 160C, negative thesis parameters 160D, etc.), and/or designed to elicit dialectic outputs 170 (e.g., control statements, wisdom statements, etc.). An answer can be generated for, and associated with, each of the questions that are generated (e.g., which identify the dialectic parameters 160 and/or dialectic outputs 170 that are being elicited by the questions). In this manner, a large-scale dataset comprising hundreds, thousands, or millions of questions and corresponding answers can be compiled.

The preliminary data generation function 1830 is not limited to generating initial training data that corresponds to QA pairs. In some examples, the initial training data generated in this phase may additionally, or alternatively, correspond to collections of dialectic parameters 160 that are derived from a given thesis parameter 160A. For instance, for a given thesis parameter 160A being processed, the preliminary data generation function 1830 may generate a plurality of related dialectic parameters (e.g., an antithesis parameter 160B, positive thesis parameter 160C, action parameter 160G, etc.) corresponding to the thesis parameter 160A, and this collection of dialectic parameters 160 may be packaged together with labels identifying each of the parameters. Each of these packaged parameter collections can then be fed to later processing phases, some of which may be utilized to train the language model 140.

Additionally, or alternatively, the initial training data generated by the preliminary data generation function 1830 may combine or package each thesis parameter 160A with one or more dialectic outputs 170 corresponding to the thesis parameter 160A, and these combinations or packages can then be fed to later processing phases, some of which may be utilized to train the language model 140.

Various other types of initial training data can be generated or derived by the preliminary data generation function 1830.

The dataset generation function 240 may further execute a clustering function 1840 on the initial training data generated in this previous phase. That is, the outputs generated by the preliminary data generation function 1830 may be clustered based on their similarity to the thesis parameters 160A from which they are derived. For example, if T1="Love", T2="Hate", T3="Love is good", T4="Hate is bad", the clustering function 1840 may execute a clustering technique that results in T1 and T3 being grouped in a first cluster and T2 and T4 being grouped in a second cluster. The clustering function 1840 can serve to improve the quality on the initial training data by grouping the initial training data generated in the previous into separate buckets or categories and removing erroneous outliers or anomalous outputs detected in the initial training data.

Any appropriate clustering technique can be executed by the clustering function 1840. Exemplary techniques may include k-means clustering, hierarchical clustering, DBSCAN (density-based spatial clustering on applications with noise) clustering, agglomerative clustering, spectral clustering, mean shift clustering, etc.

The dataset generation function 240 may further include a compatibility assessment function 1850 which analyzes the consistency or compatibility of outputs in each cluster identified in the previous phase. For example, the compatibility assessment function 1850 may receive the clustering information from the previous phase, and determine whether the outputs (e.g., QA pairs or types of other initial training data) in each cluster are compatible or consistent with each other. In the event that an output is not compatible with the some or all of the outputs included in the same cluster, that output may be discarded or removed from the initial training data (at 1851), flagged for manual or human revision (at 1852), and/or sent to the dialect logic engine for revision (at 1853).

The compatibility checks performed by the compatibility assessment function 1850 can be particularly useful in scenarios where the training data is being prepared with theses parameters 160A having variable granularity, which may represent essentially the same idea with different levels of detail. For example, if a thesis includes a specific statement such as "Love is not simple", this may yield a new, single word thesis ("Love"), and the dialectical outputs 170 of both theses should be compatible with each other. These compatibility assessments can help ensure that the training data that is ultimately selected for training the language model is compatible in this manner, and can discard or revise initial training data that does not satisfy this criteria. The outputs (e.g., QA pairs or other initial training data) that are determined to be compatible with the outputs included in the same cluster can be kept in the training data for further downstream processing.

The dataset generation function 240 may further include one or more adaptation functions 1860 configured to process on the training data derived from previous phases. The adaptation functions 1860 may include various reformatting, augmentation, and/or data adaptation functions. In some scenarios, a language model 140 may require training data to be provided in a specific format to fine-tune or train the language model, and the adaptation functions 1860 can format the training data for consistency with these formatting requirements. The adaptation functions 1860 performed in this phase may additionally, or alternatively, augment or supplement the initial training data with additional details (e.g., based on communication exchanges with the language model 140).

The dataset generation function 240 may further include a bias filtering function 1870. The bias filtering function 1870 may receive the training data generated in the previous phases and may analyze the training data to detect whether it includes bias. In some embodiments, the dataset generation function 240 may utilize, or communicate with, the dialectic logic engine 150 to detect or filter bias in the training data, as indicated by connection 1871.

In some embodiments, the bias filtering function 1870 can determine whether each output included in remaining portions of the training data (that is, training data that has survived the previous phases) includes bias and/or an unacceptable level of bias. Any portions of the initial training data determined to include bias, or determined to exceed threshold levels of bias, may be discarded or removed from the training data (at 1875).

As explained above, the dialectic logic engine 150 can execute various techniques to detect and/or estimate bias levels of textual content. In some examples, the dialectic logic engine 150 may initiate a communication exchange with a language model 140 to measure the bias in each of the outputs included in the training data (or the remaining portions of the dialectic training data that have not already been discarded). These and/or other bias quantification techniques can be applied to measure the bias of the outputs included in the initial training data.

Traditional language models (e.g., GPT models and/or other models) inherently inject bias into their responses or outputs, which often exaggerates outcomes and promotes a "quick fix" mentality. This type of bias lends itself to oversimplification and is harmful to conducting neutral or objective dialectic analyses. By removing bias content from the training data that is ultimately used to train or fine-tune the language model 140, the bias filtering function 1870 can correct the inherent bias-injecting tendencies of existing models and/or can be used to develop a custom model that produces unbiased outputs.

In block 1880, the outputs of the initial training data that do not include bias (or do not exceed threshold levels of bias) are appended to or stored in a training dataset 210 to be utilized in training the language model 140. In the context of process flow 1800A, the dialectic training data 220 that gets stored in the training dataset 210 may correspond to QA pairs (or other types of training data) that are derived from theses parameters 160A of variable granularity, and which has been filtered based on the thresholds for compatibility and neutrality (or non-biasness). This "dialectically clean" training set can enable a language model 140 to extend its knowledge to the domain of dialectics.

Finally, a training function 1890 may be executed by the dialectic training system 200 using the dialectic training data 220 stored in the training dataset 210. This training may be performed as part of a fine-tuning procedure 231 and/or a model initialization procedure 232. In some cases, the dialectic training data 220 may be processed by a learning mechanism of the language model 140, which adjusts or modifies the weights, biases, and/or other parameters of the language model 140 to respond more effectively to dialectic based queries or prompts.

Any or all functions described in process flow 1800A may be stored as software instructions on one or more storage devices 201 and executed by one or more processing devices 202. In some embodiments, one or more of the functions or steps in process flow 1800A may be performed by the dataset generation function 240, dialectic training system 200, and/or the dialectic logic engine 150. That is, the text collection function 1810, theses generation function 1820, preliminary data generation function 1830, clustering function 1840, compatibility assessment function 1850, adaptation function 1860, bias filtering function 1860, dataset storage function 1880, and/or training function 1890 may be stored as software instructions, and these software instructions may be executed by the dataset generation function 240, dialectic training system 200, and/or the dialectic logic engine 150.

While the certain functions (1810-1890) are described as distinct functions to aid in understanding, it is to be appreciated that these functionalities may be combined or integrated in various ways. In some embodiments, a single application, module, or program may include instructions for executing all of functions or at least two of the functions. In other embodiments, separate applications, modules, or programs may be designed to implement each of the functions or a subset of the functions.

The dialectic training procedure 230 described in FIG. 18A can be modified in numerous ways. In some examples, the training procedure 230 can be streamlined to remove one or more the functions. FIGS. 18B and 18C demonstrate two examples of alternative, streamlined dialectic training procedures 230.

The process flow 1800B illustrated in FIG. 18B includes an exemplary processing pipeline in which raw text (or an entire text) is used as theses parameters 160A (e.g., without preprocessing the text into different levels of granularity). The text can be accessed or collected by text collection function 1810 as described above. A bias filtering function 1870 can then be applied to discard textual inputs (at 1875) that include bias or unacceptable levels of bias. The textual inputs that do not include bias (or which satisfy thresholds levels of bias) can then be stored as dialectic training data 220 in a training dataset 210 to be utilized in training the language model 140 (block 1880). A training function 1890 then utilizes the dialectic training data 220 in the training dataset 210 to train the language model 140.

The process flow 1800BC illustrated in FIG. 18C includes another exemplary processing pipeline in which textual content (collected by the text collection function 1810) is initially processed during by theses generation function 1820 to derive specific statements corresponding to thesis parameters 160A. A preliminary data generation function 1830 then processes the statements to derive QA pairs, control statements, dialectic outputs 170, and/or other dialectic training data 220, which is stored directly in the training dataset 210 (at 1880) to be utilized in training the language model 140 (e.g., without performing any filtering based on compatibility, bias, or other criteria). The training function 1890 then feeds the dialectic training data 220 in the training dataset 210 to the language model 140 for training.

Many other training procedures 230 also can be executed by the dialectic training system 200. Additionally, the training procedures 230 may include any combination of the steps or phases described with respect to FIGS. 18A-C.

FIG. 19 illustrates a flow chart for an exemplary method 1900 according to certain embodiments. Method 1900 is merely exemplary and is not limited to the embodiments presented herein. Method 1900 can be employed in many different embodiments or examples not specifically depicted or described herein. In some embodiments, the steps of method 1900 can be performed in the order presented. In other embodiments, the steps of method 1900 can be performed in any suitable order. In still other embodiments, one or more of the steps of method 1900 can be combined or skipped. In many embodiments, dialectic training system 200 can be configured to perform method 1900 and/or one or more of the steps of method 1900. In these or other embodiments, one or more of the steps of method 1900 can be implemented as one or more computer instructions configured to run at one or more processing devices 202 and configured to be stored at one or more non-transitory computer storage devices 201. Such non-transitory memory storage devices 201 and processing devices 202 can be part of a computer system such as computing device 110 and/or server 120.

In step 1910, access is provided to a dialectic training system 200 configured to execute a dialectic training procedure 230 that assists a language model 140 with generating outputs utilized in electronically conducting dialectic analyses. In some examples, the dialectic training system 200 may be stored on one or more servers 120 and an end-user may operate a computing device 110 to access the dialectic training system 200 over a network 105. In other examples, the dialectic training system 200 may be stored and accessed directly on one or more computing devices 100.

The dialectic training system 200 can be configured to execute various types of dialectic training procedures 230, including one or more fine-tuning procedures 231, one or more model initialization procedures 232, and/or one or more question answering training procedures 233.

Each of the dialectic training procedures 230 may be designed to enhance the capabilities of the language model 140 in the domain of dialectics (e.g., with respect to interpreting questions or prompts eliciting dialectic information and/or generating outputs that used in dialectical analyses). In some examples, the domain-enhanced outputs of the language model 140 may be utilized in dialectic analyses that involve generating or deriving thesis parameters 160A, antithesis parameters 160B, and/or other dialectic parameters 160. In other examples, the domain-enhanced outputs of the language model 140 may be utilized in dialectic analyses that involve generating or deriving parameter synopsis outputs 171, dialectic wheels 172, derivation string outputs 173 (e.g., such as control statements 173A, interrogation outputs 173B, quotation outputs 173C, duality evaluation outputs 173D, etc.), poly-circular graphs 174, dialectic wisdom statements, and/or other types of dialectic outputs 170.

In step 1920, the dialectic training system 200 receives textual content. In some examples, the textual content may include data that is aggregated by the dialectic analysis system 130 (e.g., based on interactions with end-users, secondary applications 180, and/or external systems). In other examples, the textual content may be scraped from Internet, obtained from one or more databases, and/or manually input the end-user. In further examples, the textual content may be stored in a pre-complied dataset intended for training a language model 140.

In step 1930, the dialectic training system 200 executes a dataset generation function 240 that is configured to generate or derive dialectic training data 220 based on the textual content.

The dialectic training data 220 may encompass a wide array of content types, each of which may be curated or designed to enhance the language model's proficiency in generating outputs for conducting the dialectic analyses and/or designed to extend the knowledge base of the language model 140 to the domain of dialectics. In certain embodiments, to foster a comprehensive understanding of dialectic concepts, the dialectic training data 220 may integrate question and answer pairs that are designed to expose a language model 140 to concepts related to dialectic parameters 160, dialectic outputs 170, and/or dialectic analyses. Additionally, or alternatively, the dialectic training data 220 may include textual strings that embody thesis parameters 160A, antithesis parameters 160B, dialectic outputs 170, synthesized dialectic conclusions, etc. Additionally, or alternatively, the dialectic training data 220 may comprise dialogues and exchanges that illustrate dialectical reasoning, which may be annotated with expert insights to delineate the nuances of dialectic thought processes. Additionally, or alternatively, the dialectic training data 220 may include separate collections or groupings of dialectic parameters 160, each associated with contextual labels or semantic categories. Many other types of dialectic training data 220 may be generated or derived from the textual content.

In some embodiments, the dataset generation function 240 may execute various processing functions on the textual content to generate dialectic training data 220 that is optimized to train the language model 140. For example, the dataset generation function 240 may execute a theses generation function 1820 designed to extract thesis parameters 160A of variable granularity from the textual content, a preliminary data generation function 1830 configured to generate pairs of questions and answers based on the extracted thesis parameters of variable granularity, a clustering function 1840 configured to group the pairs of questions and answers into clusters based on their similarity to the thesis parameters 160A utilized to generate the pairs of questions and answers, a compatibility assessment function 1850 configured to analyze a consistency among or between the pairs of questions and answers within each cluster and to remove or revise any pairs that are determined to be inconsistent with other pairs in the same cluster, an adaptation function 1860 configured to reformat, augment, or further process the training data, and/or a bias filtering function 1870 configured to detect and remove any pairs of questions and answers that include bias or exceed a bias threshold.

In step 1940, the dialectic training data 220 is utilized to train the language model 140.

In some cases, the dialectic training data 220 may be processed by a learning function of the language model 140. In processing the dialectic training data 220, the learning function data may adaptor modify one or more parameters of the language model 140. In some embodiments, this adaptation or modification of the one or more parameters may alter the language model's performance of one or more NLP tasks 145, which may be executed by the language model 140 to interpret or understand prompts 152 designed to elicit dialectic parameters 160 and/or dialectic outputs 170. Additionally, or alternatively, this adaptation of the one or more parameters may modify the language model's performance of one or more generative NLP tasks 145, which generate outputs or responses to the prompts 152.

In certain embodiments, the method 1900 may further comprise one or more of the following steps: a) after training the language model 140 with the dialectic training data 220, receiving a prompt 152 from a dialectic logic engine 150 that is designed to elicit one or more dialectic parameters 160 or one or more dialectic outputs 170, wherein the prompt 152 is generated in response to an input string 115 provided by an end-user or a secondary application 180; b) executing, by the language model having the adapted or modified parameters, one or more NLP tasks 145 configured to interpret or understand the prompt 152; c) executing, by the language model 140 having the adapted or modified parameters, one or more NLP tasks 145 configured to generate a domain-enhanced output responsive to the prompt 152; d) returning the domain-enhanced output to the dialectic logic engine 150; e) generating, by the dialectic logic engine 150, a response to the input string based, at least in part, on the domain-enhanced output generated by the language model 140; and/or f) transmitting a response to the end-user that submitted the input string 115.

The dialectic training system 200 described herein provides a robust framework for enhancing the capabilities of language models in the domain of dialectics. By leveraging various dialectic training procedures, including fine-tuning, model initialization, and/or question answering training procedures, the system is capable of refining language models to interpret and generate responses that are not just accurate but are also aligned with the principles of dialectical reasoning. The system's ability to generate and utilize specialized dialectic training data, which may include question and answer pairs, thesis parameters, and bias-filtered content, extends the knowledge of the language models 140 to handle the complexities of dialectic analyses. This training system represents an advancement in the field of natural language processing by enabling the creation and fine-tuning of language models 140 that can accurately respond to dialectic queries and analyses, which traditionally require a deep understanding of dialectical logic.

Exemplary Causality Analysis & Identification Techniques

In certain embodiments, the dialectic logic engine 150 can be configured to execute a causality analysis process 2060 that identifies optimal causalities and complementarities for concepts within input strings 115. This process can electronically analyze concepts by applying dialectically designed computing logic and evaluation frameworks. In some examples, this analysis begins by extracting a concept from an input string 115 and then it expands understanding of the concept through incremental updating of a mapping schema, which is initially updated by the process 2060 to include parameters that capture fundamental or archetype notions related to the concepts, and subsequently supplemented to include parameters that capture transitions, oppositions, and/or complementary elements related to the extracted concepts or their fundamental building blocks. After the mapping schema corresponding to the concept under review is populated, the dialectic logic engine 150 can utilize the stored parameters, relationships, and/or sequence information stored in the mapping schema to generate various types of outputs (referred to as "dialectic causality outputs" below). These outputs can convey some or all of the causality information derived by the causality analysis process 2060, allowing for a detailed understanding of the concept under review.

As explained below with reference to FIGS. 20-26, the causality analysis process 2060 can be implemented using various techniques. One exemplary technique employed by the causality analysis process 2060 involves identifying archetypical associations corresponding to a given concept, and leveraging those archetypical associations to that help map or arrange sets of elements into optimum causality sequences. By linking concepts to classic elements, psychological traits, and/or other universally understood symbols, the causality analysis process 2060 provides a framework for understanding complex relationships and transformations between different ideas or components of a given concept under review, which in turn can be utilized to generate various types of dialectic causality outputs 175.

The causality analysis processes 2060 described herein provides a structured or programmatic technique for analyzing relationships between concept elements and identifying potential optimizations or innovations within complex systems. This approach allows for a more intuitive and holistic analysis of concepts, facilitating deeper insights into their interconnections and potential for complementarity or opposition within a given set or system.

Figure 20:
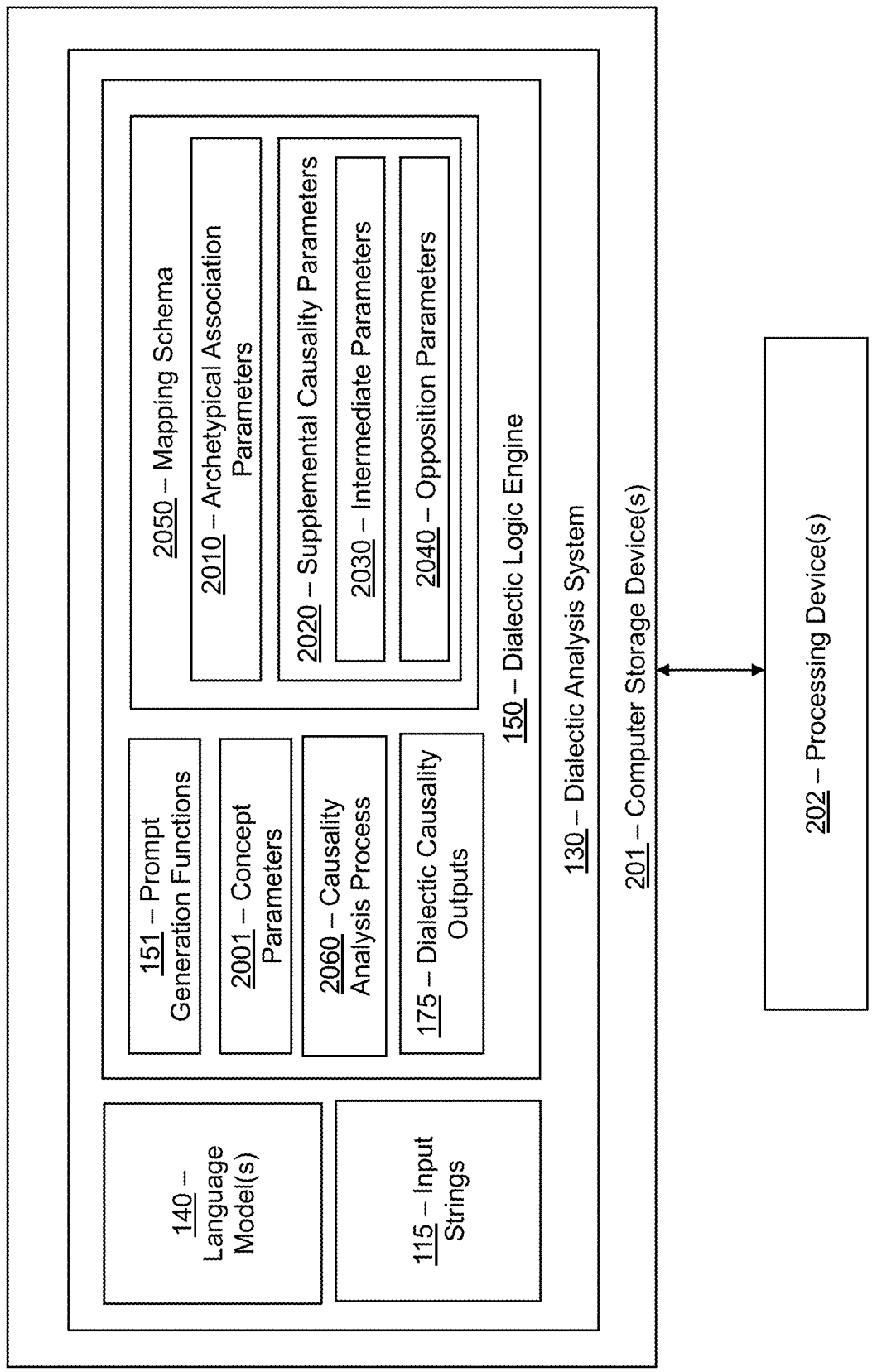
FIG. 20 is a block diagram illustrating exemplary details of a dialectic logic engine configured to generate dialectic causality outputs according to certain embodiments.

FIG. 20 illustrates, inter alia, several exemplary parameters that may be derived and stored by the causality analysis process 2060 to generate dialectic causality outputs 175 described herein.

In response to receiving an input string 115, the causality analysis process 2060 may initially extract one or more concept parameters 2001 corresponding to the input string 115. In general, a "concept" may correspond to idea or notion that represents something, often serving as the building block for thought or theory. Concepts help humans organize and categorize experiences, knowledge, and perceptions by simplifying complex ideas into manageable units. The concepts can be anything from concrete objects (e.g., chairs, automobiles, or electronics) to abstract ideas (e.g., justice, sacred, or freedom). Thus, the concept parameters 2001 extracted or identified by the dialectic logic engine 150 from an input string 115 can correspond to text strings that identifies a wide range of concepts (e.g., psychological concepts, scientific concepts, technological concepts, etc.).

As explained above, the content of a given input string 115 can vary greatly (e.g., in some cases, can include a single word and, in other cases, may include a phrase, sentence, paragraph, article, chapter, or book). In some embodiments, the causality analysis process 2060 may generate and transmit at least one prompt 152 to the language model 140 for extracting a concept parameter 2001 corresponding to a given input string 115. For example, the prompt 152 may include the input string with a request to identify a primary concept related to the input string 115. In other embodiments, the input string 152 itself may represent the concept parameter 2001 and, thus, there may be no need to utilize a language model 140 to extract the concept parameter 2001.

In some cases, a concept parameter 2001 may correspond to a thesis parameter 160A that is extracted from an input string 115, and the same or similar techniques described above for extracting thesis parameters 160A may be applied to extract concept parameters 2001 from input strings 115. However, a concept parameter 2001 can more broadly encompass other ideas or notions as well.

After a concept parameter 2001 is identified, the causality analysis process 2060 can identify, determine, or extract one or more archetypical association parameters 2010 corresponding to the concept 2001. In some examples described in this disclosure, the causality analysis process 2060 may identify four archetypical association parameters 2010 corresponding to each concept 2001. However, any number of archetypical association parameters 2010 may be identified or utilized by the causality analysis process 2060 described herein.

In general, the archetypical association parameters 2010 may correspond to text strings that identify fundamental, quintessential, and/or representative ideas or notions that are correlated with a given concept 2001. In some examples, the archetypical associations may refer to universal patterns or symbolic representations that are deeply ingrained in human consciousness and culture. These associations connect concepts, ideas, or elements to fundamental archetypes that are recognized across various cultures and time periods.

In one example, a concept parameter 2001 may correspond to the string "elements," and the causality analysis process 2060 may identify archetypical association parameters 2010 corresponding to "fire", "air", "earth", and "water". In another example, a concept parameter 2001 may correspond to the string "seasons," the causality analysis process 2060 may identify archetypical association parameters 2010 corresponding to "summer", "spring", "winter", and "autumn". Both the concepts identified by the concept parameters 2001 and the archetypical association parameters 2010 derived from those concepts can vary greatly depending on the content of a given input string 115. Further examples of these archetypical association parameters 2010 are described below.

In certain embodiments, the dialectic logic engine 150 and/or causality analysis process 2060 can identify or obtain the archetypical association parameters 2010 corresponding to a concept parameter 2001 by initiating a communication exchange with the language model 140. For example, the dialectic logic engine 150 (e.g., prompt generation function 151) may generate one or more prompts 152 to solicit the archetypical association parameters 2010 from the language model 140.

In some embodiments, the causality analysis process 2060 may arrange the archetypical association parameters 2010 in an ordered sequence according to a mapping schema 2050. As explained in further detail below, the mapping schema 2050 can include data structures and/or computing logic that stores the parameters that are generated throughout the causality analysis process 2060 in a particular arrangement, and establishes relationships among the parameters to facilitate identification of causalities and/or complementarities for concepts.

With respect to the archetypical association parameters 2010, the mapping schema 2050 may store or arrange the archetypical association parameters 2010 in a circular, ordered sequence and may impose certain conditions or constraints on the ordering. In some examples where four archetypical association parameters 2010 are extracted for a given concept parameter 2001, the four parameters may be stored in an circular sequence (e.g., T1→T2→T3→T4→, where T4 connects back to T1), and may impose certain constraints or relationships between the archetypical association parameters (e.g., such that T1/T3 represent some type of conceptual or functional oppositions, while T2/T4 also represent some type of conceptual or functional oppositions). In certain embodiments, the prompt(s) 152 generated to solicit or retrieve the archetypical association parameters 2010 may be tailored based on the constraints and/or relationships defined by the mapping schema 151.

In response to prompting the language model 140, the language model 140 may generate the archetypical association parameters 2010 and transmit them back to the dialectic logic engine 150, and the archetypical association parameters 2010 may be stored in accordance with the mapping schema 151.

The archetypical association parameters 2010 can serve as fundamental building blocks for identifying and expanding upon causal relationships related to a given concept parameter 2001. Once the archetypical association parameters 2010 are ascertained and stored in accordance with the sequencing and constraints imposed by the mapping schema 151, the causality analysis process 2060 can leverage these stored parameters and relationships to identify various types of supplemental causality parameters 2020 that aid the causality analysis corresponding to the concept parameter 2001.

In general, the supplemental parameters 2020 can correspond to text strings that expand an understanding of the concept parameter 2001 under review and/or an understanding of the relationships between or among the parameters stored in the mapping scheme 2050. In some examples, the supplemental parameters 2020 identified by the dialectic logic engine 150 and/or causality analysis process 2060 can include intermediate parameters 2030 and/or opposition parameters 2040. As explained below, both of the intermediate parameters 2030 and the opposition parameters 2040 can further expand the understanding of causalities relating to the concept parameter 2001 in different ways. These intermediate parameters 2030 and the opposition parameters 2040 represent two examples of supplemental parameters 2020 that may be utilized to expand the understanding of concept parameters 2001 under review. However, other types of supplemental parameters 2020 may also be employed to further elucidate or analyze the concepts being examined.

The intermediate parameters 2030 can correspond to transitions between parameters situated adjacent to each other as defined by the ordered sequence or arrangement established by the mapping schema 2050. For example, in an early stage of the causality analysis process 2060 (e.g., immediately after the archetypical association parameters 2010 corresponding to a concept parameter 2001 are determined), the intermediate parameters 2030 can be parameters that are inserted between adjacent archetypical association parameters 2010 (e.g., inserted between T1/T2, T2/T3, T3/T4 and/or T4/T1). In later stages of the causality analysis process 2060, the mapping schema 2050 may be updated to include various supplemental parameters 2020, and the intermediate parameters 2030 can be parameters that are inserted between adjacent parameters in the updated mapping schema 2050.

In some examples, the content of the intermediate parameters 2030 can correspond to text strings identifying steps or notions that bridge the gap between adjacent parameters. For instance, if the archetypical association parameters 2010 for a concept of "personal growth" include "self-awareness" and "skill development", an intermediate parameter 2030 might be "self-reflection". Similarly, for a concept of "technological innovation", if adjacent archetypical association parameters 2010 are "research" and "prototype development", an intermediate parameter 2030 could be "ideation and conceptualization". Additional examples of intermediate parameters 2030 are described below.

In certain embodiments, the dialectic logic engine 150 can generate one or more prompts 152 to extract or derive intermediate parameters 2030 from a language model 140. In response to receiving the one or more prompts 152, the language model 140 may generate the intermediate parameters 2030 and transmit them to the dialectic logic engine 150.

The opposition parameters 2040 can generally correspond to text strings that aim to identify contrasting or opposing viewpoints or elements that balance or complement parameters already stored in the mapping schema 2050 and/or already derived in earlier stages of the causality analysis process 2060. For example, in an early stage of the causality analysis process 2060 (e.g., immediately after the archetypical association parameters 2010 corresponding to a concept parameter 2001 are determined), opposition parameters 2040 may be added for each archetypical association parameter 2010, which consider the archetypical association parameter itself (T), as well its positive or negative side(s) and/or those of its antithesis (A). In later stages of the causality analysis process 2060, the mapping schema 2050 may be updated to include various supplemental parameters 2020, and the opposition parameters 2040 can be generated for those parameters later appended to the mapping schema 2050.

In certain embodiments, the dialectic logic engine 150 can generate one more prompts 152 to extract or derive opposition parameters 2040 from a language model 140. In response to receiving the one or more prompts 152, the language model 140 may generate the opposition parameters 2040 and transmit them to the dialectic logic engine 150.

The causality analysis process 2060 can expand the understanding of concept parameters 2001 using multiple approaches. In some embodiments, the process may utilize either intermediate parameters 2030 or opposition parameters 2040 independently to enhance the analysis of a given concept. Alternatively, the causality analysis process 2060 may employ both intermediate parameters 2030 and opposition parameters 2040 in combination, providing a more comprehensive examination of the relationships and transformations associated with the concept parameters 2001 under review.

As the causality analysis process 2060 derives the intermediate parameters 2030, opposition parameters 2040, and/or other supplemental parameters 2020 throughout the analysis of a concept under review, the mapping scheme 2050 can be updated to store the parameters, as well as their relationships to the archetypical association parameters 2010 and/or other parameters already derived during the process. For example, the mapping schema 2050 may store intermediate parameters 2030 and their positions in the circular ordering (e.g., such that each intermediate parameter 2030 is positioned between two adjacent archetypical association parameters 2010 in the sequence). Likewise, the mapping schema 2050 may store the opposition parameters 2040 and their positions in the ordering (e.g., such that each opposition parameter 2040 is placed diagonally opposite a particular archetypical association parameter 2010 that represents a conceptually opposite notion).

In some embodiments, the parameters generated during the causality analysis process 2060 may be organized by the mapping scheme 2050 in concentric circular layers. This arrangement begins with an innermost layer closest to the center of a circle. As additional parameters are derived, they may be placed in outer layers that surround and expand upon the inner layers and/or may be placed beneath the original innermost layer, creating a multi-layered circular structure. In this concentric circular structure, the positions of the parameters in each layer may have specific predefined relationships with the positions of parameters in that same layer and positions of parameters in other layers (e.g., upper or lower layers). As supplemental parameters 2020 are generated throughout the causality analysis process 2060, the mapping schema 2050 may store the supplemental parameters 2020, their positions in the various layers, and their relationships to other parameters.

In some embodiments, the mapping schema 2050 may correspond to arrangements of the dialectic or reference wheels 172 described herein. These wheels typically include an outer circular structure that is divided into different sectors, such as four, five, six, eight, ten, sixteen, or another number of sectors. Within this circular structure, the parameters are arranged in concentric layers, allowing for a hierarchical representation of relationships and transformations associated with the concept under analysis. The mapping schema 2050 can store data that captures this arrangement of the parameters (e.g., such as data that maps each parameter to a particular position in one of the layers and which establishes relationships and/or constraints among the positions).

The mapping schemas 2050 described in this disclosure are provided as examples to illustrate potential arrangements and relationships among parameters in the causality analysis process. However, these schemas may be varied, adapted, or customized in numerous ways to best facilitate the understanding of concepts.

In some embodiments, after an initial set of supplemental parameters 2020 is added to enhance the archetypical association parameters 2010, the causality analysis process 2060 may add one or more additional sets of supplemental parameters 2020 to further build out and expand upon the causalities surrounding the concept parameter 2001. The parameters and relationships added with each successive set of parameters can be stored in the mapping schema 2050.

By way of example, the mapping schema 2050 corresponding to a concept parameter 2001 may initially be updated to include four parameters, such as four archetypical association parameters 2010 directly derived from the concept parameter 2001. Thereafter, an initial set of supplemental parameters 2020 (e.g., comprising either intermediate parameters 2030 or opposition parameters 2040, or a combination thereof) may added to the mapping schema 2050 to elucidate or expand upon the relationships of the archetypical association parameters 2010, resulting in a total of eight parameters or twelve parameters. Following that, the causality analysis process 2060 can iteratively add additional sets of supplemental parameters 2020 to the analysis (e.g., again, each iteration adding intermediate parameters 2030 or opposition parameters 2040, or a combination thereof). For example, a second iteration may result in an updated mapping schema 2050 having sixteen, twenty-four, or thirty parameters, and a third iteration may result in total of thirty-two, forty-eight, or some other expanded number of parameters. Each set of parameters that is added to the mapping schema 2050 can build upon or enhance the clarity of previous layers, allowing for a more comprehensive and nuanced understanding of the causalities surrounding the concept parameter 2001 by filling in gaps or relationships among the parameters.

For each concept parameter 2001 being analyzed, the number of supplemental parameters 2020 added and/or the number of iterations executed by the causality analysis process 2060 can vary. In some embodiments, the causality analysis process 2060 may store stopping criteria that determines the number of iterations executed and/or which identifies when the iterative process should terminate. Additionally, or alternatively, an input received with the input string 115 may identify how many iterations are executed and/or how parameters are to be added into the causality analysis. Additionally, or alternatively, after each iteration in which a new set of parameters is added, an end-user or computing system may be prompted to determine if an additional set or layer of parameters should be added. Other techniques can be applied to determine how extensively the concept parameter 2001 under reviewed should be analyzed by the causality analysis process 2060.

After the causality analysis process 2060 is finished identifying supplemental parameters 2060, the dialectic logic engine 150 may utilize the data stored in the mapping schema 2050 to generate one or more dialectic causality outputs 175. In general, a dialectic causality output 175 can represent data which represents or identifies the causalities and/or complementarities corresponding to a concept parameter 2001 and/or an output which is derived from the causalities and/or complementarities corresponding to a concept parameter 2001.

A dialectic causality output 175 can be presented or visualized in many different forms. Certain examples below, such as those described in FIGS. 23-27, demonstrate how a dialectic causality output 175 can be presented or visualized using dialectic wheels 172. These dialectic wheels 172 can provide a useful visualization of the causalities and/or complementarities surrounding a given concept in a manner that shows the relationships among the various parameters in a circular, sequenced format.

However, the dialectic causality outputs 175 can be presented in or integrated in many other forms. In some examples, the dialectic causality outputs 175 can be presented in tables, graphs, and/or data structures that convey some or all of the information captured by the mapping scheme 2050 for a given concept. In other examples, the information stored in the mapping schema 2050 may be translated to text strings, e.g., such as in sentence or paragraph form, that provide a natural language explanation of the causality analysis that was performed.

In some scenarios, a dialectic causality output 175 may include all of the parameters (and/or relationships) generated by the causality analysis process 2060, which can provide a comprehensive analysis of a given concept to end-users or systems that seek a complete picture of the causalities surrounding a concept. In other scenarios, an end-user or system may not need all of the information derived by the causality analysis process 2060 and/or may be seeking a succinct response from the dialectic logic, and the dialectic causality output 175 may only include a portion of the parameters generated by the causality analysis process 2060 and/or may include a brief response (e.g., binary output or yes/no response) that is derived form the parameters generated by the causality analysis process 2060.

In certain embodiments, the dialectic logic engine 150 can interface (e.g., via API 154 or other communication means) with a wide array of systems and/or applications (e.g., such as the secondary applications 180 described above) to enhance their decision-making capabilities and knowledge bases. In some exemplary scenarios, these systems may provide the input strings 115 that initiate the causality analyses performed by the dialectic logic engine 150. For example, a scientific research system studying biological processes could input key concepts related to a particular mechanism, and the dialectic logic engine 150 could generate dialectic causality outputs 175 that identify potential causal relationships and complementary factors within that biological system. Similarly, a strategic planning application could provide input strings 115 related to various business initiatives, and the dialectic causality outputs 175 could highlight optimal paths forward and potential synergies between different strategies. Additionally, these systems may also receive the dialectic causality outputs 175 to supplement their existing knowledge or to automate certain decision-making processes. For instance, a medical diagnostic system could integrate the dialectic causality outputs 175 to better understand the interplay between various symptoms and conditions, leading to more accurate diagnoses. An educational platform might incorporate dialectic causality outputs 175 to provide students with a more comprehensive and intuitive understanding of complex subjects and their interconnections. Ultimately, the dialectic logic engine 150 can interface with any system that benefits from a deeper, more holistic analysis of the causal and complementary relationships within its domain.

The dialectic logic engine 150 can be integrated with the aforementioned systems in various ways. In some embodiments, the dialectic logic engine 150 may be directly incorporated as a component or module within these systems. In other embodiments, the dialectic logic engine 150 can exist as an external system that communicates with these systems via APIs or other communication protocols, providing dialectic causality outputs 175 on-demand or at regular intervals to support the systems' decision-making processes and knowledge enhancement.

Earlier portions of this disclosure explain how parameter constraint conditions 155 and output constraint conditions 156 can be applied to ensure that dialectic parameters and outputs are generated with high-precision and accuracy, which can address shortcomings in traditional language models 140 with respect to accurately generating content for dialectic analyses. The same or similar types of parameter constraint conditions 155 and output constraint conditions 156 also can be applied to the parameters and outputs generated by the causality analysis process 2060.

In some examples, parameter constraint conditions 155 may be applied when generating archetypical association parameters 2010 to ensure that these parameters maintain specific relationships or oppositions within the circular sequence defined by the mapping schema 2050 and/or sufficiently correspond to a given concept parameter 2001 under review. In other examples, when generating intermediate parameters 2030, parameter constraint conditions 155 may be utilized to verify that each intermediate parameter represents a logical transition between adjacent archetypical association parameters 2010 in the sequence. In further examples, when generating opposition parameters 2040, parameter constraint conditions 155 may be employed to confirm that each opposition parameter adequately balances or complements its corresponding archetypical association parameter 2010 while maintaining consistency with the overall conceptual framework. In further examples, output constraint conditions 156 may be applied when generating dialectic causality outputs 175 to ensure that the relationships and transformations represented in the outputs accurately reflect the data stored in the mapping schema 2050 and/or adhere to desired output formats utilized to present the dialectic causality outputs 175.

In the event that any of the archetypical association parameters 2010 or supplemental parameters 2020 obtained during the causality analysis process 2060 do not satisfy the one or more of the parameter constraint conditions 155, the dialectic logic engine 150 may generate one or more additional prompts 152 to request revised or updated text strings for those parameters which are not consistent with one or more the parameter constraint conditions 155. The same applies to scenarios where the dialectic causalities output 175 do not satisfy one or more output constraint conditions 156. In some scenarios, the procedure for assessing the accuracy of the parameters and/or outputs may be an iterative or repetitive process that terminates when all constraint conditions are satisfied and/or a threshold level of accuracy has been met.

As explained above, the programmatic process applied by the dialectic logic engine 150 to iteratively refine the inferences or responses of the language model 140 based on the parameter constraint conditions 155 and output constraint conditions 156 marks in improvement in generative AI control technologies, by establishing precision-based boundaries for controlling the inferences made by the language model 140 and improving the quality of the parameters and outputs.

Figure 21:
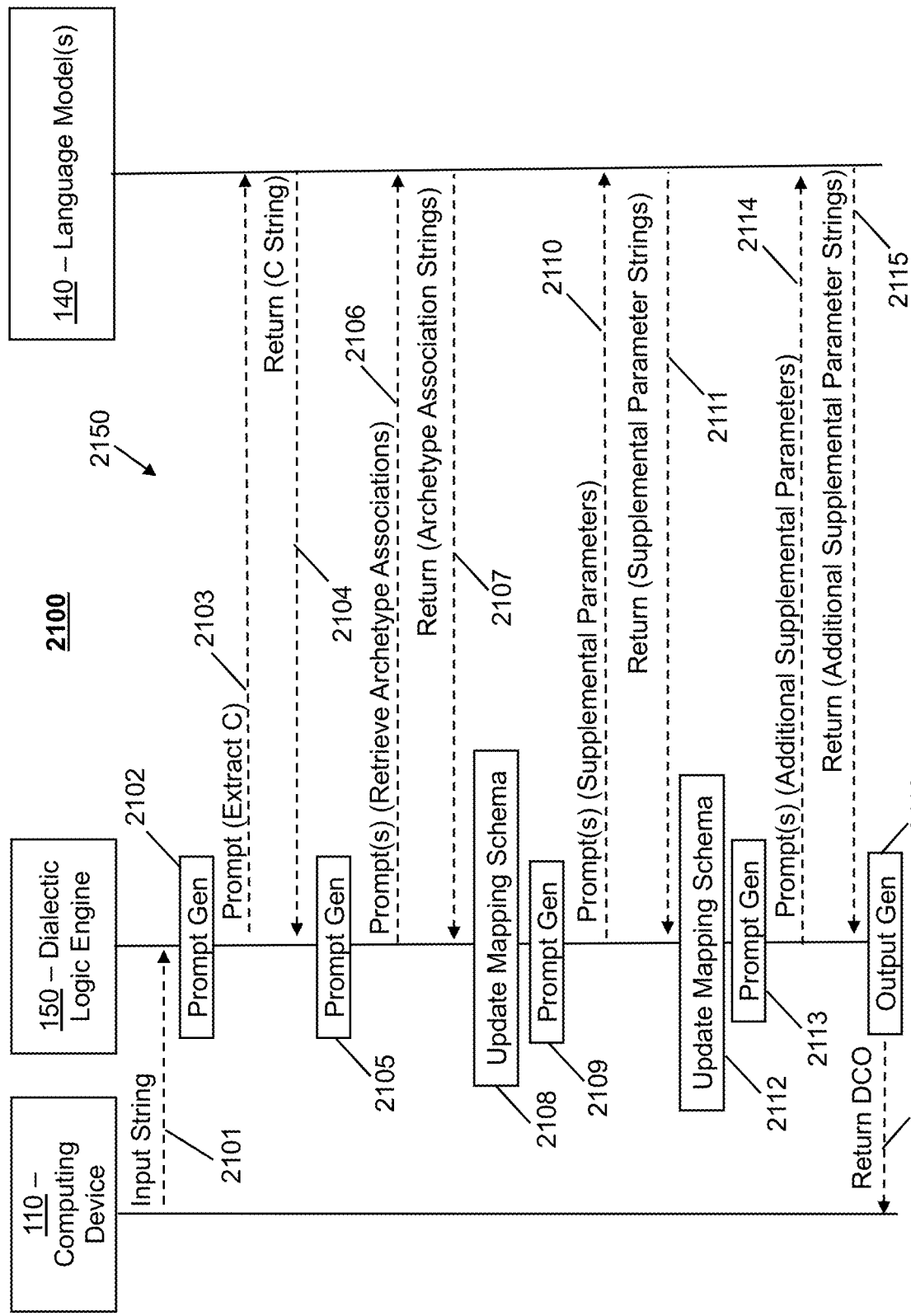
FIG. 21 is a diagram illustrating an exemplary process flow for generating a dialectic causality output based on a communication exchange with a language model according to certain embodiments.

FIG. 21 is a diagram illustrating an exemplary process 2100 for generating a dialectic causality output 175 according to certain embodiments. The diagram illustrates exemplary communications between a computing device 110, a dialectic logic engine 150, and a language model 140.

It should be understood that the process flow 2100 is provided for explanatory purposes and can be varied in numerous ways. Amongst other things, the steps of the process can be performed in different orders, additional steps can be added to the process, and one or more illustrated steps can be omitted from the process altogether.

In step 2101, a computing device 110 transmits an input string 115 to be used in conducting a dialectical causality analysis. In some cases, the input string 115 may be transmitted by the computing device 110 to the dialectic logic engine 150 over a network 105. In some cases, the input string 115 may be provided by an end-user accessing the dialectic logic engine 150 (e.g., via a web browser) and/or the input string 115 may be provided by an external system (e.g., a secondary application 180 running on the external system).

In step 2102, the dialectic logic engine 150 generates one or more prompts 152 for querying or instructing the language model 140 to extract or derive a concept parameter 2001 corresponding to the input string 115.

In step 2103, the dialectic logic engine 150 transmits the prompt to the language model 140.

In step 2104, the language model 140 returns a text string to the dialectic logic engine 150 that includes the concept parameter 2001.

In some embodiments, the input string 115 itself may be utilized as the concept parameter 2001 and steps 2102-2104 can be skipped or omitted.

In step 2105, the dialectic logic engine 150 generates one or more second prompts 152 for querying or instructing the language model 140 to generate archetypical association parameters 2010 corresponding to, or based on, the concept parameter 2001.

In step 2106, the dialectic logic engine 150 transmits the one or more second prompts to the language model 140.

In step 2107, the language model 140 returns one or more text strings to the dialectic logic engine 150 that includes the archetypical association parameters 2010.

In some embodiments, in response to detecting that one or more the archetypical association parameters 2010 do not satisfy one or more parameter constraint conditions 155, steps 2105-2107 may be repeated over one or more iterations until archetypical association parameters 2010 are obtained with sufficient accuracy and precision.

In step 2108, the dialectic logic engine 150 updates a mapping schema 2050. For example, the dialectic logic engine 150 may store the archetypical association parameters 2010 in the mapping schema 2050 according to predefined relationships, constraints, and/or sequence positions. In some embodiments, the concept parameter 2001 also may be stored in or associated with the mapping schema 5020.

In step 2109, the dialectic logic engine 150 generates one or more third prompts 152 for querying or instructing the language model 140 to generate supplemental parameters 2020 based, at least in part, on the archetypical association parameters 2010. In some cases, the one or more third prompts 152 may be designed to elicit intermediate parameters 2030, opposition parameters 2040, and/or other types of supplemental parameters 2020.

In step 2110, the dialectic logic engine 150 transmits the one or more third prompts to the language model 140.

In step 2111, the language model 140 returns one or more text strings to the dialectic logic engine 150 that includes the supplemental parameters 2020.

In some embodiments, in response to detecting that one or more the supplemental parameters 2020 do not satisfy one or more parameter constraint conditions 155, steps 2109-2111 may be repeated over one or more iterations until supplemental parameters 2010 are obtained with sufficient accuracy and precision.

In step 2112, the dialectic logic engine 150 updates the mapping schema 2050. For example, the dialectic logic engine 150 may store the supplemental parameters 2020 in the mapping schema 2050 according to relationships, constraints, sequence positions, and/or multi-layered circular arrangements.

In step 2113, 2114, and 2115, the dialectic logic engine 150 optionally continues the process of soliciting supplemental parameters 2020 for the causality analysis that is being conducted.

In step 2113, the dialectic logic engine 150 generates one or more additional prompts 152 for querying or instructing the language model 140 to generate additional supplemental parameters 2020 based, at least in part, on the previously derived parameters (e.g., based on the archetypical association parameters 2010 and/or previously ascertained supplemental parameters 2020).

In step 2114, the dialectic logic engine 150 transmits the one or more additional prompts to the language model 140.

In step 2115, the language model 140 returns one or more text strings to the dialectic logic engine 150 that include the additional supplemental parameters 2020.

In certain embodiments, steps 2113, 2114, and 2115 may be repeatedly executed over or more iterations and, after each iteration, the dialectic logic engine 150 may store the supplemental parameters 2020 in the mapping schema 2050 according to relationships, constraints, and/or sequence positions.

In step 2116, the dialectic logic engine 150 executes a function for generating or finalizing one or more dialectic causality outputs 175. Each of the dialectic causality outputs 175 may be derived, at least in part, from the data stored in the mapping schema 2050. The types of dialectic causality outputs 175 can vary (e.g., in some cases, may include dialectic wheels 172, tables, graphs, and/or natural language explanations corresponding to the causality analyses).

In step 2117, the dialectic logic engine 150 transmits the one or more dialectic causality outputs 175 to the computing device 110 that initiated the dialectic causality analysis. In some scenarios, the dialectic causality outputs 175 may be displayed to an end-user operating the computing device 110. In other scenarios, the dialectic causality outputs 175 may be provided as an input to one or more external systems or secondary applications 180 for usage in downstream processing operations and/or for usage in automating decision-making or other processes.

Figure 22:
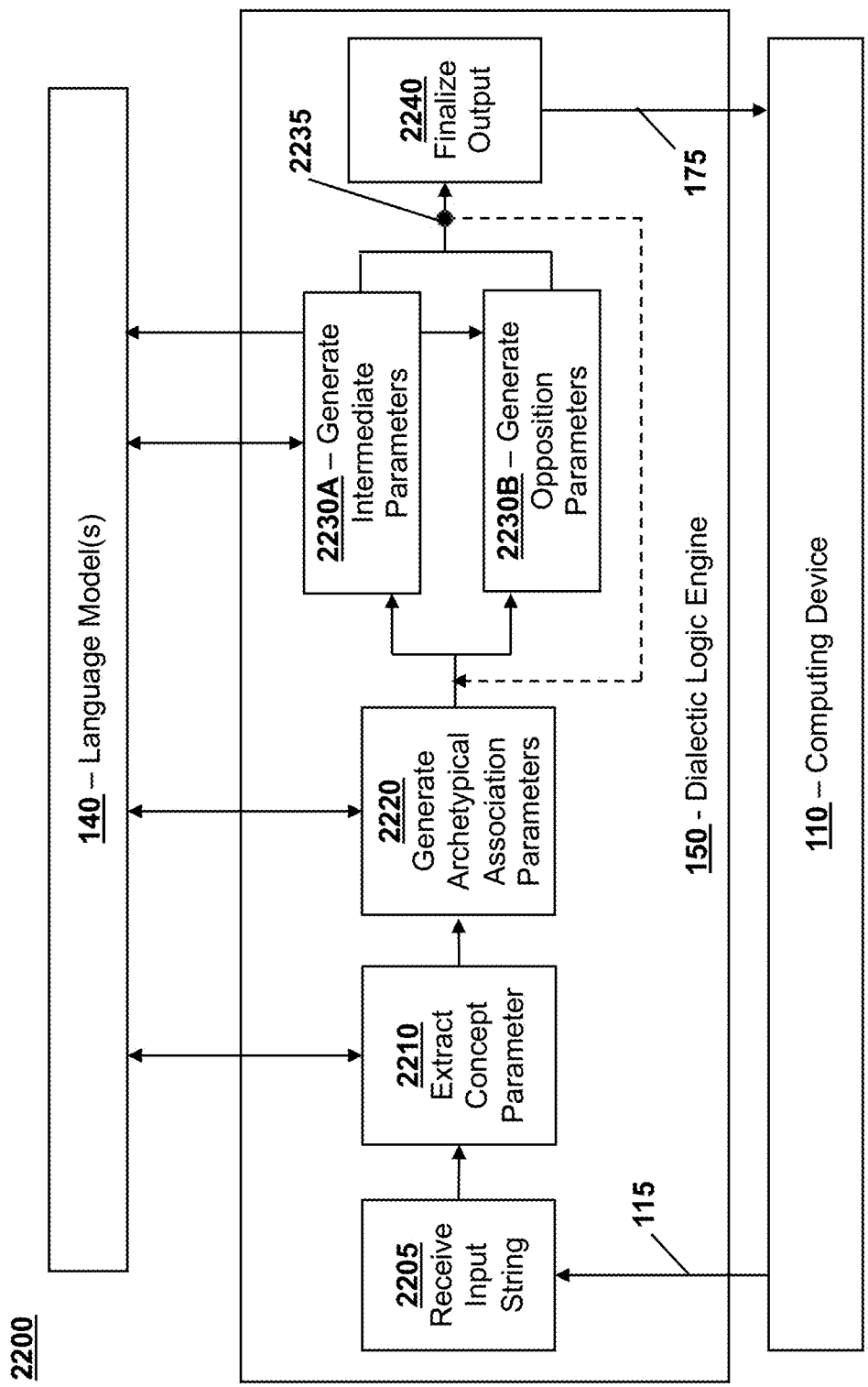
FIG. 22 is flow diagram illustrating another exemplary process flow for generating a dialectic causality output according to certain embodiments.

FIG. 22 is a diagram illustrating another exemplary process flow 2200 for generating a dialectic causality output 175 according to certain embodiments. The diagram illustrates exemplary phrases or functions that can be executed by a dialectic logic engine 150 and/or causality analysis process 2060 to derive a dialectic causality output 175 from an input string 115.

It should be understood that the process flow 2200 is provided for explanatory purposes and can be varied in numerous ways. Amongst other things, the steps of the process can be performed in different orders, additional steps can be added to the process, and one or more illustrated steps can be omitted from the process altogether.

At step 2205, the dialectic logic engine 150 receives an input string 115 from a computing device 110.

At step 2210, the dialectic logic engine 150 initiates a communication exchange with the language model 140 to extract or derive a concept parameter 2001 corresponding to the input string 115.

In some examples, the dialectic logic engine 150 generates and transmits one or more prompts 152 to the language model 130 for obtaining the concept parameter 2001. For example, the prompt 152 may include the input string 115 with a request or instruction to identify a primary concept or idea related to the input string 115.

At step 2220, the dialectic logic engine 150 initiates a communication exchange with the language model 140 to generate or derive archetypical association parameters 2010 corresponding to the concept parameter 2001.

In some examples, the dialectic logic engine 150 generates and transmits one or more prompts 152 to the language model 130 for obtaining the archetypical association parameters 2010. The prompt(s) 152 generated to solicit or retrieve the archetypical association parameters 2010 may be tailored based on the relationships, constraints, and/or sequencing information defined by the mapping schema 151. For example, in some cases, the following prompt 152 may be utilized to extract the archetypical association parameters 2010: "Identify the 4 major concepts, stages, or steps of the [$conceptParameter], arranged in the circular causality sequence (T1-T2-T3-T4), so that T1 and T3 represent some type of conceptual or functional oppositions, while T2 and T4 represent another type of similar oppositions." Other prompts 152 also may be used.

After the archetypical association parameters 2010 are determined, the process flow 2200 may be proceed to either step 2230A (generating intermediate parameters) or step 2230B (generating opposition parameters), or to both step 2230A and step 2230B.

In some embodiments, the causality analysis process 2060 may store logic and/or criteria that is used to determine whether the process flow 2200 proceeds to step 2230A or step 2230B, or both. In some cases, this logic or criteria may be based on the content of the concept parameter 2001 and/or archetypical association parameters 2010. For example, the understanding of certain subjects or concepts may lend themselves may be better enhanced by ascertaining the intermediate parameters, while the understanding of other subjects or concepts may lend themselves may be better enhanced by ascertaining the opposition parameters. As such, the causality analysis process 2060 may select the path that will best aid in understanding the subject or concept.

In other embodiments, the causality analysis process 2060 may be preprogrammed to proceed to both of step 2230A and step 2230B in an particular order (e.g., to execute step 2030A or 2030B before executing the other), and both intermediate parameters and opposition parameters may be derived to supplement the understanding of the concept parameter 2001.

Other techniques also can be utilized to determine whether the process flow 2200 proceeds to step 2230A, step 2230B, or both and/or the order in which the steps are executed and added to the mapping schema 2050.

At step 2230A, the dialectic logic engine 150 initiates a communication exchange with the language model 140 to generate or derive intermediate parameters 2030 corresponding to the archetypical association parameters 2010.

In certain embodiments, the number of intermediate parameters 2030 ascertained may be based on the number of archetypical association parameters 2010 that were derived in the previous step. In some examples, four archetypical association parameters 2010 may be derived and four corresponding intermediate parameters 2030 may be inserted between each pair of adjacent archetypical association parameters 2010 (e.g., T1→IP1→T2→IP2→T3→IP3→T4→IP4→, where IP4 connects back to T1). In other examples, three or five archetypical association parameters 2010 may be ascertained, and a corresponding set of three or five intermediate parameters 2030 may be inserted into the sequence. In further examples, the number of intermediate parameters 2030 inserted into the sequence may be less than the number of archetypical association parameters 2010 that were ascertained. For example, in some cases, only a single intermediate parameter 2030 may be inserted into a desired position between of pair of adjacent pair of archetypical association parameters 2010 even though four archetypical association parameters 2010 has been ascertained.

In some examples, the dialectic logic engine 150 generates and transmits one or more prompts 152 to the language model 130 for obtaining the intermediate parameters 2030. In certain embodiments, the dialectic logic engine 150 can generate a prompt 152 according to the following format to extract intermediate parameters 2030 from the language model 140 for four archetypical association parameters 2010: "Suggest intermediate steps or elements between each pair of adjacent parameters, facilitating their internal conversion: $archetypicalParameter1, $archetypicalParameter2, $archetypicalParameter3, and $archetypicalParameter4." In other examples, the dialectic logic engine 150 can generate a prompt 152 to solicit an intermediate parameter 2030 according to the following format: "Suggest an intermediate step or element between the following pair of adjacent parameters, facilitating their internal conversion: $parameter1 and $parameter2." The aforementioned prompt 152 can be tailored to accommodate less or greater numbers of intermediate parameters 2030. Additionally, other types of prompts 152 also may be utilized to derive or retrieve the intermediate parameters 2030.

At step 2230B, the dialectic logic engine 150 initiates a communication exchange with the language model 140 to generate or derive opposition parameters 2040 corresponding to the archetypical association parameters 2010.

In certain embodiments, the number of opposition parameters 2040 ascertained may be based on the number of archetypical association parameters 2010 that were derived in the previous step. In some examples, four archetypical association parameters 2010 may be derived and up to twenty corresponding opposition parameters 2040 may be added (e.g., which represent the positive and negative sides of each the archetypical association parameters 2010, antitheses corresponding to the archetypical association parameters 2010, and/or the positive and negative sides of the anthesis parameters). In other examples, three or six archetypical association parameters 2010 may be ascertained, and a corresponding set of opposition parameters 2040 may be added (e.g., again including the positive and negative sides of each archetypical association parameter 2010 and/or its antithesis).

In some examples, the dialectic logic engine 150 generates and transmits one or more prompts 152 to the language model 130 for obtaining the opposition parameters 2040. In certain embodiments, the dialectic logic engine 150 can generate a prompt 152 according to the following format to extract intermediate parameters 2030 from the language model 140 for four archetypical association parameters 2010: "Identify oppositions/antitheses (A) to each of the following concepts/archetypical parameters (T), so that A should not coincide with the remaining concepts, and the positive side of the trait (T+) should be negative side of its opposition (A−), while the negative side of trait (T−) should be positive side of its antithesis (A+): T1=$archetypicalParameter1: T1+=<positive side of T1>, T1−=<negative side of T1>. T2=$archetypicalParameter2: . . . . $archetypicalParameter3: . . . $archetypicalParameter4: . . . ". Other prompts 152 also may be utilized to extract the opposition parameters 2040." The aforementioned prompt 152 can be tailored to accommodate less or greater numbers of opposition parameters 2040. Additionally, other types of prompts 152 also may be utilized to derive or retrieve the opposition parameters 2040.

At decision point 2235, the process flow 2200 may optionally revert back prior to execution of steps 2230A and 2230B to generate additional intermediate parameters 2030 and/or additional opposition parameters 2040. The process flow 220 may iterate any number of times, with each iteration supplementing the analysis of with further parameters. The number of iterations can vary based on the desired depth and comprehensiveness of analysis for the given concept parameter and, in some cases, may be based on stopping criteria or preferences that are specified when the input string 115 is received. In some cases, a greater number of iterations may be performed to achieve a more thorough examination of the concept's causal relationships and associated parameters, while lesser numbers of iterations may be performed where a more basic understanding is desired.

At each of steps 2210, 2220, 2230A, and/or 2230B, a mapping schema 2050 may be updated to store the derived parameters and their relationships to each other.

In step 2240, the dialectic logic engine 150 executes a finalization function that generates one or more dialectic causality outputs 175 corresponding to the input string 115 and/or concept parameter 2001 derived therefrom. In some embodiments, the dialectic logic engine 150 may utilize some or all of the data stored in the mapping schema 2050 to generate each of the one or more dialectic causality outputs 175.

In some embodiments, the dialectic logic engine 150 may generate a dialectic causality output 175 corresponding to a dialectic wheel, and the finalization function may incorporate the parameters stored in the mapping schema 2050 into a circular wheel comprising and concentric layers of parameters arranged in specific positions or sectors of the wheel.

Additionally, or alternatively, the finalization function may incorporate the parameters stored in the mapping schema 2050 into tables that summarize the causality analysis, and the rows and columns of the table may be utilized to arrange the parameters in certain positions to demonstrate the relationships among the parameters.

Additionally, or alternatively, the finalization function may generate natural language explanations that describe the relationships and transformations identified during the analysis, providing a textual interpretation of the causality findings based on the data in the mapping schema 2050.

The finalization function may utilize the mapping schema 2050 to formulate other types of dialectic causality outputs 175 as well.

The process flow 2200 described above (and other implementations of the of the causality analysis function 2060 described in this disclosure) can be applied complex concepts or system, which obscure crucial causal relationships, hindering effective problem-solving and innovation.

In one example, consider the complex cause-and-effect relationships relating to climate change. The Earth's climate is an incredibly complex system involving interactions between the atmosphere, oceans, land surfaces, and various ecosystems. This complexity makes it challenging to identify clear cause-and-effect relationships. For instance, while we know that increased greenhouse gas emissions contribute to global warming, the specific impacts on local weather patterns, ocean currents, or biodiversity can be difficult to predict accurately. This obscurity of causal relationships has hindered the development and implementation of effective solutions, as policymakers and scientists struggle to determine which interventions will have the most significant positive impact.

In another example, consider the complex cause-and-effect relationships relating to an economy. Modern economies are intricate networks of interconnected factors, including consumer behavior, government policies, global trade, and technological advancements. The complexity of these systems often masks important causal relationships. For example, when trying to address issues like income inequality or unemployment, it can be challenging to pinpoint the exact causes or predict the full consequences of potential solutions. A policy aimed at increasing minimum wage, for instance, might have unexpected ripple effects throughout the economy that are not immediately apparent. This obscurity of causal relationships can lead to ineffective policies or unintended negative consequences, hindering innovation in economic problem-solving The process flow 2200 described above illustrates two separate techniques for enhancing the evaluation of these and other causalities—i.e., a first approach that ascertains and inserts intermediate parameters 2030 into the causality analysis of a concept and a second approach that ascertains and inserts opposition parameters 2040 into the causality analysis of the concept. Both strategies can be employed independently or in combination, fostering idea generation, holistic explanations, directed optimizations, and strategic decision-making.

The discussion below provides additional details on exemplary features and implementations of the causality analysis process 2060 with reference to FIGS. 23-27. While certain portions of the below discussion refer to examples that describe dialectic or reference wheels, the same or similar techniques can be adapted to formulate other types of types of dialectic causality outputs 175. For example, the same parameters, relationships, and/or constraints that are described as being incorporated into a dialectic wheel 172, can be stored in a mapping schema 2050 and leveraged to generate other types of dialectic causality outputs 175.

Dialectical components provide richer information than "naked" original concepts, defining naturalness not only through explicit word sequences, but also through dialectical (acausal) similarities currently overlooked by both human experts and AI architectures. Many scientists have noted these relations (e.g., Jung's acausal synchronicity, de Broglie's non-locality, Derrida's difference), yet they have not been fully embraced by reductionist mainstream science. The approaches described throughout this disclosure aim to bridge this gap, offering a more comprehensive framework for understanding complex systems and relationships.

In addition to the examples mentioned above, the solutions described herein offer significant contributions to many other applications including, but not limited to, those relating to system dynamics, the theory of inventive problem solving (TRIZ), and the development of new generative AI models.

As explained in earlier portions of this disclosure, any system or situation can be described through universal dialectical components or parameters: Thesis (T), Antithesis (A), Action, Reflection, and their positive (+) and negative (−) sides. It is perhaps this universality that all phenomena can be interrelated through archetypical associations with classic elements. Certain innovations described in this disclosure leverage this direct relation to dialectic outputs, while also considering similarities of the positive and negative aspects of concepts, in addition to the parent concepts by themselves.

Table 14 (reproduced below) provides examples of archetypical associations with dialectic causality outputs (in some cases, dialectic wheels).

TABLE 14

| Psychological and Social | 1st Group | 2nd Group | 3rd Group | 4th Group |
| --- | --- | --- | --- | --- |
| Dialectic Wheel | Thesis | Action | Antithesis | Reflection |
| Positive | Clarity | Progress | Aiding | Insight |
| Negative | Dogmatism | Oblivion | Contradicting | Stagnation |
| Classic elements | Fire | Air | Earth | Water |
| Positive | Passion | Drive, Will | Stability | Adapting |
| Negative | Chaos, Obsession | Disruption | Indifference | Drift |
| Temperaments | ⊗ Choleric | Sanguinic | Melancholic | Phlegmatic |
| Positive | Drive | Enthusiasm | Thoughtfulness | Calmness |
| Negative | Hostility | Impulsivity | Pessimism | Apathy |
| Fundamentals | Love, Uplifting | Will, Power | Brain, Wisdom | Care, Nurturing |
| Positive | Compassion | Determination | Insight | Support |
| Negative | Obsession | Domination | Overthinking | Smothering |
| Emotions | Joy | Playfulness | Sadness | Acceptance |
| Positive | Elation | Creativity | Pensiveness | Humility, Prudence |
| Negative | Euphoria, Mania | Frivolity, Anger | Depression | Fear |
| Roles | Child, Kid | Man, Father | Adult, Elder | Woman, Mother |
| Positive | Innocence | Protection | Wisdom | Nurturing |
| Negative | Naivety | Authoritarianism | Rigidity | Overprotective |
| Dimensions | Flexible Extrovert | Rigid Extrovert | Rigid Introvert | Flexible Introvert |
| Positive | Adaptability | Reliability | Stability | Versatility |
| Negative | Inconsistence | Narrowness | Stubbornness | Unpredictability |
| DISC Traits | Influence | Dominance | Conscientious | Steady |
| Positive | Charismatic | Leadership | Precision | Reliability |
| Negative | Impulsive | Aggression | Perfectionism | Passivity |
| Big 5 | Neurotic | Open, Extrovert | Conscientious | Agreeable |
| Positive | Sensitivity | Exploration | Reliability | Harmony |
| Negative | Anxiety | Impulsivity | Rigidity | Submissiveness |

TABLE 14-continued

| Psychological and Social | 1st Group | 2nd Group | 3rd Group | 4th Group |
|---|---|---|---|---|
| Natural Scientific | | | | |
| Seasons | Summer | Spring | Winter | Autumn |
| Positive | Vitality | Renewal | Tranquility | Abundance |
| Negative | Exhaustion | Unpredictability | Harshness | Melancholy |
| Science | Hypothesis | Testing | Theory | Observing |
| Positive | Innovation | Verification | Understanding | Discovery |
| Negative | Bias | Failure | Dogmatism | Misinterpretation |
| States of matter | Plasma | Gas | Solid | Liquid |
| Positive | Energetic | Expansive | Stable | Adaptable |
| Negative | Unstable | Diffusive | Rigid | Volatile |
| Mechanics | Kinetic Energy | Work/Enthalpy | Potent. Energy | Entropy |
| Positive | Dynamism | Productivity | Capacity | Efficiency |
| Negative | Dissipation | Inefficiency | Latency | Degradation |
| Thermodynamic | Entropy | Kinetic Energy | Enthalpy | Potent. Energy |
| Positive | Innovation | Dynamism | Stability | Adaptability |
| Negative | Chaos | Dispersion | Rigidity | Latency |
| Biology | Life | Dysregulation | Death | Homeostasis |
| Positive | Growth | Pleasure | Resilience | Balance |
| Negative | Fragility | Bias | Loss | Pain |
| Mechan/Biol | | | | |
| 4-stroke engine | Intake | Compression | Combustion | Exhaust |
| Positive | Efficiency | Power | Force | Cleansing |
| Negative | Clogging | Stress | Heat | Back-pressure |
| Photosynthesis | Light Absorption | Water Splitting | Carbon Fixation | Glucose Synthesis |
| | Energy capture | Electron liberation | Carbon assimilat | Energy storage |
| | Heat stress | Oxidative damage | Energy consumpt | Resource depletion |

In certain embodiments, the dialectic logic engine 150 and/or causality analysis function 2060 can execute alignment functions to evaluate the accuracy or precision of the a given set of archetypical association parameters 2010. These alignment functions can be utilized to enforce certain parameter constraint conditions 155 on the archetypical association parameters 2010 based on similarity metrics that are derived.

These alignments can be determined using either one or more of the following: (1) the similarities between "neutral" concepts, (2) averaged similarities between "neutral", "positive", and "negative" forms, or (3) the similarities between "dialectical characters" (or "DCs") defined cumulatively by the neutral, positive, and negative forms. In some examples, one or more prompts 151 may be generated and transmitted to a language model 140 to estimate these alignments. In some embodiments, the following prompt may be used: "Estimate similarities (0 to 1) between the following 'dialectical characters': Character 1: Neutral name: . . . , positive side: . . . negative side: . . . Character 2: . . . " Table 2 illustrates results (0—totally dissimilar, 1—identical)."

Table 15 (reproduced below) illustrates similarities between the DCs from Table 14 using a language model 140 (e.g., Claude 3.5) that were obtained during testing.

TABLE 15

| | Fire | Air | Earth | Water |
|---|---|---|---|---|
| Thesis | 0.8 | 0.5 | 0.3 | 0.2 |
| Action | 0.6 | 0.9 | 0.4 | 0.3 |
| Antithesis | 0.3 | 0.4 | 0.8 | 0.5 |
| Reflection | 0.2 | 0.3 | 0.5 | 0.9 |

However, concepts or systems that are being analyzed can often involve more than four elements. In these scenarios, larger mapping schemas 2050 and/or reference wheels can be useful. These can be designed using the techniques described above (e.g., with reference to the process flows in FIGS. 21 and 22) and in other portions of the disclosure. For example, larger evaluation frameworks can be expanded beyond the four archetypical association parameters 2010 using a first approach that ascertains and inserts intermediate parameters 2030 and/or a second approach that ascertains and inserts opposition parameters 2040 into the causality analysis of the concept.

Table 16 (reproduced below) illustrates opposition parameters 2040 that were derived for a concept parameter 2001 that identified "DISC traits" during testing, i.e., referring to the behavioral assessment model that categorizes human behaviors into four primary personality traits: Dominance (D), Influence (I), Steadiness (S), and Conscientiousness (C).

TABLE 16

| | T1 (Position 1) | T2 (Position 3) | T3 (Position 4) | T4 (Position 6) |
|---|---|---|---|---|
| DISC Traits | Influence | Dominance | Conscientious | Steady |
| Positive | Charismatic | Leadership | Precision | Reliability |
| Negative | Impulsive | Aggression | Perfectionism | Passivity |
| | A1 (Position 5) | A2 (Position 7) | A3 (Position 8) | A4 (Position 2) |
| Antitheses | Objectivity | Collaboration | Flexibility | Dynamism |
| Positive | Rationality | Harmony | Adaptability | Initiative |
| Negative | Detachment | Submissive | Chaos | Instability |

In the above table, it can be noted that T+ are opposite to A−, while T− are opposite to A+, and that the difference between positions of T and A components within the same column is always four (e.g., half of the number of segments in a dialectic wheel).

Figure 23C:
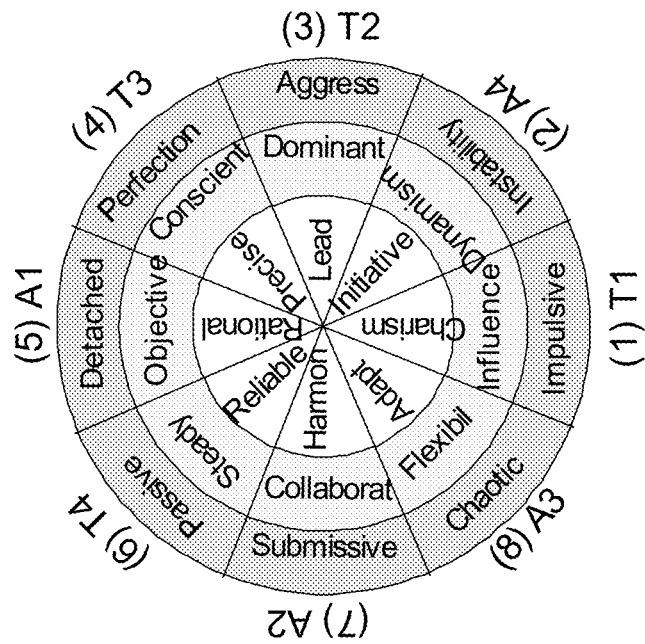
FIG. 23C illustrates a further expanded dialectic wheel displaying additional parameters for DISC traits according to certain embodiments.
Figure 23B:
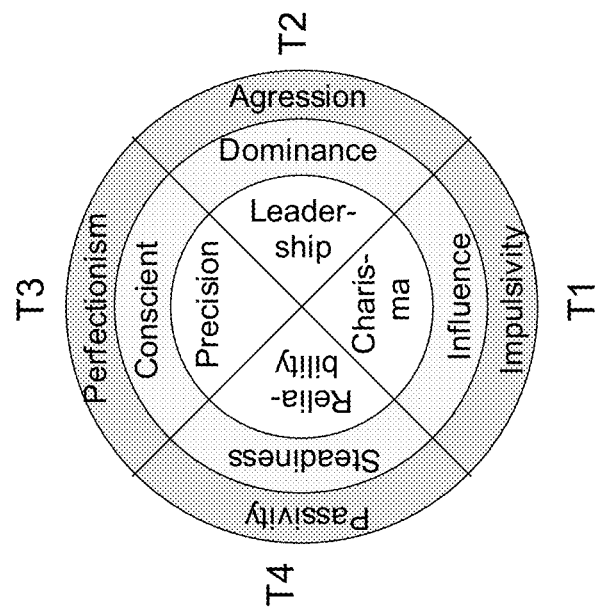
FIG. 23B illustrates an expanded dialectic wheel displaying additional parameters for DISC traits according to certain embodiments.
Figure 23A:
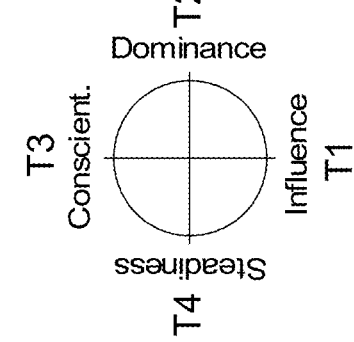
FIG. 23A illustrates a dialectic wheel displaying parameters for DISC traits according to certain embodiments.

FIGS. 23A, 23B, and 23C illustrate an exemplary three-step process that can be applied to generate a dialectic wheel having eight segments for visualizing the causalities of the DISC parameters. The final sequence in FIG. 23C was determined based on the "dialectical character" (DC) similarity with dialectic components in section (B) of Table 17, which utilized the above described techniques for ascertaining intermediate parameters 2030 to supplement the understanding of the concept.

Table 17 (reproduced below) includes testing results which demonstrate an application of the causality analysis process to concepts for "character traits" and "classic elements" (each example with eight wheel sectors or segments). In the below table, the top of each column specifies either "intermediate" or "opposition", indicating whether intermediate parameters 2030 or opposition parameters 2040 were utilized to generate the results.

TABLE 17

| Dialectic Components | Character Traits | | | Classic Elements | |
|---|---|---|---|---|---|
| | DISC | BIG 5 | MBTI | | |
| (intermediate) A | (opposition) B | (opposition) C | (opposition) D | (opposition) D | (intermediate) F |
| 1 Thesis | Influence | Neurotic | Turbulent | Fire | Fire |
| (+) Clarity | Charismatic | Sensitivity | Growth | Passion | Passion |
| (−) Dogmatism | Impulsive | Anxiety | Instability | Chaos | Chaos |
| 2 Inspiration | Dynamism | Openness | Intuition | Air | Dry |
| (+) Creativity | Initiative | Creativity | Insight | Drive | Preservation |
| (−) Impractical | Instability | Impractical | Impractical | Disruption | Brittleness |
| 3 Action | Dominance | Extrovert | Extrovert | Rigidity | Air |
| (+) Progress | Leadership | Sociability | Sociability | Focus | Drive |
| (−) Reckless | Aggression | Overstimul | Overstimul | Inflexibility | Disruption |
| 4 Critique | Conscientious | Conscient | Thinking, Judging | Earth | Cold |
| (+) Improvement | Precision | Reliability | Efficiency | Stability | Clarity |
| (−) Negativity | Perfectionism | Rigidity | Inflexibility | Indifference | Stagnation |
| 5 Antithesis | Objectivity | Stability | Asserting | Moderation | Earth |
| (+) Aiding | Rationality | Resilience | Confidence | Order | Order |
| (−) Conflict | Detachment | Complacent | Dominance | Apathy | Apathy |
| 6 Structuring or Analysis | Steady | Closed | Sensing | Inertia | Wet |
| (+) Organizing | Reliability | Consistent | Pragmatism | Balance | Fertility |
| (−) Rigidity | Passivity | Stagnant | Short-sight | Stagnation | Corrosion |
| 7 Reflection | Collaboration | Introvert | Introvert | Water | Water |
| (+) Insight | Harmony | Reflection | Reflection | Adaptation | Adaptation |
| (−) Overthinking | Submissive | Isolation | Isolation | Drif | Drif |
| 8 Empathise or Synthesis | Flexibility | Agreeable | Feeling, Perceiving | Volatility | Hot |
| (+) Understand | Adaptability | Harmony | Empathy | Agility | Energy |
| (−) Bias | Chaos | Passivity | Indecisive | Instability | Exhaustion |

As illustrated in the table above, the positioning of elements reflects overlapping probabilities, not fixed characteristics, allowing for adjustments up or down by one step depending on the analytical route (as demonstrated in the classic elements comparison).

Table 18 (reproduced below) illustrates similarities between the DCs of concepts for generalized wheels versus individual wheels, revealing high mutual similarities among elements across different columns, suggesting that they can be consolidated into one or two reference wheels (or other outputs).

TABLE 18

| | A Dial. | B Big 5 | C DISC | D MBTI | E Elem. | F Elem. |
|---|---|---|---|---|---|---|
| 1 Thesis | 0.85 | 0.80 | 0.75 | *0.70* | 0.90 | 0.90 |
| 2 Inspiration | 0.95 | 0.80 | 0.90 | 0.85 | *0.75* | *0.60* |
| 3 Action | *0.85* | 0.80 | 0.90 | 0.90 | *0.70* | 0.75 |
| 4 Critique | 0.85 | 0.90 | *0.85* | *0.80* | 0.75 | *0.70* |
| 5 Antithesis | 0.75 | *0.80* | 0.85 | *0.70* | 0.90 | 0.90 |

TABLE 18-continued

| | A Dial. | B Big 5 | C DISC | D MBTI | E Elem. | F Elem. |
|---|---|---|---|---|---|---|
| 6 Structuring | 0.90 | 0.85 | 0.80 | 0.75 | 0.95 | *0.70* |
| 7 Reflection | 0.95 | 0.75 | 0.90 | 0.90 | *0.85* | 0.85 |
| 8 Empathise | 0.90 | 0.85 | 0.80 | 0.85 | 0.75 | *0.70* |
| Application | Conflict resolut. | Team Manag. | Stress Manag. | Career Counsel. | Spiritual inquiry | |

In the above table, numbers shown in bold indicate the best matches, while numbers shown in italics are the worst. This shows the degree of ontological contribution by each concept to the generalized meaning.

Table 19 illustrates estimated areas of application (by Claude 3.5), with the highest scores for the generalized model.

TABLE 19

| Application | GEN | A | B | C | D | E | F |
|---|---|---|---|---|---|---|---|
| Team Management | 3 | 3 | 4 | 3 | 3 | 1 | 1 |
| Relationship Counseling | 4 | 3 | 2 | 3 | 4 | 1 | 1 |
| Career Counseling | 4 | 3 | 3 | 3 | 4 | 1 | 1 |
| Conflict Resolution | 4 | 4 | 3 | 2 | 3 | 1 | 1 |
| Educational Psychology | 4 | 3 | 2 | 3 | 3 | 1 | 2 |
| Marketing/Consumer Behavior | 4 | 2 | 3 | 2 | 3 | 1 | 1 |
| Leadership Development | 3 | 3 | 4 | 3 | 3 | 1 | 1 |
| Creativity and Innovation | 4 | 4 | 2 | 3 | 3 | 2 | 2 |
| Stress Management | 4 | 3 | 2 | 4 | 3 | 2 | 2 |
| Cross-Cultural Studies | 3 | 2 | 2 | 3 | 3 | 3 | 3 |
| Social Dynamics | 4 | 3 | 3 | 3 | 3 | 2 | 2 |
| Spiritual/Philosophical Inquiry | 4 | 4 | 1 | 2 | 3 | 4 | 4 |

In the above table, "GEN" refers to a generalized wheel, and the capital letters correspond to the wheels from Table 18. The scores indicate the following: 1=Low, 2=Moderate, 3=High, 4=Very High.

The reference wheel can be expanded by adding intermediate parameters 2030, adhering to the dialectical rules and/or constraints identified above (e.g., such as parameter constraint conditions 155 and/or other rules and constraints mentioned herein).

Table 20 (reproduced below) illustrates testing results that include parameters for a concept parameter 2001 corresponding to "emotions", which can be used to create dialectic wheels having eight sectors and/or other dialectic causality outputs 175.

TABLE 20

|  | From Character Traits<br>G | From Joy-Sadness (intermediate)<br>H | Plutchik Wheel Original<br>I | Plutchik Wheel "dialectified"<br>J | Legacy from Joy-Sadness<br>K |
|---|---|---|---|---|---|
| 1 | Impulse | Joy | Joy | Joy | Joy |
| (+) | Joy | Elation | Serenity | Serenity | Bliss |
| (−) | Moody | Mania | Ecstasy | Ecstasy | Mania |
| 2 | Idealism | Excitement | Anticipation | Anticipation | Betrayal |
| (+) | Drive | Enthusiasm | Interest | Interest | Awareness |
| (−) | Unreliable | Ignorance | Vigilance | Vigilance | Distrust |
| 3 | Drama | Playfulness | Anger | Annoyance | Loss |
| (+) | Smart | Creativity | Annoyance | Courage | Growth |
| (−) | Angry | Frivolity | Rage | Anger | Grief |
| 4 | Stubborn | Boredom | Disgust | Boredom | Mourning |
| (+) | Analysis | Ideation | Boredom | Cognitive | Release |
| (−) | Addiction | Apathy | Loathing | Disgust | Despair |
| 5 | Sadness | Sadness | Sadness | Sadness | Sadness |
| (+) | Steady | Pensiveness | Pensiveness | Pensiveness | Reflection |
| (−) | Depression | Depression | Grief | Grief | Depression |
| 6 | Pessimist | Empathy | Surprise | Surprise | Acceptance |
| (+) | Reliable | Understanding | Distraction | Amazement | Peace |
| (−) | Paranoid | Vulnerability | Amazement | Distraction | Complacent |
| 7 | Preserved | Acceptance | Fear | Apprehension | Healing |
| (+) | Dependable | Humility | Apprehension | Care | Renewal |
| (−) | Cautious | Fear | Terror | Fear | Dependence |
| 8 | Permissive | Engagement | Trust | Trust | Recovery |
| (+) | Compassion | Optimism | Acceptance | Admiration | Strength |
| (−) | Obsession | Obsession | Admiration | Acceptance | Relapse |
| Ap | Workplace, Personal | Clinical, Personal | Consumer behaviour | Conflict resolution | Group support |

In the above table, variant G (obtained from the generalized character traits in FIG. 27) illustrates emotions derived from character traits that were identified in the previous table, while variant H through K, demonstrate how similar foundational emotions (Joy—Sadness) manifest differently depending on the modeling approach used. Variant K illustrates emotions that can be derived using the dialectical analyses described in earlier portions of this disclosure. Additionally, "Ap" refers to "application." All variants, except the original Plutchik's which does not adhere to diagonal oppositions, can be synthesized into a single comprehensive model.

In some cases, the causal relationships associated with a concept parameter 2001 may be unambiguous or more easily derivable and, in other cases, the causal relationships associated with a concept parameter 2001 may ambiguous or more difficult to derive. For example, testing has demonstrated that the causal relationships related to psychological concepts may be more easily derived compared to those dealing with technological concepts or scientific concepts.

In certain embodiments, the causality evaluation process 2060 can generate or derive parameters during its analysis using different techniques based on whether the causal relationships associated with a concept parameter 2001 are unambiguous or ambiguous, or based on the domain of the concept parameter 2001 (e.g., psychological concepts vs. scientific concepts).

The following discussion outlines analysis techniques applicable to two distinct scenarios: one where the causal relationships associated with a given concept parameter 2001 are clear and unambiguous, and another where these relationships are less defined or ambiguous. While the examples provided focus on generating dialectic wheels or reference wheels for both unambiguous and ambiguous cases, it should be noted that these techniques may be adapted to produce various other types of dialectic causality outputs 175. The underlying principles and methods described can be applied broadly to generate a wide range of dialectic causality outputs 175 that elucidate causal relationships and dialectical analyses.

Figure 24:
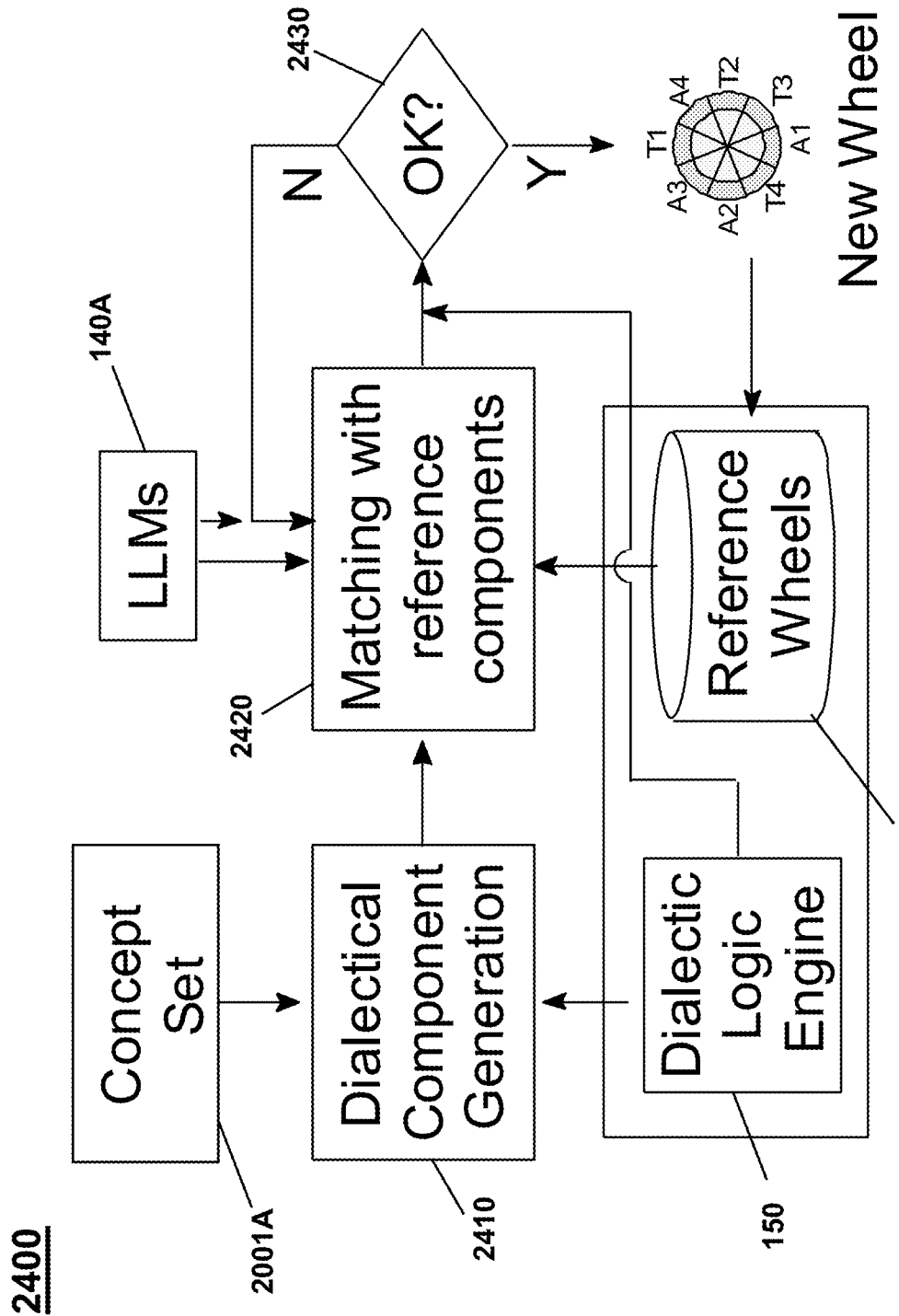
FIG. 24 illustrates an exemplary process for generating reference wheels for unambiguous causality scenarios according to certain embodiments.

FIG. 24 illustrates an exemplary process 2400 for generating reference wheels 172 for unambiguous causality scenarios. A concept set 2001A comprising one or more concept parameters 2001A can be received as an input to the process 2400. The reference wheels 172 obtained through this process 2400 can organize sets of new concepts into optimal causal sequences.

At process block 2410, for each concept parameter 2001 that is under review, the process 2400 generates one or more dialectical components or parameters (e.g., such as one or more of the dialectic parameters 160A-160L in FIG. 4A).

At process block 2420, the dialectical components or parameters are matched-either individually or cumulatively, as a facet or DC—with corresponding components of the reference wheel 172. The generation and/or matching of the dialectical components or parameters (at process blocks 2410 and 2420) can be performed via one or more communication exchanges with a language model 140 (e.g., such LLM 140A in FIG. 24). In certain embodiments, the matching process can occur in multiple steps or phases, starting with matches to four reference elements (e.g., four archetypical association parameters 2010) and followed by matching with adjustments or additions of sub-elements (e.g., supplemental parameters 2020) of each reference element.

At process block 2430, the dialectic logic engine 150 can determine whether the matching of the dialectical components or parameters was performed with sufficient with accuracy or precision. In certain embodiments, the dialectic logic engine 150 may utilize one or more parameter constraint conditions 155 for assessing the accuracy of the matching process. In some examples, the dialectic logic engine 150 may generate or utilize the similarity evaluation process described below to determine whether or not the matching process was performed with sufficiently performed and/or one or more parameter constraint conditions 155 have been violated.

If it is determined that the initial matching of the dialectical components or parameters was performed is not sufficiently accurate, the process 2400 may proceed back to process block 2420, and the dialectic logic engine 150 may initiate one or more additional communications exchanges with the LLM 140A to hone or update the matching of the dialectical components or parameters. This process 2400 may reiterate until it is determined that the matching is performed with sufficient accuracy or precision.

When a reference wheel 172 is determined to include sufficiently matching components or parameters (at block 2430), the new reference wheel may be stored as a final result (e.g., in some cases, stored in a database and/or stored for output to an end-user or computing system).

Figure 27:
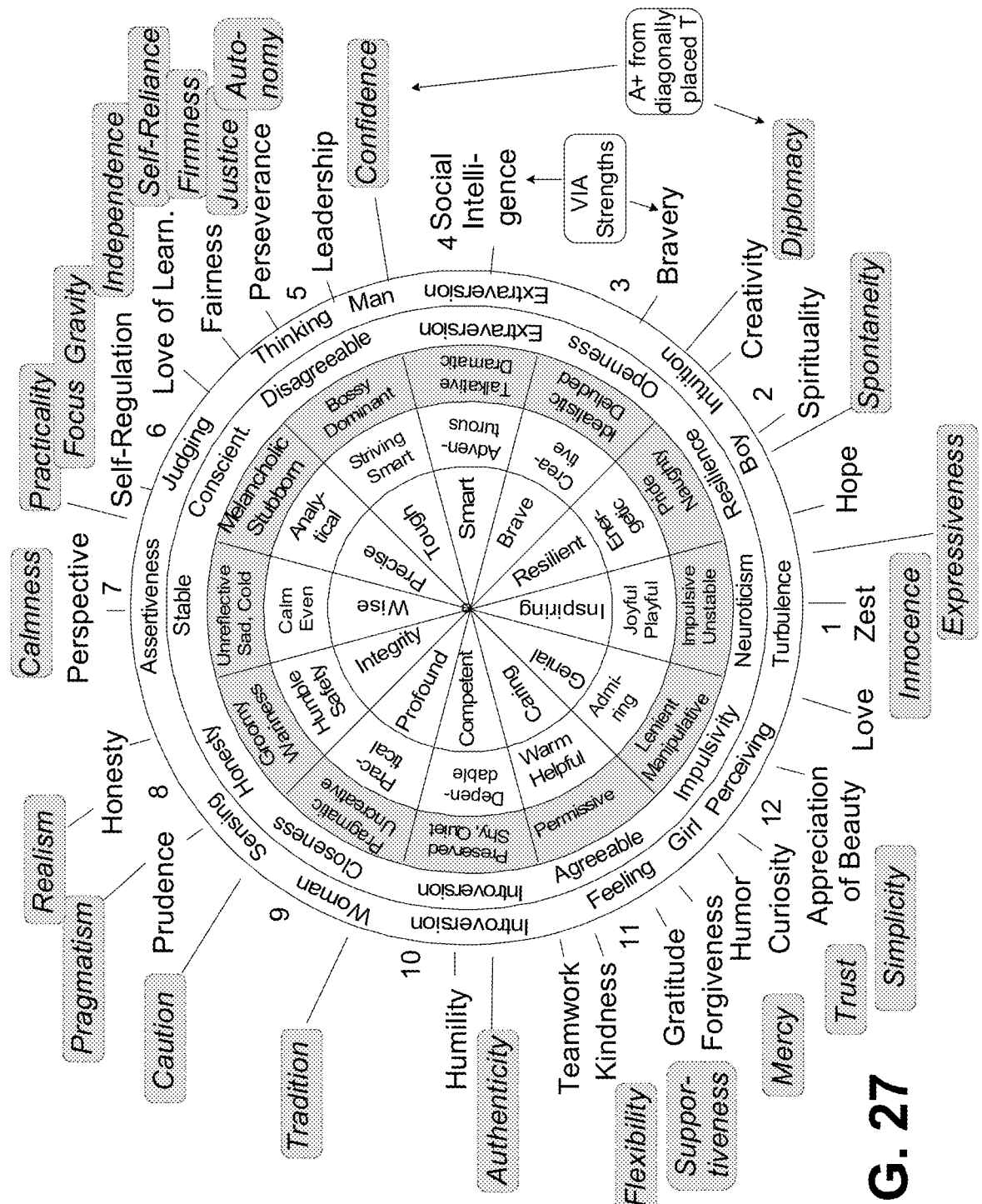
FIG. 27 illustrates an expanded dialectic or reference wheel according to certain embodiments.

Table 21 (reproduced below) illustrates testing results generated by an application of the process 2400 for matching 24 VIA (Values in Action) Character Strengths to a 12-segment reference wheel (as shown in FIG. 27) in a single-step procedure (e.g., which utilizes dialectic quartets).

In the above table, the numbers in parentheses indicate the matched sectors or segments in the reference wheel. Text shown in bold font identifies the components that helped most in matching. It can be seen that consideration of the original concept often was not enough to make the correct decision in terms of matching. In most cases at least two components pointed to the correct sector, after which other components were also used for deeper considerations.

Table 22 (reproduced below) shows similarity estimates (generated by Claude 3.5) between dialectical facets of reference and test concepts. Bold numbers indicate maximum similarities, while underlined numbers indicate the actual choices. It can be seen that this method gave roughly 50% accuracy, which is sufficient as a starting point (after which a verification can be performed). The accuracy can be increased by selecting better reference wheels and/or AI models.

TABLE 22

| VIA Strength (T) | 1-7 | 2-8 | 3-9 | 4-10 | 5-11 | 6-12 |
|---|---|---|---|---|---|---|
| Zest (1) | 0.8 | 0.7 | 0.8 | 0.8 | 0.5 | 0.5 |
| Hope (2) | <u>0.6</u> | 0.8 | 0.7 | 0.6 | 0.4 | 0.4 |
| Spirituality (2) | 0.4 | <u>0.6</u> | 0.6 | 0.4 | 0.3 | 0.3 |
| Creativity (2-3) | 0.7 | <u>0.7</u> | 0.9 | 0.5 | 0.4 | 0.6 |
| Bravery (3) | 0.5 | 0.9 | <u>0.9</u> | 0.7 | 0.7 | 0.4 |
| Social Intelligence (4) | 0.6 | 0.6 | <u>0.7</u> | 0.9 | 0.6 | 0.5 |
| Leadership (5) | 0.5 | 0.5 | 0.6 | <u>0.8</u> | 0.8 | 0.7 |
| Perseverance (5) | 0.4 | 0.8 | 0.5 | 0.6 | <u>0.7</u> | 0.9 |
| Fairness (5-6) | 0.3 | 0.7 | 0.5 | 0.5 | <u>0.9</u> | 0.6 |
| Judgment (6) | 0.4 | 0.6 | 0.6 | 0.7 | <u>0.9</u> | 0.8 |
| Love of Learning (6) | 0.5 | 0.7 | 0.8 | 0.7 | 0.5 | <u>0.7</u> |
| Self-Regulation (7) | 0.9 | 0.5 | 0.5 | 0.6 | 0.7 | <u>0.9</u> |
| Perspective (7) | <u>0.8</u> | 0.6 | 0.7 | 0.7 | 0.8 | 0.7 |
| Honesty (8) | <u>0.4</u> | 0.9 | 0.6 | 0.5 | 0.7 | 0.6 |
| Prudence (8) | 0.5 | <u>0.6</u> | 0.4 | 0.7 | 0.6 | 0.8 |
| Humility (10) | 0.3 | <u>0.4</u> | 0.3 | <u>0.4</u> | 0.5 | 0.5 |
| Teamwork (11) | 0.4 | 0.5 | 0.5 | <u>0.6</u> | 0.6 | 0.5 |
| Forgiveness (11) | 0.3 | 0.6 | 0.4 | 0.4 | <u>0.7</u> | 0.4 |
| Gratitude (11) | 0.4 | 0.5 | 0.5 | 0.5 | <u>0.5</u> | 0.4 |
| Kindness (11) | 0.5 | 0.7 | 0.6 | 0.6 | <u>0.6</u> | 0.5 |

TABLE 21

| VIA Strength (T) | Exaggerated (T−) | Opposition (A) | Obligation (A+) |
|---|---|---|---|
| Zest (1) | Hyperactivity (1) | Apathy (7-8) | Calmness (7) |
| Hope (2) | Delusion (2) | Pessimism (8) | Realism (8) |
| Spirituality (2) | Fanaticism (2) | Materialism (8) | Pragmatism (8) |
| Creativity (2-3) | Eccentricity (2-3) | Conformity (8-9) | Tradition (8-9) |
| Bravery (3) | Recklessness (3) | Cowardice (9) | Caution (9) |
| Soc. Intelligence (4) | Manipulation (4) | Awkwardness (10) | Authenticity (10) |
| Leadership (5) | Authoritarian (5) | Submissive (11) | Supportive (11) |
| Perseverance (5) | Stubbornness (5) | Fickleness (11) | Flexibility (11) |
| Fairness (5-6) | Rigidity (5-6) | Bias (11-12) | Mercy (11-12) |
| Judgment (6) | Criticism (6) | Gullibility (12) | Trust (12) |
| Love of Learning (6) | Pedantry (6) | Ignorance (12) | Simplicity (12) |
| Self-Regulation (7) | Repression (7) | Impulsivity (1) | Expressiveness (1) |
| Perspective (7) | Condescension (7) | Naivety (1) | Innocence (1) |
| Honesty (8) | Bluntness (8) | Deception (2) | Diplomacy (2) |
| Prudence (8) | Paranoia (8) | Recklessness (2) | Spontaneity (2) |
| Humility (10) | Self-deprecation (10) | Arrogance (4) | Confidence (4) (E) |
| Teamwork (11) | Conformity (11) | Individualism (5) | Autonomy (5) |
| Forgiveness (11) | Permissiveness (11) | Vengefulness (5) | Justice (5) |
| Gratitude (11) | Indebtedness (11) | Entitlement (5) | Self-reliance (5) |
| Kindness (11) | Servility (11) | Cruelty (5) | Firmness (5) |
| Love (11-12) | Obsession (11-12) | Indifference (5-6) | Independence (5-6) |
| Humor (12) | Mockery (12) | Seriousness (6) | Gravity (6) |
| Curiosity (12) | Nosiness (12) | Apathy (6) | Focus (6) |
| Appreciation of Beauty (12) | Perfectionism (12) | Insensitivity (6) | Practicality (6) |

TABLE 22-continued

| VIA Strength (T) | 1-7 | 2-8 | 3-9 | 4-10 | 5-11 | 6-12 |
|---|---|---|---|---|---|---|
| Love (11-12) | 0.6 | 0.8 | 0.7 | 0.7 | 0.5 | 0.6 |
| Humor (12) | 0.5 | 0.6 | 0.7 | 0.7 | _0.4_ | _0.4_ |
| Curiosity (12) | 0.7 | 0.7 | 0.9 | 0.6 | 0.4 | _0.6_ |
| Appreciation of Beauty (12) | 0.4 | 0.5 | 0.8 | 0.5 | 0.3 | _0.7_ |
| Zest (1) | 0.8 | 0.7 | 0.8 | 0.8 | 0.5 | 0.5 |
| Hope (2) | _0.6_ | 0.8 | _0.7_ | _0.6_ | 0.4 | 0.4 |
| Spirituality (2) | 0.4 | _0.6_ | 0.6 | 0.4 | 0.3 | 0.3 |
| Creativity (2-3) | 0.7 | _0.7_ | 0.9 | 0.5 | 0.4 | 0.6 |
| Bravery (3) | 0.5 | 0.9 | 0.9 | 0.7 | 0.7 | 0.4 |
| Social Intelligence (4) | 0.6 | _0.6_ | _0.7_ | 0.9 | 0.6 | 0.5 |
| Leadership (5) | 0.5 | 0.5 | 0.6 | _0.8_ | 0.8 | 0.7 |
| Perseverance (5) | 0.4 | 0.8 | 0.5 | _0.6_ | _0.7_ | 0.9 |
| Fairness (5-6) | 0.3 | 0.7 | 0.5 | 0.5 | 0.9 | _0.6_ |
| Judgment (6) | 0.4 | 0.6 | 0.6 | 0.7 | _0.9_ | _0.8_ |
| Love of Learning (6) | 0.5 | 0.7 | 0.8 | 0.7 | 0.5 | _0.7_ |
| Self-Regulation (7) | 0.9 | 0.5 | _0.5_ | 0.6 | 0.7 | 0.9 |
| Perspective (7) | _0.8_ | 0.6 | 0.7 | 0.7 | 0.8 | 0.7 |
| Honesty (8) | _0.4_ | 0.9 | 0.6 | 0.5 | _0.7_ | 0.6 |
| Prudence (8) | 0.5 | _0.6_ | 0.4 | 0.7 | 0.6 | 0.8 |
| Humility (10) | 0.3 | _0.4_ | 0.3 | 0.4 | 0.5 | 0.5 |
| Teamwork (11) | 0.4 | 0.5 | 0.5 | _0.6_ | 0.6 | 0.5 |
| Forgiveness (11) | 0.3 | 0.6 | 0.4 | 0.4 | _0.7_ | 0.4 |
| Gratitude (11) | 0.4 | 0.5 | 0.5 | 0.5 | _0.5_ | 0.4 |
| Kindness (11) | 0.5 | 0.7 | 0.6 | 0.6 | _0.6_ | 0.5 |
| Love (11-12) | 0.6 | 0.8 | 0.7 | 0.7 | _0.5_ | 0.6 |
| Humor (12) | 0.5 | 0.6 | 0.7 | 0.7 | 0.4 | _0.4_ |
| Curiosity (12) | 0.7 | 0.7 | 0.9 | 0.6 | 0.4 | _0.6_ |
| Appreciation of Beauty (12) | 0.4 | 0.5 | 0.8 | 0.5 | 0.3 | _0.7_ |

The usefulness of such a matching is multifaceted. First, it identifies the pairs of synchronized factors (that are placed diagonally to each other) that define each other's actual strengths and weaknesses. For instance, Humility is being balanced by the Social Intelligence. If one is missing, then the other becomes the weakness instead of strength. Anything that is imbalanced can be harmful (e.g., consider a humble person lacking Social Intelligence, or a Socially Intelligent one without humility).

Second, it explains each factor's deeper meanings, by aligning it with the A+ component(s) of the opposite factor(s). Thus, the essence of Humility stems from Authenticity (A+ of Social Intelligence), while the essence of Social Intelligence stems from Confidence (A+ of Humility).

Third, it illustrates the applicable domains of the entire system. FIG. 27 reveals the uneven distribution of VIA strengths on the reference wheel, with most factors concentrated in just 4 out of 12 segments (5-6 and 11-12). Note that shaded parameters (grey background) indicate the A+ components, while the original VIA strengths appear in plain text. The sparsest regions are near junctions of 3-4 and 9-10, where traditional values predominate. Thus, the VIA Strengths are best suited for measuring non-traditional, "technocratic" performance, despite claims of covering all cultural layers.

Fourth, it suggests the most natural order of transformations for converting weaknesses into the actual strengths. For example, as illustrated in FIG. 27, a Socially Active extrovert who needs to develop more Humility should apply his excess energy in a counter-clockwise direction, starting from the Leadership, Perseverance, Fairness, etc., while the introvert should go in a clockwise direction, starting from Bravery, Creativity, and Spirituality.

Figure 25:
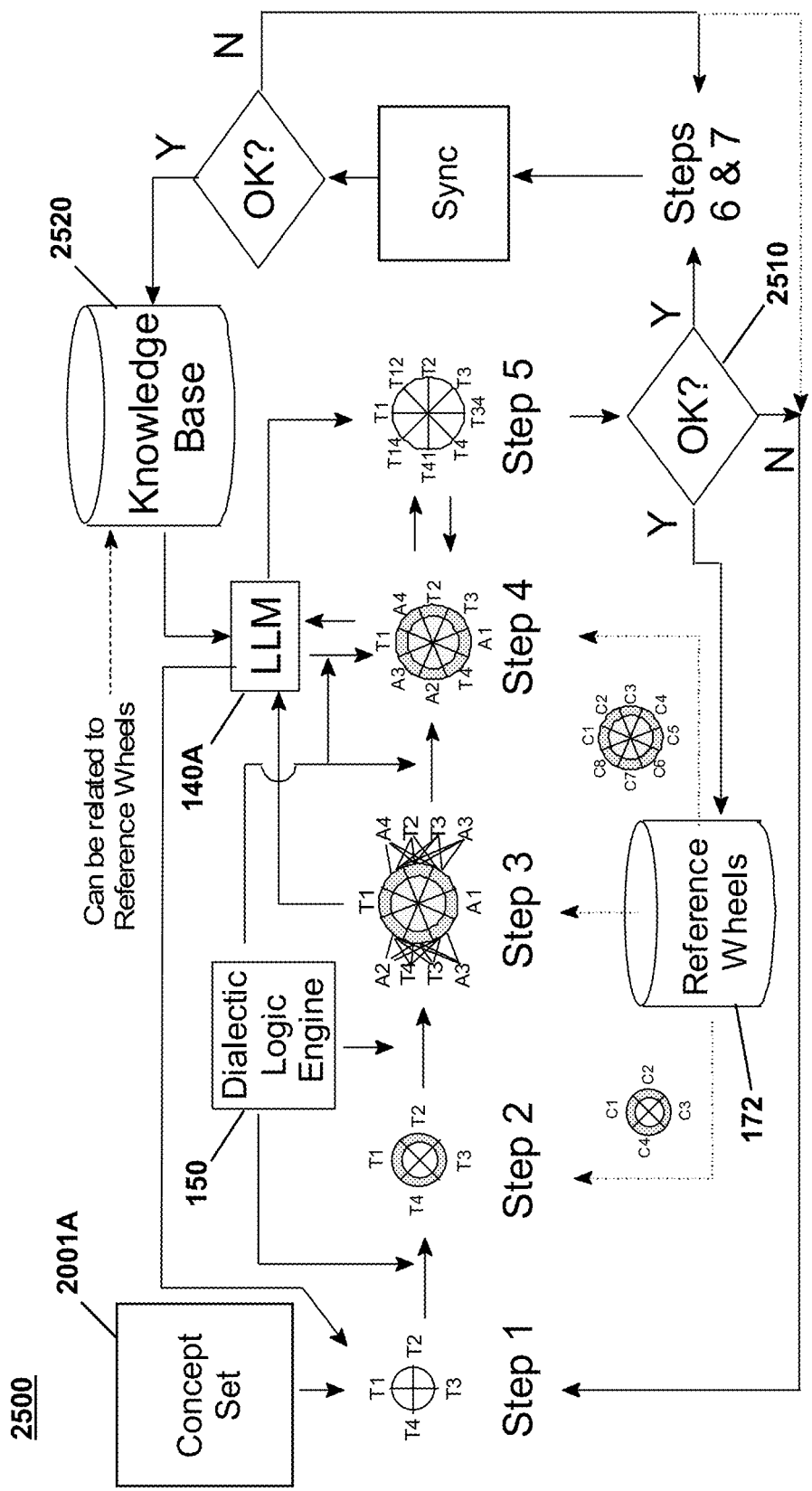
FIG. 25 illustrates an exemplary process for generating reference wheels for ambiguous causality scenarios according to certain embodiments.

FIG. 25 illustrates an exemplary process 2500 for generating reference wheels for ambiguous causality scenarios.

In the areas beyond psychology, the identification of dialectical components or parameters is often problematic. In such cases, it can be useful to search for the functional or conceptual oppositions that balance the performance of a given element through a process that is similar to Jung's "acausal synchronicity", while not being attached to it directly.

The process 2500 illustrated in FIG. 25 starts by initially receiving a concept set 2001A comprising one or more concept parameters 2001. The process is labeled with Steps 1-7. Each concept parameter 2001 can be processed according to one or more of these steps to generate a reference wheel 172. Some or all of these steps may be executed by the causality evaluation process 2060 to derive a reference wheel 172 (or other output) in scenarios where causalities among parameters or components are ambiguous. Table 23 (reproduced below) provides details on each of these steps.

TABLE 23

| Step | | Explanations | Comment | Examples |
|---|---|---|---|---|
| 1 | Sequence Mapping | Identify and/or order the major steps (e.g., archetypical association parameters 2010) of the cyclic process | Start with 4 steps | FIG. 26A |
| 2 | Diagonal Opposition Analysis | Identify conceptual or functional oppositions between diagonally placed elements and construct an initial wheel | Look for archetype associations (Table 1) | FIG. 26B |
| 3 | Higher Orthogonality Oppositions | Identify the "missing steps" as the "more direct" oppositions than present in the system | See the prompt in the text | Tables 25, 28, 30 |
| 4, 4A | Functional Analog | Identify real analogs with similar functions and diagonal placement | Prompt LLM 140A (possible return to step 3) | As above |
| 5 | Causality determination | Build an expanded wheel with exact positionings of all elements | Choosing 1 of 7 possibilities | As above, FIG. 26C |
| 5A | Better analog for T1-T4 | Optional: Look for better players representing the original concepts | Who is really behind T1-T4 | Table 26 |
| 5B | Archetype matching | Optional: Look for analogous reference wheels | Try multiple options | Tables 26 |
| 6 | Synchronization Potential | Identify possibilities for synchronizing opposite steps to prevent malfunctions | How can tuning of one fix another? | Tables 27, 29, 31 |

TABLE 23-continued

| Step | | Explanations | Comment | Examples |
|---|---|---|---|---|
| 6A | Double sync | Considering sync for orthogonal pairs of oppositions | Typical in natural systems | Table 31 |
| 7 | Further Iteration | Continuing the process of generating oppositions to spark new insights | Consider new intermediate steps | |

At process block 2510, a determination is made regarding whether or not the reference derived using Steps 1-5 is sufficiently accurate or precise. In some cases, if it is not sufficiently accurate, the process 2500 may proceed back to Step 1 for further refinement. If it is sufficiently accurate, the process 2050 one of two possibilities may occur: 1) the new reference wheel may be stored as a final result (e.g., in some cases, stored in a database and/or stored for output to an end-user or computing system); or 2) the process 2500 may proceed to Steps 6-7 to further enhance the reference wheel 172 before finalization using the steps described in Table 23 above. This enhancement process utilizes a knowledge base 2520 (e.g., which may include a database that stores previously generated reference wheels 172 and/or mapping schema information) to further refine or hone the parameters of the reference wheel 172 before finalization.

FIG. 26A, FIG. 26B, and FIG. 26C illustrate consecutive stages of constructing an exemplary dialectic or reference wheel, specifically applying the methodology to the analysis of a complex economic regulation process that was mentioned above. FIG. 26A illustrates a first stage of constructing an exemplary dialectic or reference wheel according to certain embodiments. FIG. 26B illustrates a second stage of constructing an exemplary dialectic or reference wheel according to certain embodiments. FIG. 26C illustrates a third stage of constructing an exemplary dialectic or reference wheel according to certain embodiments.

FIG. 26A shows the major steps of a cyclic process in causality order, with diagonal elements representing conceptual or functional oppositions: 1) Policy Planning, 2) Implementation, 3) Market Response, 4) Adaptation. The opposing forces can be better seen in the analysis of positive and negative sides of diagonal elements in FIG. 26B. For instance, T1+=Foresight opposes T3−=Volatility, while T1−=Overplanning ("paralysis by analysis") opposes T3+=Innovation. These oppositions, however, operate on an abstract level and, therefore, the causality evaluation process 2060 can look for the "more orthogonal" oppositions using prompts 152 the illustrated in Table 24 (reproduced below), which demonstrates exemplary prompts 152 that can be used Steps 1-5.

TABLE 24

Step 1: Identify the 4 major concepts, stages, or steps of the complex economic regulation process, that often leads to unexpected outcomes, arranged in the circular causality sequence (T1 - T2 - T3 - T4), so that T1 and T3 represent some type of conceptual or functional oppositions, while T2 and T4 represent another type of similar oppositions
Step 2: Identify the major positive and negative (exaggerated) sides of each stage (1-2 words each): T1 = Policy Planning, T2 = Implementation, T3 = Market Response, T4 = Adaptation
Step 3: identify oppositions/antitheses (A) to each of the following stages or concepts of the market control cycle (T), so that A should not coincide with the remaining stages/concepts, and the positive side of the stage (T+) should be negative side of its opposition (A−), while the negative side of stage (T−) should be positive side of its antithesis (A+): (1) T1 = Policy Planning, T1+ = Foresight, T1− = Overplanning. (2) T2 = Implementation, T2+ = Execution, T2− = Overregulation. (3) T3 = Market Response, T3+ = Self-organization, T3− = Volatility. (T4) T4 = Adaptation, T4+ = Flexibility/Resilience, T4− = Inconsistency. The opposing pairs must be placed strictly diagonally on the wheel of circular causation, separated by 3 other steps, while maintaining the actual causality: (1) The opposition of T1 must be either between either T2 and T3 or T3 and T4. (2) The opposition of T2− between either T3 and T4 or T4 and T1. (3) The opposition of T3− between either T4 and T1 or T1 and T2. (4) The opposition of T4− between either T1 and T2 or T2 and T3.
Step 4: Suggest the real names to these processes: (1) How do you call the "Emergent Behavior" between either Implementation and Market Response or Market Response and Adaptation, with positive side = Natural Flow, negative = Lack of direction? Can it be some kind of economic or regulatory phenomena? (2) How do you call the "Experimentation" between either Market Response and Adaptation or Adaptation and Policy Planning, with A+ = Learning, A− = Inefficiency? (3) How do you call the "Control Framework" between either Adaptation and Policy Planning or Policy Planning and Imp[lamentation, with A+ = Stability, A− = Stagnation? (4) How do you call the "Standardization" between either the Policy Planning and Implementation or Implementation and Market response, with A+= Consistency, A− = Inflexibility?
Step 4A: Find the best matches of these antitheses with the real-life players and phenomena (1-3 words for each), e.g .: A1 = Market Forces - can these be the Major Banks and Corporations? A2 = Regulatory Feedback - Central Bank & other planning institutions? A3 = Governance Structure - Bureaucratic machine, ministerial structure? A4 = Regulatory Standards - Taxation structure?
Step 5: Which of the following causal sequences is the most realistic (keeping in mind that the final step cycles back to the first step): 1) T1 - T2 - T3 - T4 - A1 - A2 - A3 - A4; 2) T1 - T2 - T3 - A4 - A1 - A2 - A3 - T4; 3) T1 - T2 - A4 - T3 - A1 - A2 - T4 - A3; 4) T1 - T2 - A3 - A4 - A1 - A2 - T3 - T4; 5) T1 - A4 - T2 - T3 - A1 - T4 - A2 - A3; 6) T1 - A3 - T2 - A4 - A1 - T3 - A2 - T4; 7) T1 - A3 - A4 - T2 - A1 - T3 - T4 - A2. For each sequence estimate the numeric probabilities (0 to 1) regarding its realistic existence, assuming that: T1 = Economic Policy Planning; T2 = Policy implementation; A3 = Executive Government (Ministries, etc); A4 = Taxation, Licensing, Compliance; A1 = Major Market Players (Major Banks, Funds, Corporations); A2 = Strategic Planning Bodies (Central Bank, Economic Council, Financial Regulators); T3 = Market Response; T4 = Policy Adaptation TABLE 24-continued Step 5A: Find the best matches of the original concepts T1-T4 with the real players in the market, legislation, governmental bodies, and other bodies or areas that may be pertinent to this analysis
Step 5B: Estimate similarities between (dialectical facet or character of) each stage of a given process vs. those of reference wheel(s)

Table 25 illustrates outputs or responses generated by the language model 140 in response to the exemplary prompts shown above.

| Steps 1-2 | T1 (position 1) | T2 (position 3) | T3 (position 6) | T4 (position 8) |
|---|---|---|---|---|
| Market Control | Policy Planning | Implemen- tation | Market Response | Adaptation |
| Positive | Foresight | Execution | Innovation | Flexibility/ Resilience |
| Negative | Overplanning | Overregulation | Volatility | Inconsistency |

| Steps 3-5 | A1 (position 5) | A2 (position 7) | A3 (position 2) | A4 (position 4) |
|---|---|---|---|---|
| Antitheses | Emergent Behavior | Experimentation | Control Framework | Standardization |
| Positive | Natural Flow | Learning | Stability | Consistency |
| Negative | Lack of Direction | Inefficiency | Stagnation | Inflexibility |
| Real stages | Market Forces | Regulatory Feedback | Governance Structure | Regulatory Standards |
| Positive | Efficient allocation | Evidence-based policymaking | Institutional consistency | Predictable rules |
| Negative | Market failures | Trial and error costs | Bureaucratic inertia | Regulatory burden |
| Verified Players | Major players: Large banks, Investment Funds, Multinational Corporations | Strategic Planning Bodies: Central Bank, Economic Council, Fin. Regulators Agencies, Admin. Bodies | Executive Apparatus: Governmental Ministries, Regulatory | Control Mechanisms: Taxation, Licensing, Compliance |

In the above table, it can be noted that there is increased orthogonality (the opposing level) between the positive and negative parameters from the same column compared to those from different columns. For instance, T1+=Foresight is more opposite to the A1−=Lack of Direction and Market Failures than to T3−=Volatility. This proves that the extended wheel in FIG. 26C is more useful than the scheme in FIG. 26B.

Verification of the exact causality positions after step 5 (in process block 2510) represents a validation point. If the real causality does not fit into our scheme, then the understanding of the given system is either incomplete or flawed. In FIG. 25, this is shown as an iterative loop bringing the process 2500 back to the starting steps. In certain embodiments, it is beneficial to compare a given system to one or more reference wheels that can provide ideas of what is missing (e.g., as show is Steps 6-7 in FIG. 25).

The identified causality suggests that market control inefficiency stems from three sequential antagonisms: government (A3)—major players (A1)—market (T3)—regulatory response timing (A2), potentially laying a foundation for a new economic theory.

Table 26 (reproduced below) arranges all stages into a causal sequence and performs Steps 5A and 5B.

TABLE 26

| | | Economic Regulation | Reference Wheels | |
|---|---|---|---|---|
| N | Oppositions | Real Players | DISC Traits (B) | 4-Stroke Engine |
| 1 | T1 Policy Planning | Congress, Partisan think tanks | Influence [0.7] | Intake [0.6] |
| (+) | Foresight | Foresight | Charismatic [0.6] | Efficiency [0.7] |
| (−) | Overplanning | Rigidity | Impulsive [0.5] | Clogging [0.7] |
| 2 | A3 = Control Framework | Governmental ministries, agencies, bodies | Dynamism [0.6] | Compression [0.8] |
| (+) | Stability | Institutional consistency | Initiative [0.5] | Power [0.7] |
| (−) | Stagnation | Bureaucratic inertia | Instability [0.8] | Stress [0.8] |
| 3 | T2 Implementation | Governmental action, policy execution | Dominance [0.8] | Ignition delay [0.7] |

TABLE 26-continued

| | | Economic Regulation | | Reference Wheels | |
|---|---|---|---|---|---|
| N | | Oppositions | Real Players | DISC Traits (B) | 4-Stroke Engine |
| | (+) | Execution | Execution | Leadership [0.8] | Controlled timing [0.8] |
| | (−) | Overregulation | Overregulation | Aggression [0.7] | Pre-ignition or knock [0.8] |
| 4 | | A4 Standardization | Taxation, Licensing, Compliance | Conscientious [0.8] | Combustion [0.6] |
| | (+) | Consistency | Predictable rules | Precision [0.8] | Force [0.6] |
| | (−) | Inflexibility | Bureaucracy | Perfectionism [0.7] | Heat [0.6] |
| 5 | | A1 = Emergent Behavior | Large banks, Funds, Multinat. Corporations | Objectivity [0.7] | Power stroke [0.8] |
| | (+) | Natural Flow | Efficient allocation | Rationality [0.8] | Work Output [0.8] |
| | (−) | Lack of Direction | Market failures | Detachment [0.7] | Blowby/Jamming [0.7] |
| 6 | | T3 = Market Response | Small/medium enterprises, consumers | Steady [0.7] | Valve overlap [0.6] |
| | (+) | Innovation | Innovation | Reliability [0.6] | Exhaust scavenging [0.7] |
| | (−) | Volatility | Volatility | Passivity [0.7] | Charge dilution [0.8] |
| 7 | | A2 Experimentation | Central Bank, Economic Council, Fin. Regulators | Collaboration [0.7] | Exhaust [0.6] |
| | (+) | Learning | Evidence-based policymaking | Harmony [0.6] | Cleansing [0.7] |
| | (−) | Inefficiency | Trial and error costs | Submissive [0.6] | Back-pressure/Pollution [0.8] |
| 8 | | T4 Adaptation | Lobbyists, Prof. networks, Unions | Flexibility [0.8] | Charge formation [0.7] |
| | (+) | Flexibility Resilience | Flexibility Resilience | Adaptability [0.9] | Homogenization [0.8] |
| | (−) | Instability Inconsistency | Opaque, Not transparent | Chaos [0.8] | Poor mixing [0.8] |

This analysis identifies the utmost importance of T1=Legislators and T4=Lobbyists, and points to the weakest points based on the alignment with two reference wheels. Numbers in brackets indicate similarities between the respective concepts (0—dissimilar, 1—identical). One can see that both wheels are quite similar to our system, therefore any deviations (marked in bold values) indicate potential improvements. The weakest steps appear to be related to legislators (T1), government (A3), and fin-regulators (A2), all of which deviate from human values (given by DISC traits) toward mechanical machines (4-stroke engine). This observation alone could lead to economic revolution, by applying the earlier mentioned psychological and emotional tools from Tables 16-22 to the players in economic regulation. In addition, other reference wheels can further widen the analogical reasoning and potentially suggest even better causal sequences, as in Tables 21-22 and FIG. 27 (with VIA strengths replaced by the economic regulation stages).

As demonstrated by Table 27 (reproduced below), another validation point is to consider the ways in which diagonal elements can synchronize each other, giving further hints or insights into how system works (see the "Existing Synchronizers" column) and/or how it could be improved (the "Potentially New" column). Therefore, it can serve as both educational and innovation boosting tool.

TABLE 27

| Market's Oppositions | Existing Synchronizers | Potentially New |
|---|---|---|
| T1 (Congress/Partisan Think Tanks)-A1 (Large Market Players) | Legislative hearings and partisan policy research | AI policy impact simulators + Cross-party sandbox trials |
| T2 (Government Action)-A2 (Independent Regulators) | Joint committees and protocol sharing | Expert rotation + Automated policy metrics |
| T3 (SME/Consumers)-A3 (Government Bodies) | Consumer protection offices, business associations | Sectoral councils + Real-time feedback platforms |
| T4 (Lobbyists/Professional Networks)-A4 (Compliance Framework) | Industry standards and compliance guidelines | Influence tracking + Adaptive compliance thresholds |

This also shows how to determine the major functions and oppositions of a given entity by analyzing the larger picture in which this entity is only a small part.

Table 28 (reproduced below) illustrates the above-described Steps 1-5 can be applied to another example, in which the concept under analysis is 4-stroke engine. The major steps of a cyclic process involve air-fuel mixture intake (T1), compression (T2), combustion (T3), and exhaust (T4). Note the increasing oppositions between the differently signed diagonal components in the original pairs (T1-T3 and T2-T4) and subsequent pairs (T1-A1, T2-A2, . . . ). For instance, T1+=Efficiency is more opposite to the A1-=Inefficiency and Blowby/Jamming than to T3-=Heat. This proves again that the extended wheel in steps 3-5 is more useful than in steps 1-2.

TABLE 28

| Steps 1-2 | T1 (position 1) | T2 (position 2) | T3 (position 4) | T4 (position 7) |
|---|---|---|---|---|
| 4-stroke engine | Intake | Compression | Combustion | Exhaust |
| Positive | Efficiency | Power | Force | Cleansing |
| Negative | Clogging | Stress | Heat | Back-pressure |

| Steps 3-5 | A1 (position 5) | A2 (position 6) | A3 (position 8) | A4 (position 3) |
|---|---|---|---|---|
| Antitheses | Release | Relaxation | Preparation | Containment |
| Positive | Unclogging | Relief | Cooling | Preservation |
| Negative | Inefficiency | Weakness | Inertia | Contamination |
| Real stages | Power stroke | Valve overlap | Charge format. | Ignition delay |
| Positive | Work Output | Exhaust scaveng. | Homogenization | Adjusted timing |
| Negative | Blowby/Jamming | Charge dilution | Poor mixing | Knock |

The causality sequence shown in Table 28 (indicated by position numbers next to each concept) was validated through similarity comparisons with two independent reference wheels, as was earlier shown in Table 26.

As demonstrated by Table 29 (reproduced below), another validation point is to consider the ways in which diagonal elements can synchronize each other, giving further hints or insights into how system works (see the "Existing Synchronizers" column) and/or how it could be improved (the "Potential Improvements" column). Therefore, it can serve as both educational and innovation boosting tool.

TABLE 29

| Oppositions | Existing Synchronizers | Potential Improvements |
|---|---|---|
| (T1) Intake- | Variable valve timing (VVT); | Adaptive intake geometry; |
| (A1) Power stroke | Intake manifold tuning | AI-controlled valve timing |
| (T2) Compression- | Camshaft phasing; | Dynamic piston crown geometry; |
| (A2) Valve Overlap | Variable compression ratio | Electronically controlled valves |
| (T3) Ignition Delay- | Multi-stage fuel injection; | Plasma-assisted ignition; |
| (A3) Exhaust | Exhaust gas recirculation (EGR) | Smart exhaust valves |
| (T4) Combustion- | Direct injection; | In-cylinder fuel reforming; |
| (A4) Charge Formation | Turbulence-inducing pistons | Adaptive combustion chamber |

Note that this analysis aims at capturing the vital dialectical relation. In practice, more than one dialectical wheel may be needed to adequately represent all interconnections. A significant advantage of such analysis is in its holistic view that is not provided by other analytical means.

Table 30 (reproduced below) illustrates the above-described Steps 1-5 can be applied to another example, in which the concept under analysis is photosynthesis.

TABLE 30

| Steps 1-2 | T1 (position 1) | T2 (position 3) | T3 (position 4) | T4 (position 6) |
|---|---|---|---|---|
| Photosynthesis | Light Absorption | Water Splitting | Carbon Fixation | Glucose Synth. |
| Positive | Energy capture | Electron liberat. | C assimilation | Energy storage |
| Negative | Heat stress | Oxidative damage | Energy consum. | Resource deplet. |

| Steps 3-5 | A1 (position 5) | A2 (position 7) | A3 (position 8) | A4 (position 2) |
|---|---|---|---|---|
| Antitheses | Energy consumption | Antioxidant Formation | Carbon & Heat Release | Energy Consumption |
| Positive | Heat Dissipation | Reductive protection | Energy Generation | Heat Dissipation |
| Negative | Energy Loss | Electron Consumption | Carbon Loss | Energy Loss |
| Real events | Energy consuming Calvin cycle | Production of protective molecules, like ascorbate | Metabolic regulation, including photorespiration | ATP/NADH synthesis |
| Positive | Sugar formation | Reductive protection | Homeostasis maintenance | Energy transduction |
| Negative | ATP consumption | Energy diversion | Carbon loss | Electron Deplet. |

Table 31 (reproduced below) illustrates an improvement though synchronizing of diagonal oppositions.

TABLE 31

| Complementing Oppositions | Known Synchronizers | Potentially New Directions |
|---|---|---|
| (T1) Light Absorption-(A1) Energy Consumption in Calvin cycle | Thylakoid membrane organization | Adaptive light-harvesting complexes could better match absorption to Calvin cycle needs |
| (T2) Water Splitting-(A2) Protective substances formation | Redox signaling pathways | Enhanced photoprotection could improve efficiency of water splitting |
| (T3) Carbon Fixation-(A3) Metabolic Regulation | RuBisCO activase | Engineered carbon concentrating mechanisms could boost fixation while maintaining regulation |
| (T4) Glucose synthesis-(A4) ATP and NADH synthesis | Thioredoxin system | Optimized energy distribution could better balance glucose synthesis and ATP/NADPH production |
| (T1-A1) × (T2-A2) Light/Energy and Water/Protection | Proton gradient coupling | Smart membrane architecture with integrated photoprotection-energy distribution |
| (T3-A3) × (T4-A4) Carbon/Regulation and Sugar/Energy | Metabolic feedback loops | Synthetic metabolic highways with coordinated carbon-energy flow control |

This analysis embodiment in the above table differs from previous analyses described above, as demonstrated by two new rows at the bottom of the tables. These rows reveal higher-order synchronization between orthogonal pairs of oppositions—a feature typical to living systems but rare in artificial ones. In essence, the data produced in the portion of the analysis indicates that to harvest sweet and healthy fruit, one approach is applying holistic care to the tree: balanced sunlight and water, sufficient CO2, protection from diseases and chemicals, and so on. Natural harmony emerges from this higher-order synchronization rarely found in artificial systems, which can be better understood through our framework's various embodiments.

These insights or results may be applied to suggest new educational tools, research frameworks, systems and/or biology models to enhance understanding and innovation in the field.

In certain embodiments, a computerized method is disclosed for electronically performing a dialectic causality analysis, which can be stored as instructions on one or more non-transitory storage devices and executed by one or more processing devices. The method can include one or more of the following operations: a) providing access to a dialectic logic engine that is configured to store and execute programming logic for electronically performing dialectical analyses; b) receiving, by the dialectic logic engine, an input string identifying a concept parameter; b) initiating a first communication exchange between the dialectic logic engine and a language model to derive a plurality of archetypical association parameters corresponding to the concept parameter; d) storing the plurality of archetypical association parameters in a mapping schema, wherein the mapping schema defines relationships among or between the plurality of archetypical association parameters; e) initiating a second communication exchange between the dialectic logic engine and the language model to derive a plurality of supplemental parameters based, at least in part, on the plurality of archetypical association parameters; f) storing the plurality of supplemental parameters in the mapping schema, wherein the mapping schema defines relationships among the plurality of supplemental parameters and the plurality of archetypical association parameters; and g) generating one or more dialectic causality outputs based, at least in part, on the mapping schema.

In certain embodiments, a computerized method is stored as instructions on one or more non-transitory storage devices and executed by one or more processing devices. The method can include one or more of the following operations: a) providing access to a dialectic logic engine that is configured to store and execute programming logic for electronically performing dialectical analyses; b) receiving, accessing, or identifying a concept parameter; c) initiating a first communication exchange between the dialectic logic engine and a language model to derive archetypical association parameters corresponding to the concept parameter; d) storing the archetypical association parameters in a mapping schema, wherein the mapping schema stores relationship data corresponding to the archetypical association parameters; e) initiating a second communication exchange between the dialectic logic engine and the language model to derive one or more supplemental parameters; f) storing the one or more supplemental parameters in the mapping schema, wherein the mapping schema stores relationship data corresponding to the supplemental parameters; and g) generating one or more dialectic causality outputs based, at least in part, on the mapping schema.

In certain embodiments, a system is disclosed for electronically performing a dialectic causality analysis. The system can comprise one or more processing devices and one or more non-transitory storage devices that store instructions. Execution of the instructions by the one or more processing devices causes the one or more processing devices to perform one or more the aforementioned methods.

In certain embodiments, a computer program product is disclosed that for electronically performing a dialectic causality analysis that stores instructions, which when executed by a processing device, performs the above one or more the aforementioned methods.

Additional Embodiments & Exemplary Implementation Details

FIGS. 12-16 provide additional details for exemplary systems and methods described in this disclosure. FIGS.

12-13 illustrate, inter alia, additional components or functions that may be integrated with the dialectic logic engine 150 and language model 140. The exemplary components illustrated in these systems (1200, 1300) can be incorporated into any embodiment described in this disclosure.

As illustrated, a platform server (e.g., server 120) that hosts the dialectic logic engine 150 may include an artificial wheel engine (AWE) that can be configured to generate various types of dialectic wheels 172 and/or other dialectic outputs 170. The dialectic logic engine 150 (and artificial wheel engine) serves as a middle or intermediary processing layer situated between user interfaces (UI) presented on client devices (e.g., computing devices 110) to end-users and an intelligent system (IS) that includes one or more language models 140. This middle or intermediary processing layer facilitates assisted interactions using the dialectical methods or techniques disclosed herein. Amongst other things, it allows end-users to engage with complex problems through synthesis, compromise, and consideration of multiple perspectives, and can improve decision-making capabilities. The intelligent system (or learning models associated therewith) is trained to execute various NLP tasks 145 including, but not limited to, NLP tasks 145 for understanding and generating responses to textual, visual, or audio inputs without the need for a specific interface. The intelligent system provides useful functions associated with processing inputs and generating outputs based on dialectical analyses.

The platform server can include, inter alia: 1) a multi-tenant application database that stores user account information, interaction history, preferences, and settings; 2) a vector store that stores encoded information (vector embeddings) used for retrieval-augmented generation (RAG) and long-term memory (LTM), supporting the dynamic retrieval of user inputs and responses; and 3) a dialectical semantic knowledge graph (DSKG) that maintains semantically related concepts derived from dialectical analysis, evolving to reflect a user-specific set of dialectical insights and supporting the generation of artificial wisdom.

The dialectic logic engine 150 can utilize this stored data to enhance operations or functionalities associated with the performing the dialectical analyses in various ways. In some embodiments, the AWE can be configured to analyzes inputs (e.g., input strings 115) using dialectical methods to produce responses that reflect a comprehensive understanding, incorporating an end-user's worldview stored in DSKG. The dialectic logic engine 150 (or AWE) also can generates responses that are constructive, and which balance positive and negative considerations.

Figure 14:
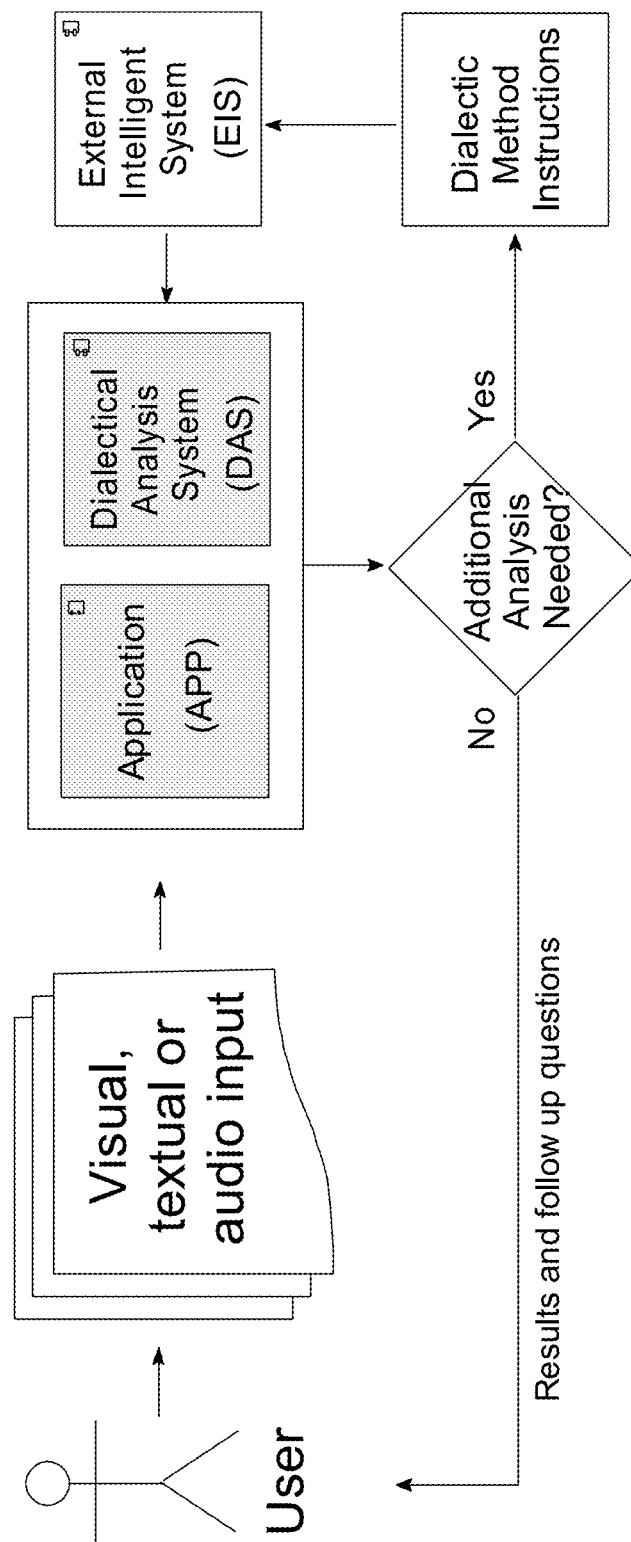
FIG. 14 is a diagram of an exemplary process flow according to certain embodiments.
Figure 15:
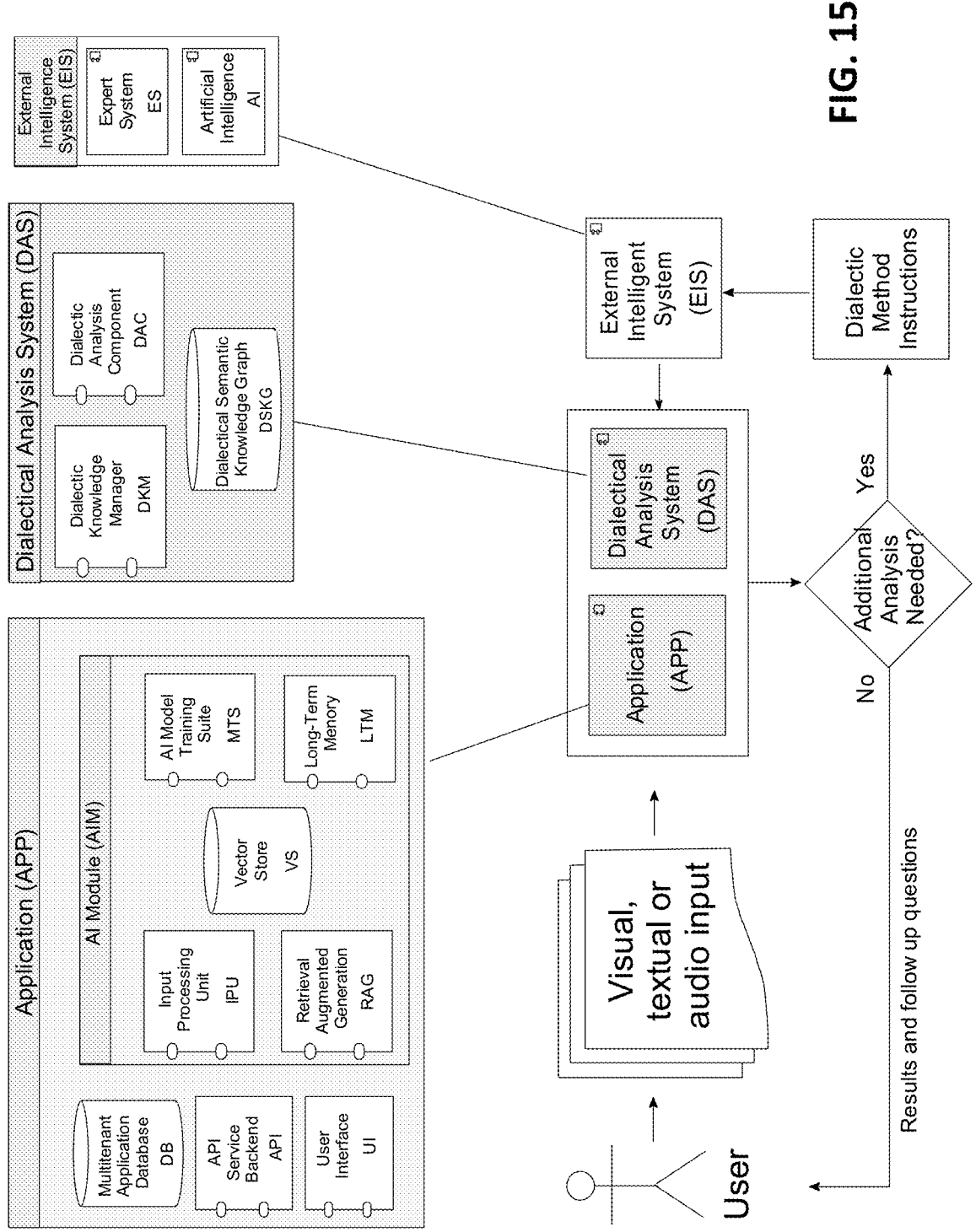
FIG. 15 is a diagram of an exemplary process flow according to certain embodiments.

FIGS. 14-15 illustrates an exemplary process flow that may be executed to generate one or more dialectic outputs 170 based on one or more inputs (which may include textual, audio, and/or image data) provided by an end-user.

Figure 16:
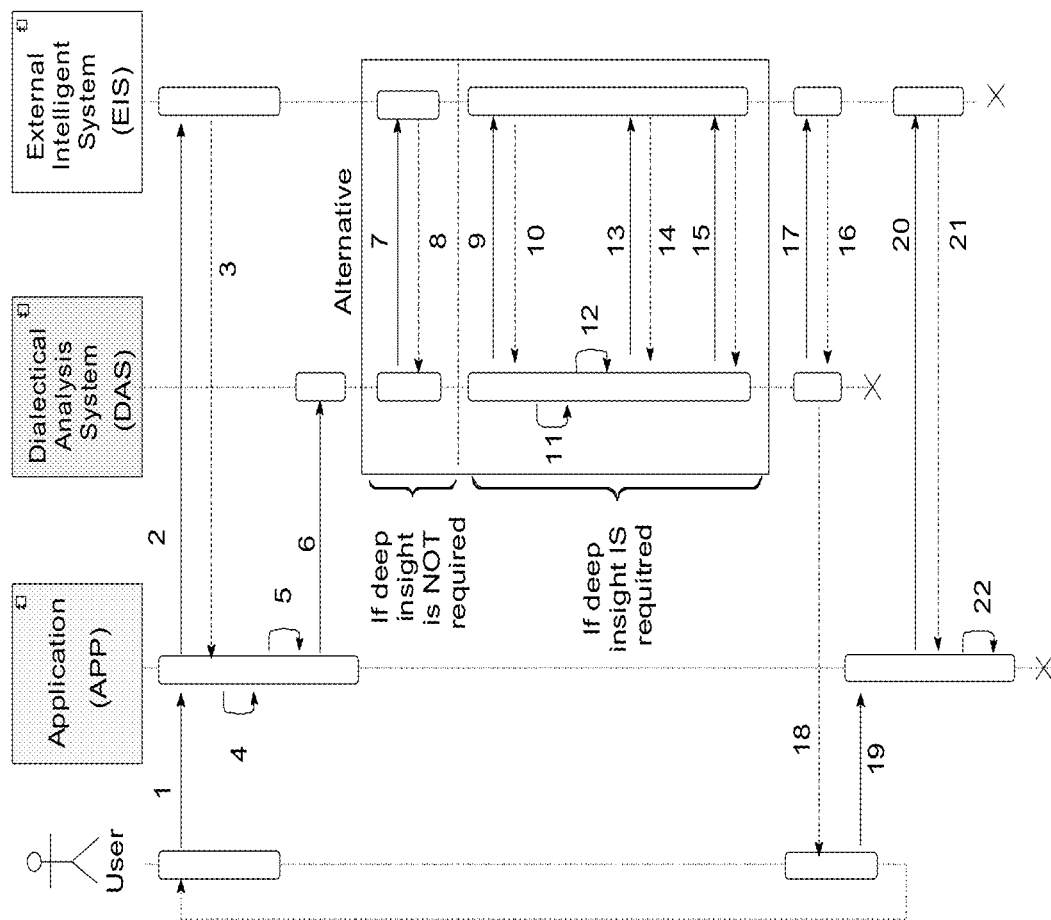
FIG. 16 is a diagram of an exemplary process flow according to certain embodiments.
Figure 17:
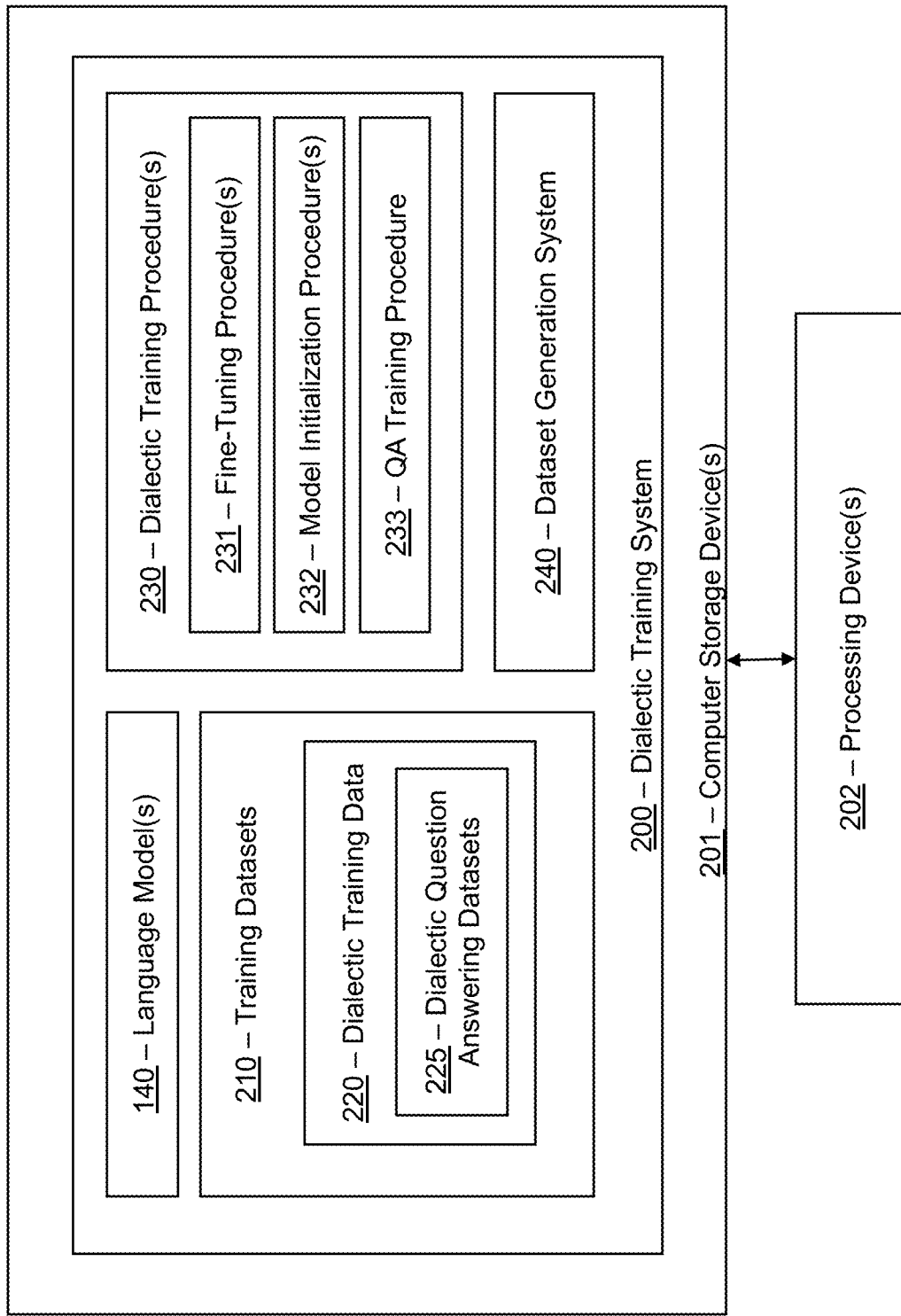
FIG. 17 is a block diagram illustrating exemplary features of a dialectic training system.

FIG. 16 illustrates another exemplary process flow that may be executed to generate one or more dialectic outputs 170 based on one or more inputs (which may include textual, audio, and/or image data) provided by an end-user. The exemplary process flow includes some or all of the following steps: 1) end-user or secondary application submits an input (a textual, visual and/or audio input); 2) provide the input for NLP processing (e.g., to language model 140); 3) convert input to textual representation; 4) interpret the user's intent (e.g., using the language model 140); 5) supplement the input using RAG or LTM; 6) transfer the supplemented input to the dialectic logic engine 150; 7) generate and transmit prompt 152 to language model 140 or other component of external intelligent system for response generation based on the enriched input; 8) receive a response comprising natural language, visual content, and/or audio content; 9) execute a dialectical analysis of the user's input; 10) generate structured results; 11) refine the user's intent using DKM; 12) instantiate a sequence of prompts based on a selected dialectic method; 13) execute or transmit the prompts to fulfill the refined intent; 14) generated structured results; 15) generate and transmit prompt for formulating a final response; 16) receive response comprising natural language, visual content, and/or audio content; 17) generate prompt for a relevant question to bring the end-user back in control; 18) transmit or provide the results and the question to the end-user; 19) consume result and mark it as useful; 20) generate prompt to summarize and recap results; 21) determine the response is ready for archiving; and 22) save response and/or results to an archive (e.g., a vector store).

Any of the features, functions, and/or components illustrated in connection with FIGS. 12-16 can be combined or incorporated into any other embodiments described in this disclosure.

As evidenced by the disclosure herein, the inventive techniques set forth in this disclosure are rooted in computer technologies that overcome existing problems in known AI language models, including problems dealing with applying dialectic analyses and generating objective responses with high precision and accuracy. The techniques described in this disclosure provide a technical solution (e.g., one includes programmatic logic to iteratively enforce constraints on responses generated by AI models to refine outputs) for overcoming the limitations associated with known techniques. This technology-based solution marks an improvement over existing capabilities and functionalities of AI language models by providing bounds on the types of responses that are acceptable.

In many embodiments, the techniques described herein can provide a practical application and several technological improvements. In some embodiments, the techniques described herein can provide a technical solution for electronically producing dialectically derived outputs. These techniques provide significant improvements over both human and AI-based approaches for applying dialectical analyses, which inherently inject subjectivity and bias into dialectical analyses.

In many embodiments, the techniques described herein can be used continuously at a scale that cannot be reasonably performed using manual techniques or the human mind. For example, humans are not capable of ingesting and/or processing large scale datasets that are used to train language models, nor are they capable of simultaneously enforcing a multitude of constraint conditions on reasoning in real-time.

In a number of embodiments, the techniques described herein can solve a technical problem that arises only within the realm of computer networks, as AI and machine-learning do not exist outside the realm of computer networks.

In certain embodiments, a computerized method is disclosed for performing an automated dialectic analysis comprising: providing access to a dialectic logic engine that is configured to generate or derive a plurality of dialectic parameters from at least one input string based, at least in part, on a communication exchange with one or more language models; receiving, by the dialectic logic engine, the at least one input string; generating, by the dialectic logic engine, one or more prompts for querying the one or more language models to obtain the plurality of dialectic parameters, wherein the one or more prompts are designed to elicit a thesis parameter and an antithesis parameter corresponding to the at least one input string from the one or more language models; transmitting the one or more prompts to the one or more language models; receiving, from the one or more language models, the thesis parameter and the antithesis parameter; and generating, by the dialectic logic engine, one or more dialectic outputs based, at least in part, on the thesis parameter and the antithesis parameter received from the one or more language models.

In certain embodiments, a computer program product is disclosed for performing an automated dialectic analysis. The computer program product can perform the same functions as recited in the aforementioned method.

In certain embodiments, a system is disclosed for performing an automated dialectic analysis. The system comprises one or more processing devices and one or more non-transitory storage devices that store instructions. Execution of the instructions by the one or more processing devices can cause the one or more processing devices to perform the same functions as recited in the aforementioned method.

In certain embodiments, a computerized method for training a language model is disclosed. The computerized method may be implemented via execution of computing instructions by one or more processing devices and stored on one or more non-transitory computer storage devices. The computerized method comprises: providing, by the one or more processing devices, access to a dialectic training system configured to train a language model to generate outputs utilized in electronically conducting dialectic analyses: receiving, by the dialectic training system, textual content; executing, by the one or more processing devices, a dataset generation function that is configured to generate or derive dialectic training data based on the textual content; and utilizing the dialectic training data to train the language model.

In certain embodiments, a system for training a language model is disclosed. The system comprises one or more processing devices and one or more non-transitory storage devices that store instructions, and execution of the instructions by the one or more processing devices causes the one or more processing devices to: provide, by the one or more processing devices, access to a dialectic training system configured to train a language model to generate outputs utilized in electronically conducting dialectic analyses: receive, by the dialectic training system, textual content; execute, by the one or more processing devices, a dataset generation function that is configured to generate or derive dialectic training data based on the textual content; and utilize the dialectic training data to train the language model.

In certain embodiments, a computer program product is provided. The computer program product comprises a non-transitory storage device including instructions for causing one or more processing devices to: provide access to a dialectic training system configured to train a language model to generate outputs utilized in electronically conducting dialectic analyses: receive, by the dialectic training system, textual content; execute a dataset generation function that is configured to generate or derive dialectic training data based on the textual content; and utilize the dialectic training data to train the language model.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A system for electronically performing a dialectic causality analysis, the system comprising one or more processing devices and one or more non-transitory storage devices that store instructions, wherein execution of the instructions by the one or more processing devices causes the one or more processing devices to perform functions including:

provide access to a dialectic logic engine that is configured to store and execute programming logic for electronically performing dialectical analyses;

receiving, by the dialectic logic engine, an input string identifying a concept parameter;

initiating a first communication exchange between the dialectic logic engine and a language model to derive a plurality of archetypical association parameters corresponding to the concept parameter;

storing the plurality of archetypical association parameters in a mapping schema, wherein the mapping schema defines relationships among or between the plurality of archetypical association parameters;

initiating a second communication exchange between the dialectic logic engine and the language model to derive a plurality of supplemental parameters based, at least in part, on the plurality of archetypical association parameters;

storing the plurality of supplemental parameters in the mapping schema, wherein the mapping schema defines relationships among the plurality of supplemental parameters and the plurality of archetypical association parameters; and generating one or more dialectic causality outputs based, at least in part, on the mapping schema, the plurality of archetypical association parameters, and the plurality of supplemental parameters.

2. The computerized system of claim 1, wherein initiating the second communication exchange between the dialectic logic engine and the language model to derive the plurality of supplemental parameters includes transmitting one or more prompts designed to extract or obtain a plurality of intermediate parameters from the language model, and each of the plurality of intermediate parameters identify a transition between two adjacent archetypical association parameters arranged according to a sequence order defined by the mapping schema.

3. The computerized system of claim 1, wherein initiating the second communication exchange between the dialectic logic engine and the language model to derive supplemental parameters includes sending one or more prompts designed to extract or obtain a plurality of opposition parameters from the language model, and the plurality of opposition parameters identify contrasting or opposing concepts that balance or complement the plurality of archetypical association parameters stored in the mapping schema.

4. The computerized system of claim 1, wherein initiating the second communication exchange between the dialectic logic engine and the language model to derive supplemental parameters includes sending one or more prompts designed to extract or obtain both a plurality of intermediate parameters and a plurality of opposition parameters from the language model.

5. The computerized system of claim 1, wherein initiating the first communication exchange between the dialectic logic engine and the language model includes extracting at least four archetypical association parameters corresponding to the concept parameter and the mapping schema defines a circular, ordered sequence that defines relationships among the at least four archetypical association parameters.

6. The computerized system of claim 1, wherein the mapping schema is configured to:

store the plurality of archetypical association parameters and the plurality of supplemental parameters in concentric circular layers;

define positions for each of the plurality of archetypical association parameters and each of the plurality of supplemental parameters within the concentric circular layers;

establish relationships among two or more parameters in a same concentric circular layer;

establish relationships between two or more parameters in different concentric circular layers; and impose constraints on an ordering of the plurality of archetypical association parameters and the plurality of supplemental parameters within the concentric circular layers.

7. The computerized system of claim 1, wherein the one or more dialectic causality outputs include one or more dialectic wheels, and data stored in the mapping schema is incorporated into different segments of the one or more dialectic wheels to provide a visualization of relationships among the plurality of archetypical association parameters and the plurality of supplemental parameters.

8. The computerized system of claim 1, wherein generating the one or more dialectic causality outputs includes at least one of:

utilizing data stored in the mapping schema to generate one or more tables or one or more graphs that arrange the plurality of archetypical association parameters and the plurality of supplemental parameters in formats according to their relationships; or utilizing data stored in the mapping schema to generate one or more natural language explanations describing relationships among the concept parameter, the plurality of archetypical association parameters, and the plurality of supplemental parameters.

9. The computerized system of claim 1, wherein, in response to determining that causal relationships associated with the concept parameter are ambiguous, the method further comprises identifying functional or conceptual oppositions that balance the plurality of archetypical association parameters or the plurality of supplemental parameters, and the functional or conceptual oppositions are obtained in response to transmitting one or more prompts to the language model.

10. The computerized system of claim 1, wherein, in response to determining that causal relationships associated with the concept parameter are unambiguous, the method further comprises updating the mapping schema by matching each of the plurality of archetypical association parameters and each of the plurality of supplemental parameters with one or more separate parameters stored in the mapping schema.

11. A computerized method for electronically performing a dialectic causality analysis stored as instructions on one or more non-transitory storage devices and executed by one or more processing devices, the method comprising:

providing access to a dialectic logic engine that is configured to store and execute programming logic for electronically performing dialectical analyses;

receiving, by the dialectic logic engine, an input string identifying a concept parameter;

initiating a first communication exchange between the dialectic logic engine and a language model to derive a plurality of archetypical association parameters corresponding to the concept parameter;

storing the plurality of archetypical association parameters in a mapping schema, wherein the mapping schema defines relationships among or between the plurality of archetypical association parameters;

initiating a second communication exchange between the dialectic logic engine and the language model to derive a plurality of supplemental parameters based, at least in part, on the plurality of archetypical association parameters;

storing the plurality of supplemental parameters in the mapping schema, wherein the mapping schema defines relationships among the plurality of supplemental parameters and the plurality of archetypical association parameters; and generating one or more dialectic causality outputs based, at least in part, on the mapping schema.

12. The computerized method of claim 11, wherein initiating the second communication exchange between the dialectic logic engine and the language model to derive the plurality of supplemental parameters includes transmitting one or more prompts designed to extract or obtain a plurality of intermediate parameters from the language model, and each of the plurality of intermediate parameters identify a transition between two adjacent archetypical association parameters arranged according to a sequence order defined by the mapping schema.

13. The computerized method of claim 11, wherein initiating the second communication exchange between the dialectic logic engine and the language model to derive supplemental parameters includes sending one or more prompts designed to extract or obtain a plurality of opposition parameters from the language model, and the plurality of opposition parameters identify contrasting or opposing concepts that balance or complement the plurality of archetypical association parameters stored in the mapping schema.

14. The computerized method of claim 11, wherein initiating the second communication exchange between the dialectic logic engine and the language model to derive supplemental parameters includes sending one or more prompts designed to extract or obtain both a plurality of intermediate parameters and a plurality of opposition parameters from the language model.

15. The computerized method of claim 11, wherein initiating the first communication exchange between the dialectic logic engine and the language model includes extracting at least four archetypical association parameters corresponding to the concept parameter and the mapping schema defines a circular, ordered sequence that defines relationships among the at least four archetypical association parameters.

16. The computerized method of claim 11, wherein the mapping schema is configured to:

store the plurality of archetypical association parameters and the plurality of supplemental parameters in concentric circular layers;

define positions for each of the plurality of archetypical association parameters and each of the plurality of supplemental parameters within the concentric circular layers;

establish relationships among two or more parameters in a same concentric circular layer;

establish relationships between two or more parameters in different concentric circular layers; and impose constraints on an ordering of the plurality of archetypical association parameters and the plurality of supplemental parameters within the concentric circular layers.

17. The computerized method of claim 11, wherein the one or more dialectic causality outputs include one or more dialectic wheels, and data stored in the mapping schema is incorporated into different segments of the one or more dialectic wheels to provide a visualization of relationships among the plurality of archetypical association parameters and the plurality of supplemental parameters.

18. The computerized method of claim 11, wherein generating the one or more dialectic causality outputs includes at least one of:

utilizing data stored in the mapping schema to generate one or more tables or one or more graphs that arrange the plurality of archetypical association parameters and the plurality of supplemental parameters in formats according to their relationships; or utilizing data stored in the mapping schema to generate one or more natural language explanations describing relationships among the concept parameter, the plurality of archetypical association parameters, and the plurality of supplemental parameters.

19. The computerized method of claim 11, wherein, in response to determining that causal relationships associated with the concept parameter are ambiguous, the method further comprises identifying functional or conceptual oppositions that balance the plurality of archetypical association parameters or the plurality of supplemental parameters, and the functional or conceptual oppositions are obtained in response to transmitting one or more prompts to the language model.

20. A computerized method stored as instructions on one or more non-transitory storage devices and executed by one or more processing devices, the method comprising:

providing access to a dialectic logic engine that is configured to store and execute programming logic for electronically performing dialectical analyses;

identifying a concept parameter;

initiating a first communication exchange between the dialectic logic engine and a language model to derive archetypical association parameters corresponding to the concept parameter;

storing the archetypical association parameters in a mapping schema, wherein the mapping schema stores relationship data corresponding to the archetypical association parameters;

initiating a second communication exchange between the dialectic logic engine and the language model to derive one or more supplemental parameters;

storing the one or more supplemental parameters in the mapping schema, wherein the mapping schema stores relationship data corresponding to the supplemental parameters; and generating one or more dialectic causality outputs based, at least in part, on the mapping schema.

* * * * *